(12) United States Patent
Toyne et al.

(10) Patent No.: US 6,666,989 B1
(45) Date of Patent: Dec. 23, 2003

(54) LIQUID CRYSTAL POLYMER DEVICES AND MATERIALS

(75) Inventors: Kenneth J Toyne, Hull (GB); Stephen J Cowling, Hull (GB); John W Goodby, Hull (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/622,222

(22) PCT Filed: Feb. 23, 1999

(86) PCT No.: PCT/GB99/00559

§ 371 (c)(1),
(2), (4) Date: Aug. 15, 2000

(87) PCT Pub. No.: WO99/43763

PCT Pub. Date: Sep. 2, 1999

(30) Foreign Application Priority Data

Feb. 26, 1998 (GB) ............................................. 9803935

(51) Int. Cl.[7] .............................................. C09K 19/52
(52) U.S. Cl. ............... 252/299.01; 428/1.1; 252/299.61
(58) Field of Search ....................... 252/299.01, 299.61, 252/299.62, 299.63, 299.64, 299.67, 299.65, 299.66

(56) References Cited

U.S. PATENT DOCUMENTS 5,676,878 A * 10/1997 Lacey et al. ........... 252/299.01

FOREIGN PATENT DOCUMENTS

| EP | 0 274 128 A | | 7/1988 | |
|---|---|---|---|---|
| EP | 0 297 554 A | | 1/1989 | |
| EP | 0 348 873 A | | 1/1990 | |
| EP | 0 352 637 A | | 1/1990 | |
| EP | 0 528 050 A | | 2/1993 | |
| EP | 0 528 050 | * | 2/1993 | ............ C08G/65/18 |
| JP | 7-74189 | * | 9/1995 | ............ C07C/255/19 |
| WO | 97 04349 A | | 2/1997 | |
| WO | 97/04349 | * | 2/1997 | ............ G02F/1/1333 |

* cited by examiner

Primary Examiner—Mark F. Huff
Assistant Examiner—Jennifer R. Sadula
(74) Attorney, Agent, or Firm—Nixon & Vanderhye P.C.

(57) ABSTRACT

Polymeric compounds of general formula (I) where X, $X_1$, $X_2$ are independently straight or branched chain $C_{1-16}$ alkyl, halogen and H; (a) is a suitable mesogenic group; Z=single covalent bond, oxygen $CO_2$, OCO; n=1–20; Y=oxygen, $CO_2$, OCO, $CH_2$, CHOH, $CH_2O$; m=3–10,000. The compounds are liquid crystal polymers useful in liquid crystal devices, sensors, and in non-linear optical devices. The compounds are prepared by polymerization of the oxitane monomer to obtain the side-chain liquid crystalline polyoxitane compound. In this way the mesogenic groups are spaced on every fourth carbon atom in the polymer chain allowing greater mobility for the mesogenic group.

Figure 1A:
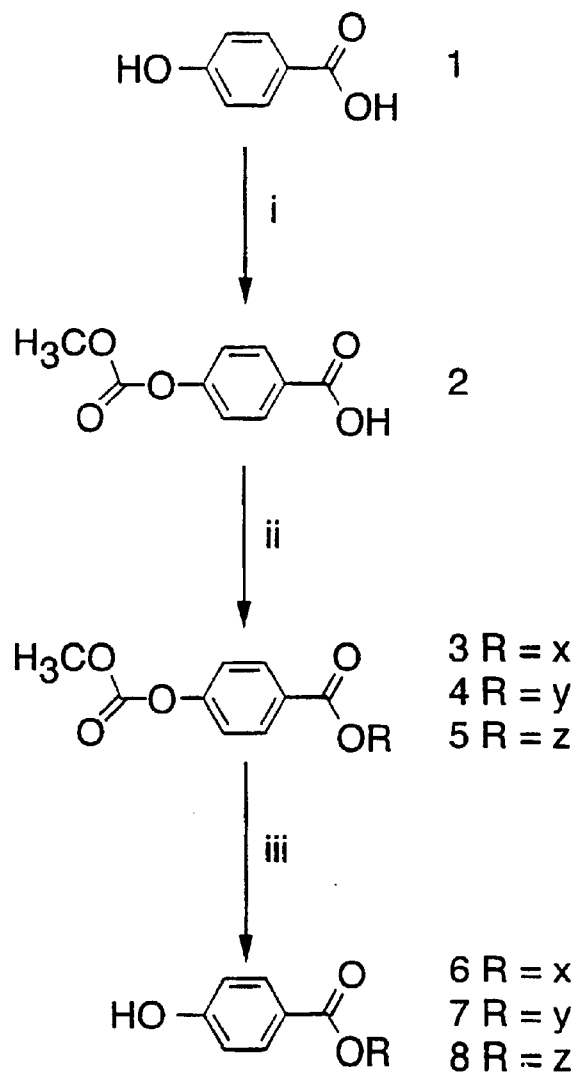

18 Claims, 13 Drawing Sheets x = (R)-CH(CH₃)C₆H₁₃
y = (R)-CH₂CH(CH₃)CH₂CH₃
z = CH(C₃H₇)₂ i = 1M NaOH + H₂O + CH₃OCOCl + HCl
ii = CH₃CH₂O₂CNNCO₂CH₂CH₃ + P(C₆H₅)₃ + ROH + THF
iii = CH₃CH₂OH + NH₃ x = (R)-CH(CH$_3$)C$_6$H$_{13}$
y = (R)-CH$_2$CH(CH$_3$)CH$_2$CH$_3$
z = CH(C$_3$H$_7$)$_2$ i = C$_6$H$_5$CH$_2$Br + K$_2$CO$_3$ + CH$_3$CH$_2$COCH$_3$
ii = BuLi + THF + CO$_{2(s)}$
iii = CH$_3$CH$_2$O$_2$CNNCO$_2$CH$_2$CH$_3$, P(C$_6$H$_5$)$_3$, ROH, THF
iv = 10% Pd/C, H$_2$, CH$_3$CO$_2$CH$_2$CH$_3$ x = (R)-CH(CH$_3$)C$_6$H$_{13}$
y = (R)-CH$_2$CH(CH$_3$)CH$_2$CH$_3$
z = CH(C$_3$H$_7$)$_2$ i = Br$_2$ + CH$_3$CO$_2$H
ii = C$_6$H$_5$CH$_2$Br + K$_2$CO$_3$ + CH$_3$CH$_2$COCH$_3$
iii = Cu$_2$CN$_2$ + CH$_3$NC$_4$H$_6$O
iv = 2.5M NaOH + CH$_3$CH$_2$OH + HCl
v = CH$_3$CH$_2$O$_2$CNNCO$_2$CH$_2$CH$_3$ + P(C$_6$H$_5$)$_3$ + ROH + THF
vi = 10% Pd/C + H$_2$ + CH$_3$CO$_2$CH$_2$CH$_3$ i = (C₄H₉)₄N⁺Br⁻ + C₆H₁₄ + 50% NaOH
ii = c. H₂SO₄ + CH₃CO₂H
iii = CH₃OH + c. H₂SO₄
iv = K₂CO₃ + CH₃CH₂COCH₃
v = 11M NaOH + CH₃CH₂OH + dil. HCl 42 n = 6
43 n = 10
44 n = 11

6 R = x
7 R = y
8 R = z
76 R = TFMH i

| 45 n = 6 R = x | 48 n = 10 R = x | 51 n = 11 R = x |
| 46 n = 6 R = y | 49 n = 10 R = y | 52 n = 11 R = y |
| 47 n = 6 R = z | 50 n = 10 R = z | 53 n = 11 R = z |
| 77 n = 6 R = TFMH | 78 n = 10 R = TFMH | 79 n = 11 R = TFMH | x = (R)-CH(CH$_3$)C$_6$H$_{13}$
y = (R)-CH$_2$CH(CH$_3$)CH$_2$CH$_3$
z = CH(C$_3$H$_7$)$_2$

TFMH = (S)-CH(CF$_3$)C$_6$H$_{13}$ i = C$_6$H$_{11}$NCNC$_6$H$_{11}$ + 4-(CH$_3$)$_2$NC$_5$H$_4$N + CH$_2$Cl$_2$

| 42 n = 6 | | 15 R = x |
|---|---|---|
| 43 n = 10 | | 16 R = y |
| 44 n = 11 | | 17 R = z |

| 54 n = 6 R = x | 57 n = 10 R = x | 60 n = 11 R = x |
| 55 n = 6 R = y | 58 n = 10 R = y | 61 n = 11 R = y |
| 56 n = 6 R = z | 59 n = 10 R = z | 62 n = 11 R = z | x = (R)-CH(CH$_3$)C$_6$H$_{13}$
y = (R)-CH$_2$CH(CH$_3$)CH$_2$CH$_3$
z = CH(C$_3$H$_7$)$_2$ i = C$_6$H$_{11}$NCNC$_6$H$_{11}$ + 4-(CH$_3$)$_2$NC$_5$H$_4$N + CH$_2$Cl$_2$

| 63 n = 6 R = x | 66 n = 10 R = x | 69 n = 11 R = x |
| 64 n = 6 R = y | 67 n = 10 R = y | 70 n = 11 R = y |
| 65 n = 6 R = z | 68 n = 10 R = z | 71 n = 11 R = z | x = (R)-CH(CH₃)C₆H₁₃
y = (R)-CH₂CH(CH₃)CH₂CH₃
z = CH(C₃H₇)₂ i = C₆H₁₁NCNC₆H₁₁ + 4-(CH₃)₂NC₅H₄N + CH₂Cl₂ i = 2.5M BuLi + THF + CF$_3$CO$_2$CH$_3$ + BF$_3$.OEt$_2$
ii = (-)-(CH$_3$C$_9$H$_{14}$)$_2$BCl + NH(CH$_2$CH$_2$OH)$_2$ + CH$_3$CH$_2$OCH$_2$CH$_3$
iii = 10% Pd/C + H$_2$ + THF
iv = p-CH$_3$C$_6$H$_4$SO$_3$H + p-CH$_3$C$_6$H$_4$CH$_3$ i = $K_2CO_3$ + $C_6H_5CH_2Br$ + $CH_3CH_2COCH_3$
ii = 2.5M BuLi + THF + $B(OCH_3)_3$ + 10% HCl
iii = $CH_3CH_2O_2CNNCO_2CH_2CH_3$ + $P(C_6H_5)_3$
    + S-(+)-$CH_3CH(OH)C_6H_{13}$ + THF
iv = $Pd(P(C_6H_5)_3)_4$ + 2M $Na_2CO_3$ + DME
v = 10% Pd/C + $CH_3CH_2OH$ + $CH_3CO_2H$ + $C_6H_{12}$
vi = $CH_3CH_2O_2CNNCO_2CH_2CH_3$ + $P(C_6H_5)_3$ + THF
vii = $CH_3CH_2OH$ + $NH_3$ (aq) + THF
viii = $K_2CO_3$ + $CH_3CH_2COCH_3$

| 45 n = 6 R = x | 48 n = 10 R = x | 51 n = 11 R = x |
| 46 n = 6 R = y | 49 n = 10 R = y | 52 n = 11 R = y |
| 47 n = 6 R = z | 50 n = 10 R = z | 53 n = 11 R = z |
| 77 n = 6 R = TFMH | 78 n = 10 R = TFMH | 79 n = 11 R = TFMH | i

| P1 n = 6 R = x | P4 n = 10 R = x | P7 n = 11 R = x |
| P2 n = 6 R = y | P5 n = 10 R = y | P8 n = 11 R = y |
| P3 n = 6 R = z | P6 n = 10 R = z | P9 n = 11 R = z |
| P28 n = 6 R = TFMH | P29 n = 10 R = TFMH | P30 n = 11 R = TFMH |

$x = (R)\text{-}CH(CH_3)C_6H_{13}$
$y = (R)\text{-}CH_2CH(CH_3)CH_2CH_3$
$z = CH(C_3H_7)_2$ TFMH = $(S)\text{-}CH(CF_3)C_6H_{13}$
m = number of repeat units i = 2 mol% SARCAT KI 85 +hv

| 54 n = 6 R = x | 57 n = 10 R = x | 60 n = 11 R = x |
| 55 n = 6 R = y | 58 n = 10 R = y | 61 n = 11 R = y |
| 56 n = 6 R = z | 59 n = 10 R = z | 62 n = 11 R = z |

| P10 n = 6 R = x | P13 n = 10 R = x | P16 n = 11 R = x |
| P11 n = 6 R = y | P14 n = 10 R = y | P17 n = 11 R = y |
| P12 n = 6 R = z | P15 n = 10 R = z | P18 n = 11 R = z | x = (R)-CH(CH$_3$)C$_6$H$_{13}$
y = (R)-CH$_2$CH(CH$_3$)CH$_2$CH$_3$
z = CH(C$_3$H$_7$)$_2$ m = number of repeat units i = 2 mol% SARCAT KI 85 +hv

| 63 n = 6 R = x | 66 n = 10 R = x | 69 n = 11 R = x |
| 64 n = 6 R = y | 67 n = 10 R = y | 70 n = 11 R = y |
| 65 n = 6 R = z | 68 n = 10 R = z | 71 n = 11 R = z |

| P19 n = 6 R = x | P22 n = 10 R = x | P25 n = 11 R = x |
| P29 n = 6 R = y | P23 n = 10 R = y | P26 n = 11 R = y |
| P21 n = 6 R = z | P24 n = 10 R = z | P27 n = 11 R = z | x = (R)-CH(CH$_3$)C$_6$H$_{13}$
y = (R)-CH$_2$CH(CH$_3$)CH$_2$CH$_3$
z = CH(C$_3$H$_7$)$_2$ m = number of repeat units i = 2 mol% SARCAT KI 85 +hv 88 n = 6
89 n = 10
90 n = 11 i

P31 n = 6
P32 n = 10
P33 n = 11 m = number of repeat units i = 2 mol% SARCAT KI 85 +hv

LIQUID CRYSTAL POLYMER DEVICES AND MATERIALS

The present invention relates to new liquid crystal monomers and polymers. In particular it describes compounds for use in liquid crystal mixtures and in liquid crystal devices such as liquid crystal displays (LCDs).

Monomeric and polymeric liquid crystals are being developed for use in flat screen televisions and other display devices. For such applications it is desirable to have an LCD that has a fast switching time, is resilient to impact or shock, can operate over a wide temperature range and has good optical properties. In general smectic liquid crystals have faster switching times than nematic liquid crystals, and antiferroelectric smectic liquid crystals have comparable switching times to ferroelectric liquid crystals. Although sinectic LCDs have fast switching times, they generally exhibit poor shock resistance. This problem may be overcome by using smectic liquid crystal polymers having a polymer backbone to which side chain mesogenic groups are bonded. In these polymers it is the mesogenic side groups that display orientational order in the liquid crystal phases.

A considerable amount of research has been undertaken in liquid crystalline polymers to control their properties by polymerising monomers with systematically different structures. With mesogenic side chain polymers this has been achieved conventionally by making small variations in the structure of the mesogenic group. Choosing different polymer backbones and varying the number of methylene units in the alkyl spacer between the mesogenic group and the backbone, also influences the properties. Although polymeric smectic liquid crystals exhibit good shock resistance, their mesogenic groups often exhibit poor alignment. Such poor alignment has an adverse effect upon the optical properties and temperature range of the liquid crystal. For example, polyacrylates have a mesogenic group attaxched to every second atom in the polymer backbone, and this close spacing constricts movement of the mesogenic groups resulting in relatively poor alignment. A further example is provided by polyoxetane liquid crystals having the mesogenic groups on every fourth atom of the polymer backbone, as is shown in the diagram below.

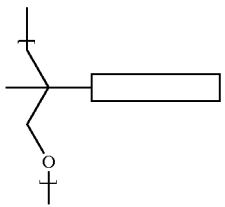

This increased spacing and the greater flexibility of the backbone results in liquid crystal polyoxetanies having improved alignment properties. However a number of problems still remain, including slow switching speeeds and small temperature ranges.

In addition to the problems discussed above, polymeric LCDs can also suffer from relatively high melting points. To overcome this problem, polymeric liquid crystals can be mixed with monomeric liquid crystals to suppress the melting point. The use of liquid crystal mixtures has the further advantage that it allows other properties such as pitch to be optimised.

The invention solves these problems by the provision of new liquid crystal monomers and polymers, liquid crystal mixtures, and liquid crystal devices.

According to one aspect, the present invention provides a compound of formula (I):

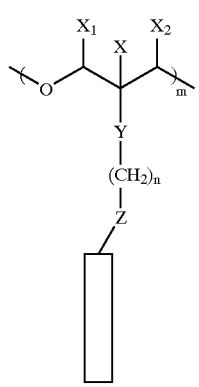

wherein X, $X_1$, $X_2$ are independently selected from straight or branched chain $C_{1-16}$ alkyl, halogen and H;

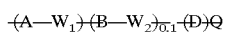 is any suitable mesogenic group,

Z=single covalent bond, oxygen $CO_2$, OCO;

n=1–20; Y=oxygen, $CO_2$, OCO, $CH_2$, CHOH, $CH_2O$ m=3–10000 the mesogenic group is defined from the general structure II:

$$-(A-W_1)-(B-W_2)_{0-1}-(D)-Q$$

where A, B, and D are independently selected from:

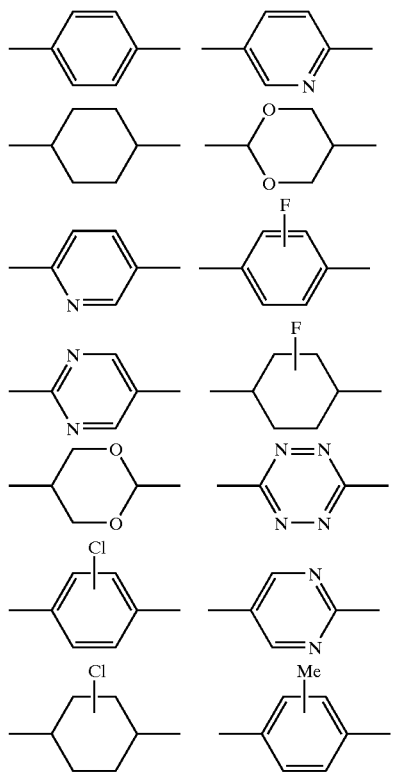

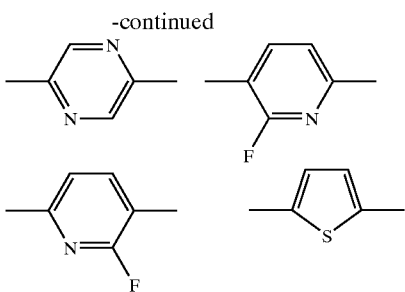

where $W_1$ and $W_2$ are independently selected from a single covalent bond, COO, OCO, $CH_2CH_2$, $CH_2O$, $OCH_2$, O;

Q is selected from:
CN, Halogen, R, OR, COOR, $CF_3$, lactate derivatives, where R may be chiral, straight or branched chain alkyl and may include from 1–16 carbon atoms and including where one or more non-adjacent $CH_2$ groups may be substituted by $CH(CN)$, $CH(CF_3)$, CHF CH(Cl), $CH(CH_3)$;

the substituents on the phenyl and cyclohexyl rings indicate that at least one substituent may be present on the rings specified and up to four substituents present on the phenyl rings and up to ten substituents present on the cyclohexyl rings.

The structure of the compounds having formula (I) allows the mesogenic groups to align easily and to exhibit good switching properties. The compounds having formula (I) are suitable for display devices and and are particularly suitable for plastic display devices. The compounds having formula (I) exhibit Smectic C phases over a wide temperature range. The compounds of formula (I) can exhibit antiferroelectric Smectic C phases, provided that the R group is chiral.

Preferably: $W_1$ is single covalent bond.

More preferably:

X is $CH_3$, $X_1$ and $X_2$ are both H, Z is oxygen, n=6–12, Y=$CH_2O$,

A is:

$W_1$ is a single covalent bond

B is:

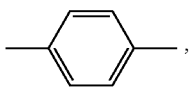

$W_1$ is —COO—,

D is:

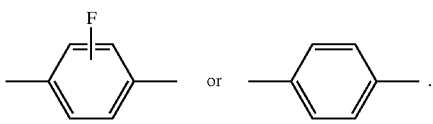

and Q is —COOR.

Yet more preferably Q is:

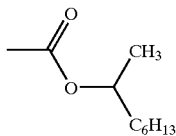

or:

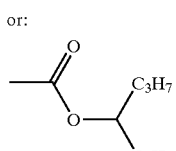

or:

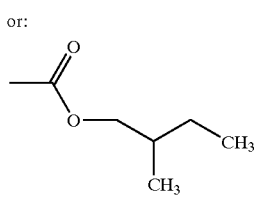

According to another aspect, the present invention provides compounds of formula (III):

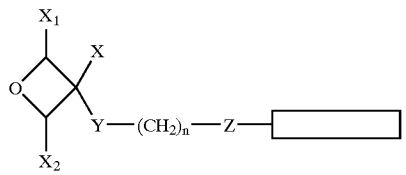

(III)

wherein X, $X_1$, $X_2$ are independently selected from straight or branched chain $C_{1-16}$ alkyl, halogen and H;

▭ is any suitable mesogenic group:

Z=single covalent bond, oxygen $CO_2$, OCO;

n=1–20; Y=oxygen, $CO_2$, OCO, $CH_2$, CHOH, $CH_2O$ the mesogenic group is defined from the general structure II Preferably $W_1$ is a single covalent bond.

More preferably:

X is $CH_3$ $X_1$ and $X_2$ are both H, Z is oxygen, n=6–12, Y=$CH_2O$,

A is:

$W_1$ is a single covalent bond,

B is:

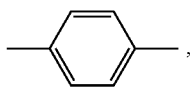

$W_2$ is —COO—,

D is:

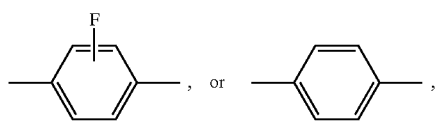

and Q is —COOR.
Yet more preferably Q is:

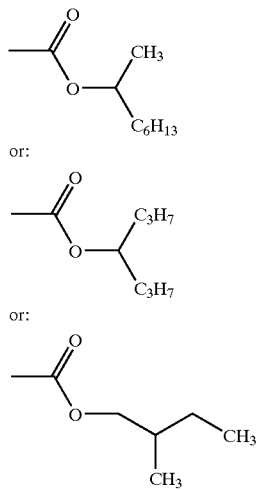

According to a further aspect, the present invention provides a method of making an electro-optic device comprising one or more materials of formula III comprising the steps of:
forming a cell comprising two cell walls spaced apart, the walls inner surfaces having formed thereon electrode structures,
providing a mixture comprising a monomer material and a cationic initiator,
introducing the mixture between the cell walls,
polymerising the mixture.

There may also be present in the mixture a radical photoinitiator.

Preferably at least one wall is surface treated to provide liquid crystal alignment.

The monomer material may be aligned before polymerisation and/or the polymer may be aligned after polymerisation. The monomer may be present in any of the known liquid crystal phases including nematic, cholesteric or smectic.

Preferably the polymerisation is carried out under UV light and/or in the presence of additional heat or an electric field.

According to an alternative aspect, the present invention provides a liquid crystal device which comprises two spaced cell walls each bearing electrode structures and treated oil at least one facing surface with an alignment layer, and a layer of liquid crystal material enclosed between the cell walls, characterised in that the layer of liquid crystal material comprises a material of the formula I and/or III.

According to a further aspect of the invention provides a liquid crystal material having optically active properties comprising at least one compound according to the formula I. Advantageously the liquid crystal material comprises both the compound having formula I and the compound having the formula III.

According to a yet further aspect, the invention provides a liquid crystal material comprising a compound according to the formula III.

An example of the use of a material and device embodying the present invention will now be described with reference to the accompanying drawings:

FIGS. 1(A) to (I) are synthetic schemes for the preparation of the oxetane monomer.

FIGS. 2(A) to (D) are synthetic schemes for the preparation of the polyoxetane polymers.

EXAMPLE 1

Preparation of (R)-(−)-1-Methylheptyl 4-Hydroxylbenzoate (6), (R)-(+)-2-Methylbutyl 4-Hydroxybenzoate (7), and 1-Propylbutyl 4-Hydroxybenzoate (8)

This example is illustrated by FIG. 1(a).

PREPARATION 1.1

Synthesis of 4-Methoxycarbonyloxybenzoic Acid (2)

4-Hydroxybenzoic acid (1) (143.2 g, 1.04 mol) was added with vigorous stirring to a solution of sodium hydroxide (120 g, 3.0 mol) in water (3.2 l) maintained at −10° C.: methyl chloroformate (160.0 g, 1.69 mol) was then added keeping the temperature below 0° C. The resulting slurry was left stirring overnight before being acidified to pH 5 by a mixture of hydrochloric acid and water (1:1) and the voluminous colourless precipitate was filtered off and recrystallised (ethanol).

Yield 168.4 g (83%), mp 182° C. $^1$Hnmr (CDCl$_3$) δ 3.92 (3H, s), 7.25 (2H, d, J=7 Hz), 8.10 (2H, d, J=7 Hz), 11.35 (1H, broad). IR (KBr) $v_{max}$ 840, 940, 1460, 1500, 1580, 1600, 1750, 1680, 2830, 3000 cm$^{-1}$. Ms m/z 196 (M$^+$) 152, 135 (100%), 108, 92, 77.

PREPARATION 1.2

Synthesis of (R)-(−)-1-Methyheptyl 4-Methoxycarbonyloxybenzoate (3)

Compound 2 (15.0 g, 77 mmol), (S)-(+)-octan-2-ol (10.0 g, 77 mmol) and diethyl azodicarboxylate (3.4 g, 77 mmol) were dissolved in THF (250 ml) and triphenylphosphine (22.3 g, 85 mmol) in THF (50 ml) was added dropwise with stirring. The reaction mixture was left stirring under nitrogen until no further reaction was visible by TLC. The solvent was then removed in vacuo and the resulting slurry was purified by column chromatography [petroleum ether (bp 40–60° C.): dichloromethane (12:1)] on silica to yield a colourless oil.

Yield 11.6 g (50%), [α]$_D$=−20.1° at 23° C. $^1$Hnmr (CDCl$_3$) δ 0.90 (3H, t), 1.30 (3H, d), 1.35 (8H, m), 1.65 (2H, m), 3.90 (3H, s), 5.15 (1H, sext), 7.25 (2H, d, J=7 Hz), 8.15 (2H, d, J=7 Hz). IR (neat) $v_{max}$ 830, 1260, 1270, 1440, 1500, 1600, 1710, 1760 cm$^{-1}$. Ms m/z 308 (M$^+$), 197, 179, 135, 92, 77, 59 (100%).

PREPARATION 1.3

Synthesis of (R)-(+)-2-Methylbutyl 4-Methoxycarbonyloxybenzoate (4)

The experimental procedure followed was the same as for the preparation of compound 3. The following quantities were used:

Compound 2 18.0 g, 79 mmol; (S)-(−)-2-methylbutan-1-ol, 7.0 g, 79 mmol; diethyl azodicarboxylate, 13.8 g, 79 mmol; triphenylphosphine in THF, 22.8 g, 87 mmol in 100 ml; THF, 250 ml.

Yield 10.5 g (50%), $[\alpha]_D$=+4.1° at 24° C. $^1$Hnmr (CDCl$_3$) δ 0.96 (3H, t), 1.02 (3H, d), 1.30 (1H, sept), 1.54 (1H, sept), 1.85 (1H, sept), 3.93 (3H, s), 4.18 (2H, m), 7.26 (2H, d, J=7 Hz), 8.09 (2, H, d, J=7 Hz). IR (neat) $v_{max}$ 860, 1255, 1500, 1600, 1720, 1760, 2960 cm$^{-1}$. Ms m/z 266 (M$^+$), 197, 179, 152, 135 (100%), 77.

PREPARATION 1.4

Synthesis of 1-Propylbutyl 4-Methoxycarbonyloxybenzoate (5)

The experimental procedure followed was the same as for the preparation of compound 3. The following quantities were used:

Compound 2 19.6 g, 0.1 mol; heptan-4-ol, 11.6 g, 0.1 mol; diethyl azodicarboxylate, 17.4 g, 0.1 mol; triphenylphosphine in THF, 26.2 g, 0.11 mol in 50 ml; THF, 250 ml.

Yield 14.5 g (49%). $^1$Hnmr (CDCl$_3$) δ 0.93 (6H, t), 1.40 (4H, m), 1.65 (4H, m), 3.92 (3H, s), 5.15 (1H, sext), 7.25 (2H, d, J=7 Hz), 8.19 (2H, d, J=7 Hz). IR (neat) $v_{max}$ 860, 1250, 1435, 1500, 1600, 1710, 1760 cm$^{-1}$. Ms m/z 294 (M$^+$), 251, 197, 179 (100%), 152, 135.

PREPARATION 1.5

Synthesis of (R)-(−)-1-Methylheptyl 4-Hydroxybenzoate (6)

Compound 3 (11.6 g, 38 mmol) in ethanol (200 ml) and aqueous ammonia (50 ml) was stirred overnight. The solvents were removed in vacuo and the resulting colourless oil was purified by column chromatography (ethyl acetate) on silica.

Yield 9.15 g (96%), $[\alpha]_D$=−34.4° at 23° C. $^1$Hnmr (CDCl$_3$) δ 0.85 (3H, t), 1.30 (10H, m), 1.65 (2H, m), 5.13 (1H, sext), 6.91 (2H, d, J=7 Hz), 7.70 (1H, broad), 7.96 (2H, d, J=7 Hz), phenolic OH not detected. IR (neat) $v_{max}$ 850, 1170, 1320, 1670, 3350 cm$^{-1}$. Ms m/z 250 (M$^+$), 138, 121 (100%), 112, 93, 65.

PREPARATION 1.6

Synthesis of (R)-(+)-2-Methylbutyl 4-Hydroxybenzoate (7)

The experimental procedure followed was the same as for the preparation of compound 6. The following quantities were used:

Compound 4, 10.5 g, 39 mmol; ethanol, 200 ml; aqueous ammonia, 50 ml.

Yield 7.9 g (97%), $[\alpha]_D$=+11.8° at 22° C. $^1$Hnmr (CDCl$_3$) δ 0.95 (3H, t), 1.10, (3H, d), 1.30 (1H, sept), 1.52 (1H, sept), 1.83 (1H, sept), 4.14 (2H, m), 6.91 (2H, d, J=8 Hz), 7.96 (2H, d, J=8 Hz), phenolic OH not detected. IR (neat) $v_{max}$ 850, 1170, 1310, 1510, 1590, 1600, 1670, 3350 cm$^{-1}$. Ms m/z 208 (M$^+$), 138, 121, 65, 58 (100%).

PREPARATION 1.7

Synthesis of 1-Propylbutyl 4-Hydroxybenzoate (8)

The experimental procedure followed was the same as for the preparation ol compound 6. The following quantities were used:

Compound 5 9.8 g, 33 mmol; ethanol, 200 ml; aqueous ammonia, 50 ml.

Yield 7.5 g (96%). $^1$Hnmr (CDCl$_3$) δ 0.90 (6H, t), 1.40 (4H, m), 1.70 (4H, m), 4.80 (1H, broad), 5.15 (1H, m), 6.85 (2H, d, J=7 Hz), 7.95 (2H, d, J=7 Hz). IR (neat) $v_{max}$ 850, 1450, 1510, 1590, 1680, 3350 cm$^{-1}$. Ms m/z 236 (M$^+$), 139, 121 (100%), 98, 93, 65.

EXAMPLE 2

Preparation of (R)-(−)-1-Methylheptyl 4-Hydroxy-3-fluorobenzoate (15), (R)-(+)-2-Methylbutyl 4-Hydroxy-3-fluorobenzoate (16), and 1-Propylbutyl 4-Hydroxy-3-fluorobenzoate (17)

Figure 1B:
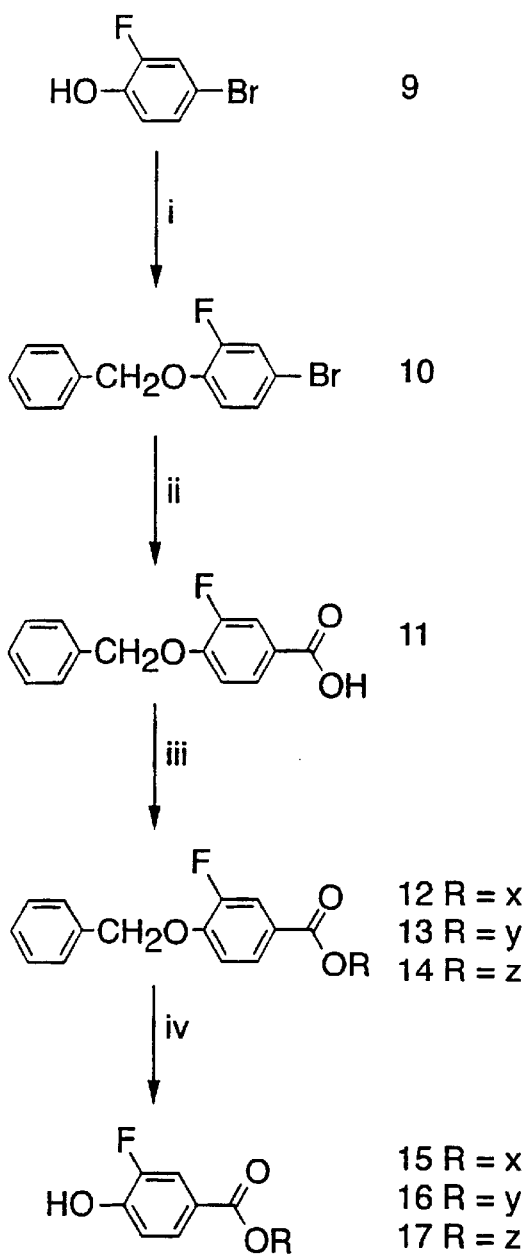

This example is illustrated in FIG. 1(b).

PREPARATION 2.1

Synthesis of 4-Benzyloxy-3-fluorobromobenzene (10)

Potassium carbonate (107.6 g, 0.78 mol) was added to a solution of 4-bromo-2-fluorophenol (9) (100.0 g, 0.52 mol) and benzyl bromide (97.8 g, 0.57 mol) in butanone (1.2 l). The reaction mixture was heated under reflux for 48 h and then poured into water (1.0 l) with stirring. The organic solution was separated off and dried (MgSO$_4$). The drying agent was filtered off and the solvent removed in vacuo to yield an off-white solid which was purified by column chromatography (dichloromethane) on silica. The off-white solid was recrystallised from cyclohexane and dried in vacuo (P$_2$O$_5$). Yield 146.0 g, mp 66.0–68.1° C., lit. mp 67–70° C.

$^1$Hnmr (CDCl$_3$) δ 5.25 (2H, s), 6.86 (1H, t), 7.15 (1H, m), 7.25 (1H, m), 7.32–7.45 (5H, m). IR (KBr) $v_{max}$ 700, 750, 860, 870, 1490, 2970, 3020 cm$^{-1}$. Ms m/z 282, 280 (M$^+$), 163, 161, 91 (100%), 77, 65, 51.

PREPARATION 2.2

Synthesis of 4-Benzyloxy-3-fluorobenzoic Acid (11)

10M Butyl lithium in hexanes (50 ml, 0.13 mol) was added to a stirred solution of compound 10 (30.0 g, 0.12 mol) in THF (500 ml) maintained at −78° C. under a nitrogen atmosphere. The reaction mixture was maintained at −78° C. for 3–4 h and then poured onto a slurry of 'Cardice' and THF which was stirred for 2 h. The mixture was then left to warm to room temperature and then acidified with conc. hydrochloric acid and diluted with water (1.0 l). The organic layer was separated off and the aqueous solution was washed with ether (2×300 ml), the combined organic extracts were dried (MgSO$_4$). The drying agent was filtered off and the solvent remove in vacuo to yield a colourless solid which was recrystallised from cyclohexane and ethyl acetate. The solid was dried in vacuo (P$_2$O$_5$).

Yield 10.8 g (40%), mp 188–190° C., lit mp 188–190° C. $^1$Hnmr (CDCl$_3$) δ 5.20 (2H, s), 7.07 (1H, t), 7.33–7.48 (5H, m), 7.71–7.81 (2H, m), acidic proton not observed. IR (KBr) $v_{max}$ 690, 740, 760, 850, 890, 990, 1090, 1210, 1280, 1410, 1450, 1510, 1530, 1610, 1670, 2920 cm$^{-1}$. Ms m/z 246 (M$^+$), 127, 91 (100%), 65, 51.

PREPARATION 2.3

Synthesis of (R)-(−)-1-Methyheptyl 4-Benzyloxy-3-fluorobenzoate (12)

Triphenylphosphine (7.92 g, 30 mmol) in THF (40 ml) was added dropwise to a stirred solution of compound 11

(7.00 g, 28 mmol), (S)-(+)-octan-2-ol (3.66 g 28 mmol) and diethyl azodicarboxylate (4.87 g, 28 mmol) in THF (100 ml). The reaction solution was left stirring under nitrogen until completion [reaction monitored by TLC (dichloromethane, silica)]. Upon completion, the solvent was removed in vacuo to yield a colourless solid which was purified by column chromatography (dichloromethane) on silica to yield a colourless oil. Yield 10.01 g (99%), $[\alpha]_D$=−22.4° at 25° C.

$^1$Hnmr (CDCl$_3$) δ 0.88 (3H, t), 1.22–1.40 (11H, m), 1.52–1.80 (2H, m), 5.11 (1H, sext), 5.20 (2H, s), 7.01 (1H, t), 7.39 (5H, m), 7.73 (1H, m), 7.79 (1H, t). IR (neat) $v_{max}$ 700, 760, 850, 890, 1090, 1120, 1200, 1280, 1430, 1450, 1510, 1610, 1705, 2850, 2920, 2950 cm$^{-1}$. Ms m/z 358 (M$^+$), 246, 229, 91 (100%), 55.

PREPARATION 2.4

Synthesis of (R)-(+)-2-Methylbutyl 4-Benzyloxy-3-fluorobenzoate (13)

The experimental procedure followed was the same as for the preparation of compound 12. The following quantities were used:

Compound 11 7.00 g, 28 mmol; (S)-(−)-2-methylbutan-1-ol 2.46 g, 28 mmol; diethyl azodicarboxylate, 4.87 g, 28 mmol; triphenylphosphine in THF, 7.92 g, 30 mmol in 40 ml; THF, 100 ml. Yield 8.22 g (93%), $[\alpha]_D$=+4.4° at 25° C.

$^1$Hnmr (CDCl$_3$) δ 0.94 (3H, t), 1.01 (3H, d), 1.29 (1H, sext), 1.51 (1H, sext), 1.84 (1H, sext), 4.13 (2H, m), 5.20 (2H, s), 7.01 (1H, t), 7.41 (5H, m), 7.76 (1H, m), 7.79 (1H, t). IR (neat) $v_{max}$ 700, 760, 820, 840, 1000, 1090, 1125, 1200, 1280, 1380, 1430, 1450, 1510, 1610, 1710, 2880, 2960 cm$^{-1}$. Ms m/z 316 (M$^+$), 229, 139, 91 (100%), 65.

PREPARATION 2.5

Synthesis of 1-Propylbutyl 4-Benzyloxy-3-fluorobenzoate (14)

The experimental procedure followed was the same as for the preparation of compound 12. The following quantities were used:

Compound 11 7.00 g, 28 mmol; heptan-4-ol, 3.25 g, 28 mmol; diethyl azodicarboxylate, 4.87 g, 28 mmol; triphenylphosphine in THF, 7.92 g, 30 mmol in 40 ml; THF, 100 ml. Yield 4.00 g (42%)

$^1$Hnmr (CDCl$_3$) δ 0.92 (6H, t), 1.38 (4H, m), 1.62 (4H, m), 5.12 (1H, sext), 5.20 (2H, s), 7.01 (1H, t), 7.40 (5H, m), 7.74 (1H, m), 7.79 (1H, t). IR (neat) $v_{max}$ 700, 740, 760, 820, 890, 940, 1000, 1095, 1120, 1195, 1280, 1320, 1430, 1450, 1510, 1580, 1610, 1710, 2870, 2930, 2960 cm$^{-1}$. Ms m/z 344 (M$^+$), 261, 229, 91 (100%), 55.

PREPARATION 2.6

Synthesis of (R)-(−)-1-Methylheptyl 4-Hydroxy-3-fluorobenzoate (15)

10% Palladium on charcoal (0.3 g), was added to a solution of compound 12 (10.0 g, 28 mmol) in ethyl acetate (300 ml). The solution was evacuated and left stirring with hydrogen at atmospheric pressure for 24 h. The catalyst was filtered off and the solvent removed in vacuo to yield a yellow oil which was purified by column chromatography (dichloromethane) on silica to yield the pure colourless oil. Yield 5.8 g (77%). $[\alpha]_D$=−33.7° at 25° C.

$^1$Hnmr(CDCl$_3$) δ 0.88 (3H, t), 1.30 (11H, m), 1.65 (2H, m), 5.12 (1H, sext), 5.20 (2H, s), 7.02 (1H, t), 7.73 (1H, quint), 7.78 (1H, s), phenolic proton not observed. IR (neat) $v_{max}$ 760, 900, 1210, 1300, 1440, 1510, 1590, 1610, 1700, 2860, 2920, 3020, 3340 cm$^{-1}$. Ms m/z 268 (M$^+$), 156, 139, 112, 58, 43 (100%).

PREPARATION 2.7

Synthesis of (R)-(+)-2-Methylbutyl 4-Hydroxy-3-fluorobenzoate (16)

The experimental procedure followed was the same as for the preparation of compound 15. The following quantities were used:

Compound 13 8.22 g, 26 mmol; 10% palladium on charcoal 0.30 g; ethyl acetate 300 ml. Yield 5.83 g (99%), $[\alpha]_D$=+5.18° at 25° C.

$^1$Hnmr (CDCl$_3$) δ 0.94 (3H, t), 1.00 (3H, d), 1.28 (1H, sext), 1.53 (1H, sext), 1.83 (1H, oct), 4.14 (2H, m), 6.06 (1H, broad), 7.03 (1H, t), 7.76 (1H, m), 7.79 (11H, t). IR (neat) $v_{max}$ 770, 840, 900, 980, 1090, 1120, 1220, 1310, 1440, 1520, 1600, 1620, 1690, 2880, 2970, 3350 cm$^{-1}$. Ms m/z 226 (M$^+$), 156, 139, 82, 70, 43 (100%).

PREPARATION 2.8

Synthesis of 1-Propylbutyl 4-Hydroxy-3-fluorobenzoate (17)

The experimental procedure followed was the same as for the preparation of the compound 15. The following quantities were used:

Compound 14 4.00 g, 11.6 mmol: 10% palladium on charcoal 0.20 g, ethyl acetate 200 ml. Yield 2.20 g (75%).

$^1$Hnmr (CDCl$_3$) δ 0.92 (6H, t), 1.37 (4H, m), 1.62 (4H, m), 5.14 (1H, sext), 7.03 (1H, t), 7.74 (1H, t), 7.80 (1H, d). IR (KBr) $v_{max}$ 770, 840, 900, 950, 1090, 1120, 1220, 1300, 1440, 1520, 1600, 1620, 1690, 2880, 2960, 3340 cm$^{-1}$. Ms m/ 254 (M$^+$), 139, 111, 98, 83, 43 (100%).

EXAMPLE 3

Preparation of (R)-(−)-1-Methylheptyl 4-Hydroxy-2-fluorobenzoate (26), (R)-(+)-2-Methylbutyl 4-Hydroxy-2-fluorobenzoate (27), and 1-Propylbutyl 4-Hydroxy-2-fluorobenzoate (28)

Figure 1C:
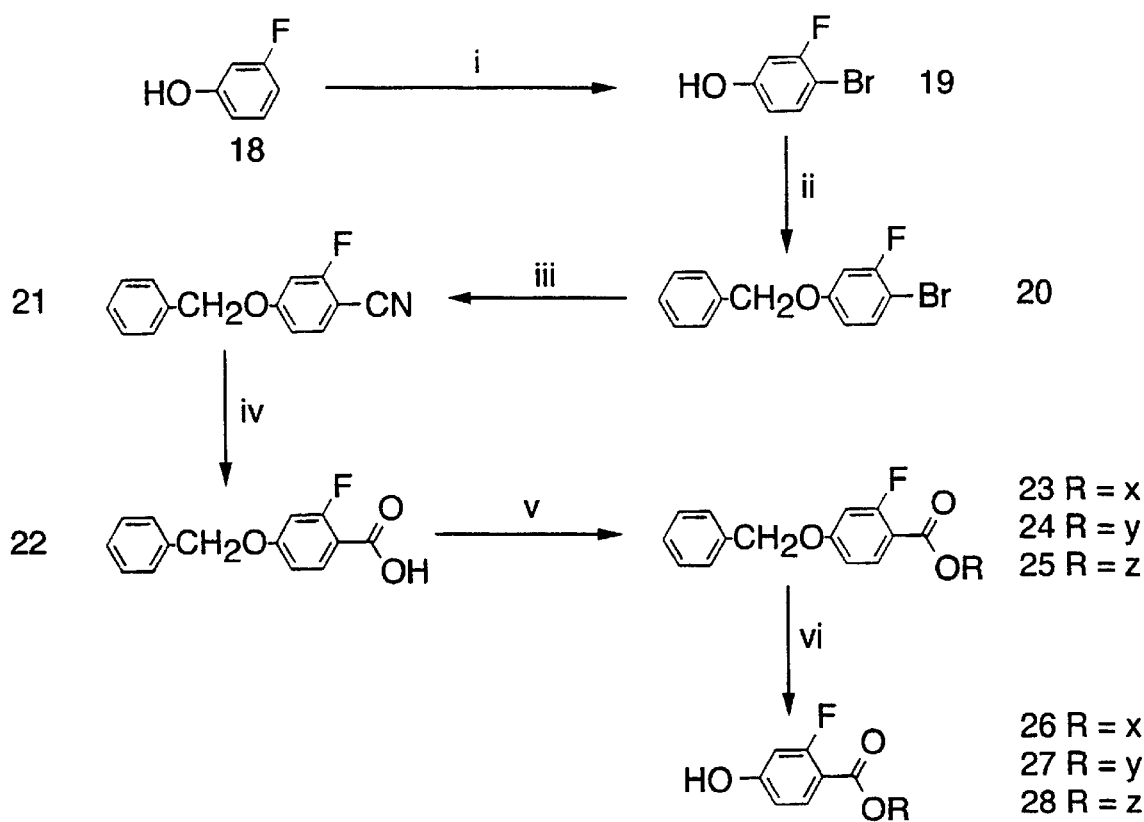

This example is illustrated by FIG. 1(c).

PREPARATION 3.1

Synthesis of 4-Bromo-3)-fluorophenol (19)

Bromine (77.1 g, 0.48 mol) was added dropwise to a solution of 3-fluorophenol (18) in acetic acid (200 ml) cooled to 0° C. in an ice-salt bath. The Solution was stirred for 15 minutes, then allowed to warm to room temperature and stirred for a further 5 minutes and then poured into water (3000 ml). The aqueous solution was washed with dichloromethane (2×500 ml) and the combined organic washings were washed with water (2×1000 ml). The organic solution was dried (MgSO$_4$), the drying agent filtered off and the solvent removed in vacuo to yield a brown oil. The oil was heated with petroleum ether (bp 40–60° C.) until it became miscible and was left for 14 h at 0° C. The colourless crystals obtained were filtered off, washed with cold petroleum ether (bp 40–60° C.) and dried in vacuo (P$_2$O$_5$).

Yield 46.6 g (54%). $^1$Hnmr (CDCl$_3$) δ 4.88 (1H, broad), 6.55 (1H, ddd, J$_1$=10 Hz, J$_2$=8 Hz, J$_3$=4 Hz), 6.67 (1H, dd, $J_1$=8 Hz, $J_2$=4 Hz), 7.37 (1H, dd, $J_1$=8 Hz, $J_2$=1 Hz). IR (KBr) $\nu_{max}$ 610, 810, 850, 960, 1040, 1120, 1170, 1250, 1290, 1400, 1450, 1490, 1590, 1600, 3300 cm$^{-1}$. Ms m/z 192, 190 (M$^+$), 111, 91, 83 (100%), 63, 57.

PREPARATION 3.2

Synthesis of Benzyloxy-4-bromo-3-fluorobenzene (20)

Potassium carbonate (31.74 g, 0.23 mol) was added to a solution of compound 19 (36.80 g, 0.19 mol) and benzyl bromide (35.70 g, 0.21 mol) in butanone (500 ml). The reaction mixture was heated under reflux for 20 h until completion. The reaction was monitored by G. C. The reaction solution was cooled to room temperature and water (500 ml) was added and stirred for 1 h. The organic layer was separated off and the aqueous layer was washed with butanone (3×100 ml). The combined organic washings were dried (MgSO$_4$), the drying agent filtered off and the solvent removed in in vacuo to yield a yellow oil. Methanol (200 ml) was added to the oil with stirring and the solution was rapidly cooled until colourless crystals started to form. The mixture was then left at −5° C. for 14 h. The resulting colourless crystals were filtered off and dried in vacuo (P$_2$O$_5$). Yield 56.20 g (96%), mp 33.2–34.6° C.

$^1$Hnmr (CDCl$_3$) δ 5.05 (2H, s), 6.69 (1H, ddd, $J_1$=10 Hz, $J_2$=8 Hz, $J_3$=4 Hz), 6.77 (1H, dd, $J_1$=8 Hz, $J_2$=4 Hz), 7.30 (6H, m). IR (KBr) $\nu_{max}$ 650, 690, 730, 760, 830, 960, 1000, 1170, 1240, 1260, 1315, 1410, 1480,1580, 1600 cm$^{-1}$. Ms m/z 282, 280 (M$^+$), 191, 189, 91 (100%), 65.

PREPARATION 3.3

Synthesis of 4-Benzyloxy-2-fluorobenzonitrile (21)

Compound 20 (10.00 g, 35.7 mmol) and cuprous cyanide (13.00 , 71.4 mmol) were suspended in 1-methyl-2-pyrollidinone (250 ml) and heated under reflux for 24 h. The reaction mixture was cooled to room temperature and filtered through 'hyflo' to remove the excess cuprous cyanide. Water (200 ml) was added to the solution which was subsequently washed with ether (2×400 ml). The combined ether extracts were then washed with water (2×500 ml) and brine (500 ml) and then dried (MgSO$_4$). The drying agent was filtered off and the solvent removed in vacuo to yield an off-white solid which was purified by column chromatography (dichloromethane) on silica to yield colourless crystals. Yield 5.79 g (71%).

$^1$Hnmr (CDCl$_3$) δ 5.10 (2H, s), 6.79 (1H, dd, $J_1$=2 Hz, $J_2$=12 Hz), 6.83 (1H, ddd, $J_1$=9 Hz, $J_2$=2 Hz, $J_3$=0.5 Hz), 7.39 (5H, m), 7.52 (1H, dd, $J_1$=9 Hz, $J_2$=6 Hz). Ms m/z 227 (M$^+$), 156, 91 (100%), 65.

PREPARATION 3.4

Synthesis of 4-Benzyloxy-2-fluorobenzoic acid (22)

Compound 21 (5.70 g, 25 mmol) suspended in a 2.5M sodium hydroxide solution [10.00 g in water (100 ml)] and heated under reflux for 60 h. The solution was then acidified with conc. hydrochloric acid and the solution was then extracted with ether (2×100 ml). The carboxylic acid was then extracted with a saturated sodium bicarbonate solution (200 ml) and the alkaline extract was acidified with conc. hydrochloric acid. The solution was then washed with ether (400 ml) and the organic washings were washed with brine (2×200 ml) and dried (Na$_2$SO$_4$). The drying agent was filtered off and the solvent removed in vacuo to yield a colourless solid which was recrystallised from cyclohexane and ethyl acetate. Yield 3.85 g (58%).

$^1$Hnmr (CDCl$_3$) δ 5.10 (2H, s), 7.40 (5H, m), 7.74 (1H, dd, $J_1$=8 Hz, $J_2$=1 Hz), 7.79 (1H, dd, $J_1$=8 Hz, $J_2$=1 Hz), 7.91 (1H, t), acidic proton was not detected. IR (KBr) $\nu_{max}$ 650, 740, 840, 900, 1020, 1050, 1240, 1270, 1340, 1410, 1440, 1500, 1610, 1700, 2920 cm$^{-1}$. Ms m/z 246 (M$^+$), 229, 139, 127, 91 (100%), 65.

PREPARATION 3.5

Synthesis of (R)-(−)-1-Methyheptyl 4-Benzyloxy-2-fluorobenzoate (23)

Triphenylphosphine (9.24 g, 35 mmol) in THF (40 ml) was added dropwise to a stirred solution of compound 11 (8.00 g, 33 mmol), (S)-(+)-octan-2-ol (4.29 g, 33 mmol) and diethyl azodicarboxylate (5.74 g, 33 mmol) in THF (150 ml). The reaction solution was left stirring under nitrogen until completion [reaction monitored by TLC (dichloromethane, silica)]. Upon completion, the solvent was removed in vacuo to yield a colourless solid which was purified by column chromatography (dichloromethane) on silica to yield a colourless oil. Yield 8.20 g (69%), [α]$_D$=−25.32° at 24° C.

$^1$Hnmr (CDCl$_3$) δ 0.82 (3H, t), 1.26 (8H, m), 1.31 (3H, t), 1.57 (1H, m), 1.70 (1H, m), 5.04 (2H, s), 5.11 (1H, sext), 6.68 (1H, dd, $J_1$=8 Hz, $J_2$=2 Hz), 6.77 (1H, dd, $J_1$=8 Hz, $J_2$=2 Hz), 7.36 (5H, m), 7.86 (1H, t). IR (neat) $\nu_{max}$ 700, 740, 820, 890, 1025, 1090, 1120, 1140, 1170, 1265, 1280, 1380, 1440, 1450, 1500, 1580, 1620, 1710, 2860, 2930, 2960 cm$^{-1}$. Ms m/z 358 (M$^+$), 338, 229, 138, 110, 91 (100%).

PREPARATION 3.6

Synthesis of (R)-(+)-2-Methylbutyl 4-Benzyloxy-2-fluorobenzoate (24)

The experimental procedure followed was the same as for the preparation of compound 23. The following quantities were used:

Compound 22 8.00 g, 33 mmol; (S)-(−)-2-methylbutan-1-ol, 2.90 g, 33 mmol; diethyl azodicarboxylate, 5.74 g, 33 mmol; triphenylphosphine in THF, 9.24 g, 35 mmol in 40 ml; THF, 150 ml. Yield 9.67 g (93%), [α]$_D$=+3.58° at 24° C.

$^1$Hnmr (CDCl$_3$) δ 0.94 (3H, t), 1.00 (3H, d), 1.26 (1H, sext), 1.52 (1H, sext), 1.83 (1H, sext), 4.14 (2H, m), 5.10 (2H, s), 6.70 (1H, dd, $J_1$=8 Hz, $J_2$=2 Hz), 6.78 (1H, dd, $J_1$=8 Hz, $J_2$=2 Hz), 7.37 (5H, m), 7.90 (1H, t). IR (neat) $\nu_{max}$ 700, 740, 840, 910, 1000, 1140, 1175, 1265, 1280, 1500, 1580, 1620, 1710, 2880, 2940, 2960 cm$^{-1}$. Ms m/z 316 (M$^+$), 246, 199, 183, 110, 91 (100%), 65.

PREPARATION 3.7

Synthesis of 1-Propylbutyl 4-Benzyloxy-2-fluorobenzoate (25)

The experimental procedure followed was the same as for the preparation of compound 23. The following quantities were used:

Compound 22 9.95 g, 40 mmol; heptan-4-ol, 4.64 g, 40 mmol; diethyl azodicarboxylate, 6.96 g, 40 mmol;

triphenylphosphine in THF, 11.53 g, 44 mmol in 40 ml; THF, 150 ml.

Yield 4.92 g (40%). $^1$Hnmr (CDCl$_3$) δ 0.93 (6H, t), 1.38 (4H, m), 1.62 (4H, m), 5.08 (2H, s), 5.15 (1H, sept), 70 (1H, dd, J$_1$=8 Hz, J$_2$=2 Hz), 6.78 (1H, dd, J$_1$=8 Hz, J$_2$=2 Hz, 7.37 (5H, m), 7.89 (1 H, t). IR (neat) ν$_{max}$ 700, 740, 840, 900, 1030, 1090, 1130, 1150, 1170, 1270, 1280, 1440, 1505, 1580, 1620, 1710, 2880, 2940, 2960 cm$^{-1}$. Ms m/z 344 (M$^+$), 247, 229, 91 (100%), 65.

PREPARATION 3.8

Synthesis of (R)-(−)-1-Methylheptyl 4-Hydroxy-2-fluorobenzoate (26)

10% Palladium on charcoal (0.3 g), was added to a solution of compound 23 (8.20 g, 23 mmol) in ethyl acetate (200 ml). The solution was evacuated and left stirring with hydrogen at atmospheric pressure for 24 h. The catalyst was filtered off and the solvent removed in vacuo to yield a yellow oil which was purified by column chromatography (dichloromethane) on silica to yield the pure colourless oil. Yield 4.68 g (76%). [α]$_D$=−28.39° at 25° C.

$^1$Hnmr (CDCl$_3$) δ 0.86 (3H, t), 1.25 (8H, m), 1.30 (3H, d), 1.70 (2H, m), 5.12 (1H, sext), 6.64 (1H, dd, J$_1$=8 Hz, J$_2$=2 Hz), 6.70 (1H, dd, J$_1$=8 Hz, J$_2$=2 Hz), 7.84 (1H, t), phenolic proton was not detected. IR (neat) ν$_{max}$ 775, 855, 920, 980, 1090, 1120, 1150, 1230, 1250, 1290, 1460, 1510, 1600, 1620, 1690, 2860, 2930, 3370 cm$^{-1}$. Ms m/z 268 (M$^+$), 157, 139 (100%), 112, 83, 55.

PREPARATION 3.9

Synthesis of (R)-(+)-2-Methylbutyl 4-Hydroxy-2-fluorobenzoate (27)

The experimental procedure followed was the same as for the preparation of compound 26. The following quantities were used:

Compound 24 9.67 g, 31 mmol; 10% palladium on charcoal 0.30 g; ethyl acetate 300 ml.

Yield 5.46 g (78%), [α]$_D$=+6.11° at 25° C. $^1$Hnmr (CDCl$_3$) δ 0.95 (3H, t), 1.02 (2H, d), 1.28 (1H, sept), 1.58 (1H, sept), 1.84 (1H, oct), 4.15 (2H, m), 5.90 (1H, broad), 6.62 (1H, dd, J$_1$=8 Hz, J$_2$=2 Hz), 6.67 (1H, dd, J$_1$=8 Hz, J$_2$=2 Hz), 7.86 (1H, t). IR (KBr) ν$_{max}$ 640, 765, 850, 940, 1020, 1095, 1140, 1225, 1250, 1300, 1320, 1375, 1390, 1460, 1510, 1595, 1620, 1680, 1700, 2880, 2900, 2940, 2960, 3370 cm$^{-1}$. Ms m/z 226 (M$^+$), 157, 139 (100%), 111, 83, 70.

PREPARATION 3.10

Synthesis of 1-Propylbutyl 4-Hydroxy-2-fluorobenzoate (28)

The experimental procedure followed was the same as for the preparation of compound 26. The following quantities were used:

Compound 25 4.92 g, 14 mmol; 10% palladium on charcoal 0.20 g; ethyl acetate 200 ml.

Yield 3.49 g (98%). $^1$Hnmr (CDCl$_3$) δ 0.90 (6H, t), 1.39 (4H, m), 1.69 (4H, m), 5.14 (1H, sept), 6.64 (1H, dd, J$_1$=8 Hz, J$_2$=2Hz), 6.65 (1H, dd, J$_1$=8 Hz, J$_2$=2 Hz), 7.84 (1H, t). IR (KBr) ν$_{max}$ 620, 690, 770, 850, 975, 1100, 1140, 1250, 1300, 1330, 1470, 1510, 1620, 1670, 1690, 2880, 2940, 2960, 3330 cm$^{-1}$. Ms m/z 254 (M$^+$), 157, 139 (100%), 98, 83, 56.

EXAMPLE 4

Preparation of 4'-[6-(3-Methyloxetan-3-yl)methoxy]hexyloxybiphenyl-4-carboxylic Acid (42), 4'-[10-(3-Methyloxetan-3-yl)methoxy]decyloxybiphenyl-4-carboxylic Acid (43), and 4'-[11-(3-Methyloxetan-3-yl)methoxy]undecyloxybiphenyl-4-carboxylic Acid (44)

Figure 1D:
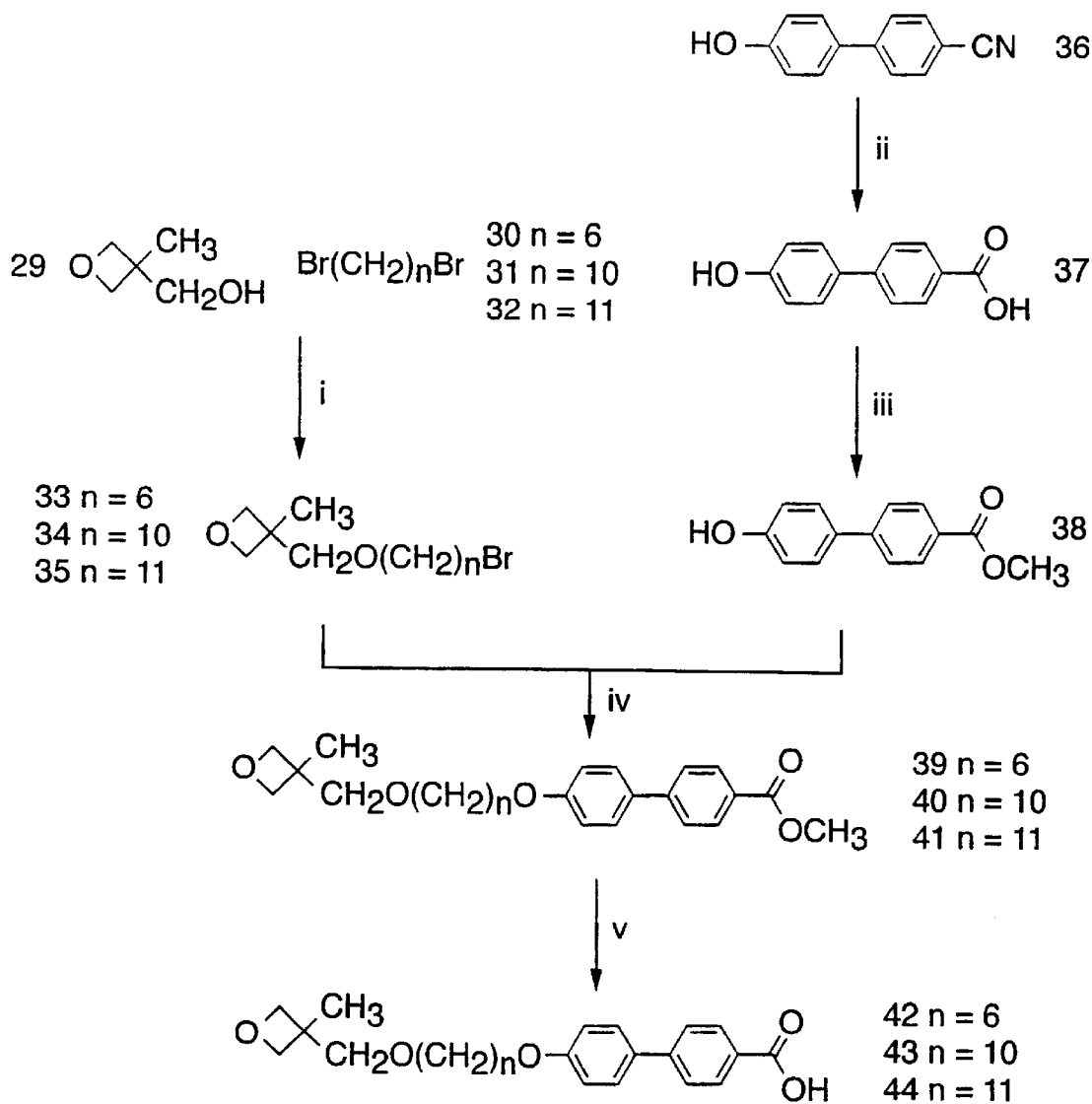
Figure 1E:
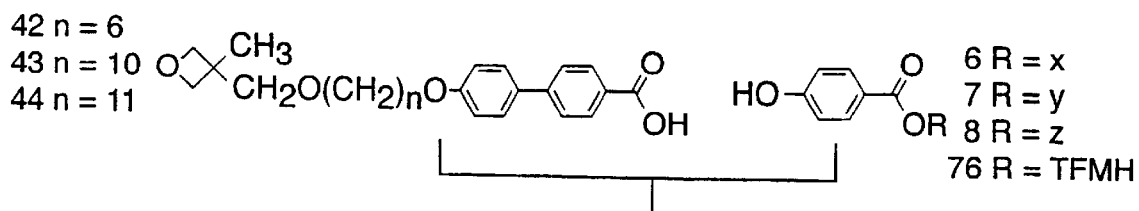
Figure 1E:
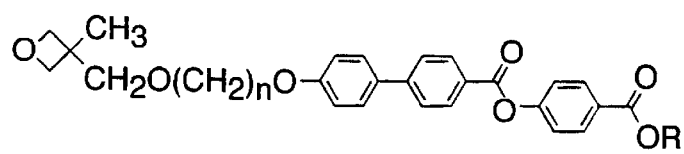
Figure 1F:
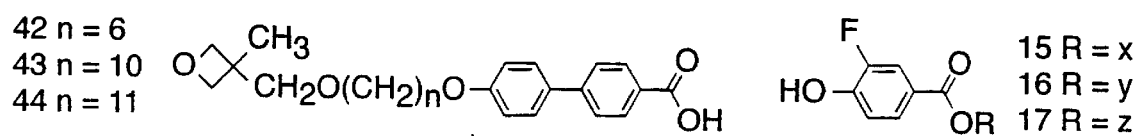
Figure 1F:
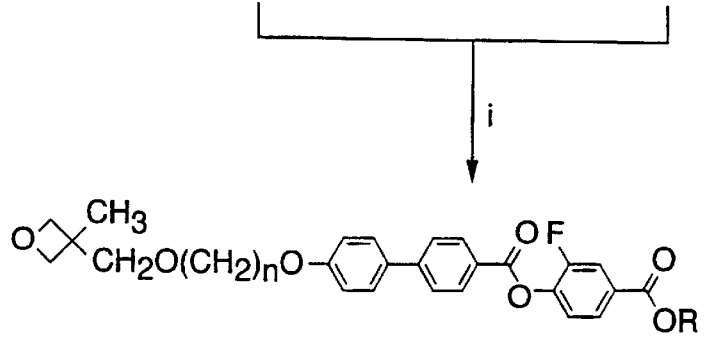
Figure 1G:
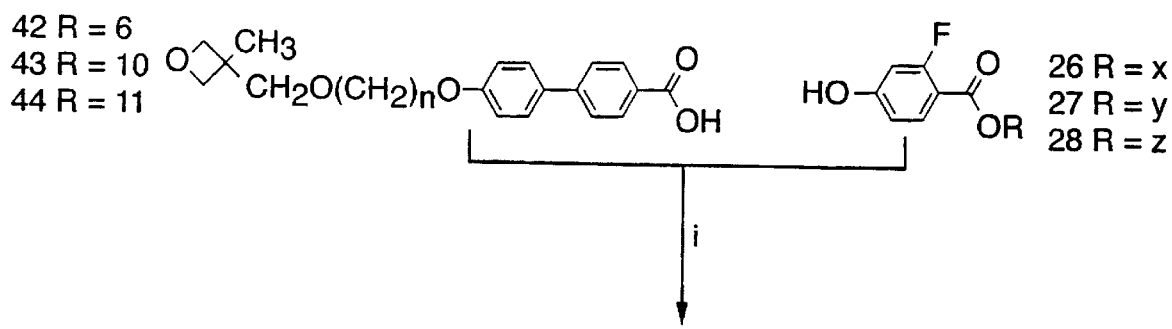
Figure 1G:
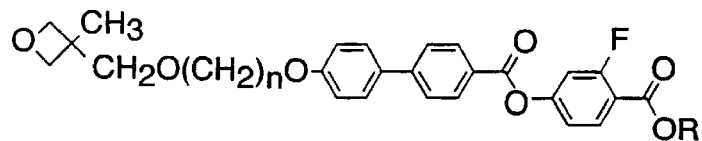
Figure 1H:
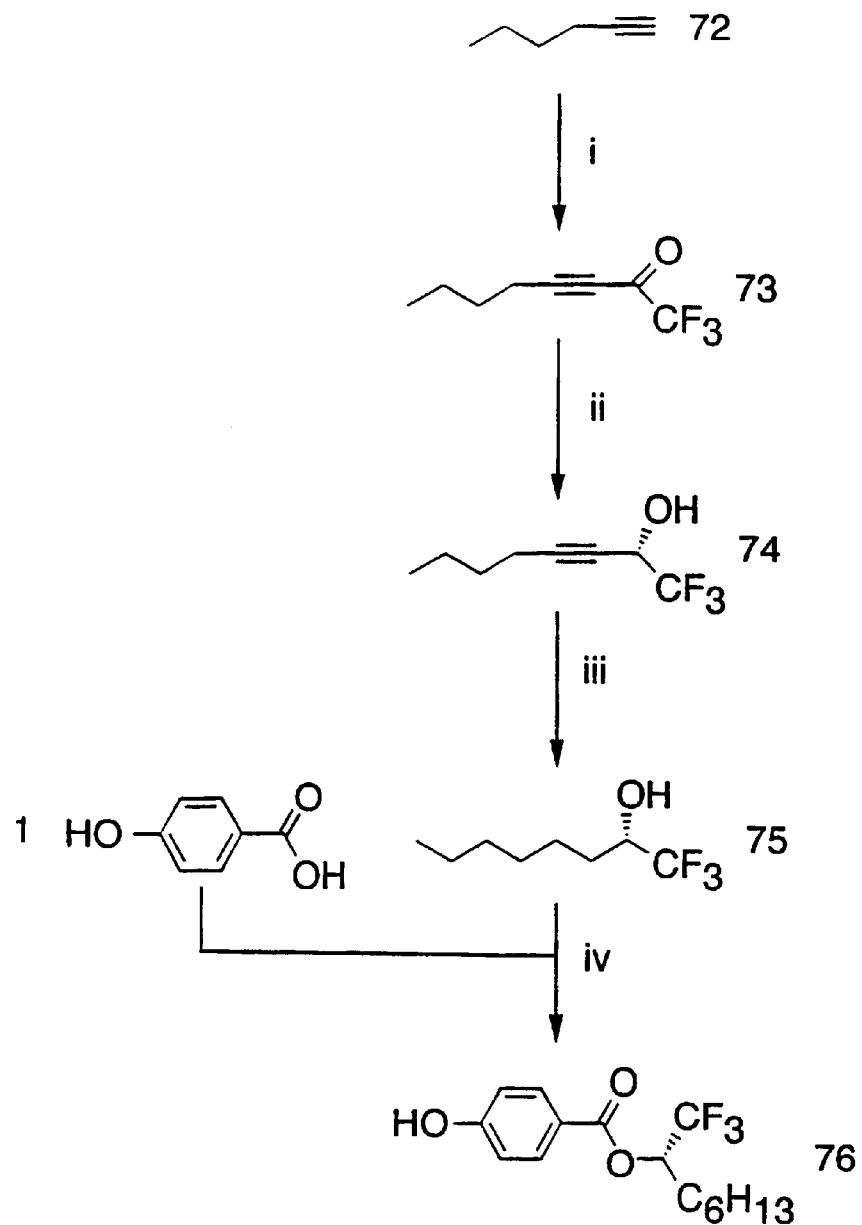
Figure 1I:
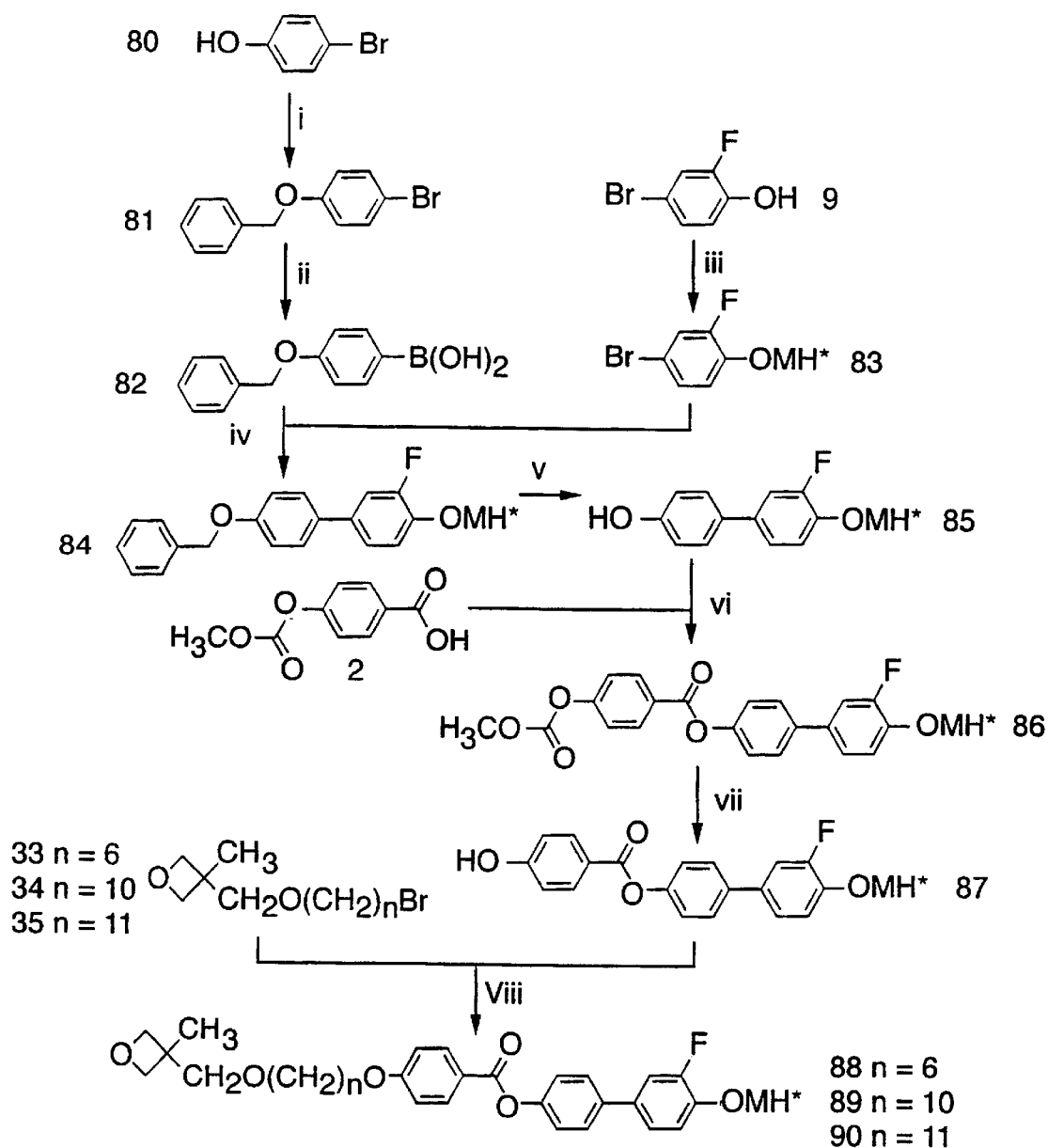
Figure 2A:
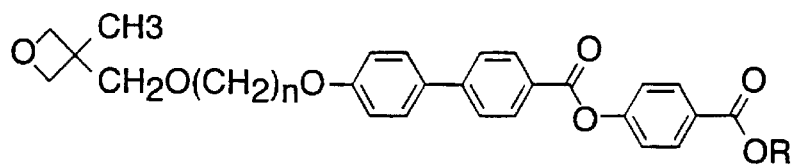
Figure 2A:
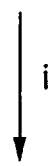
Figure 2A:
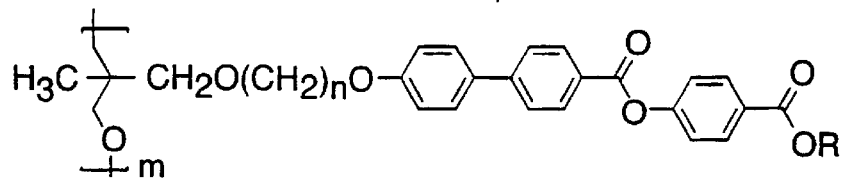
Figure 2B:
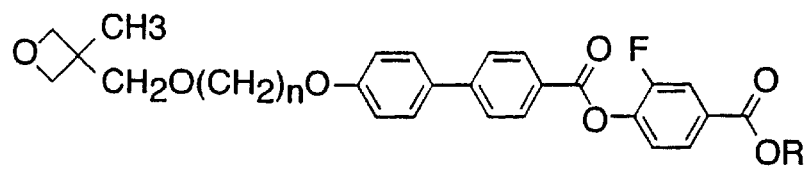
Figure 2B:
Figure 2B:
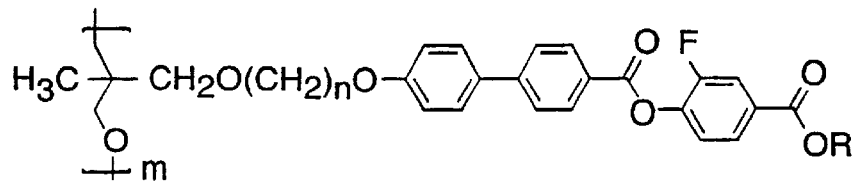
Figure 2C:
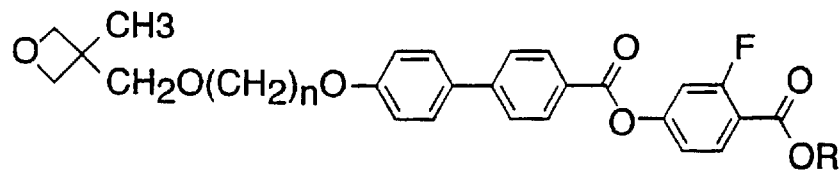
Figure 2C:
Figure 2C:
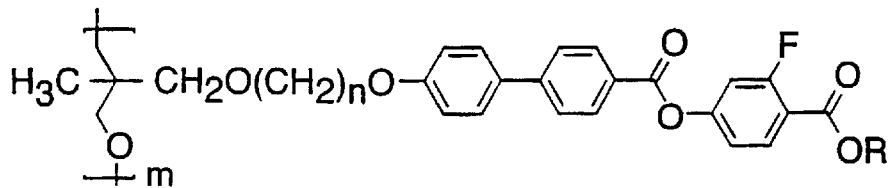
Figure 2D:
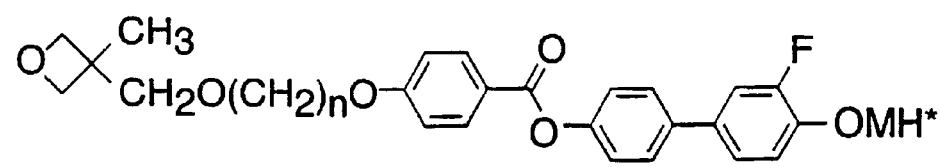
Figure 2D:
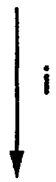
Figure 2D:
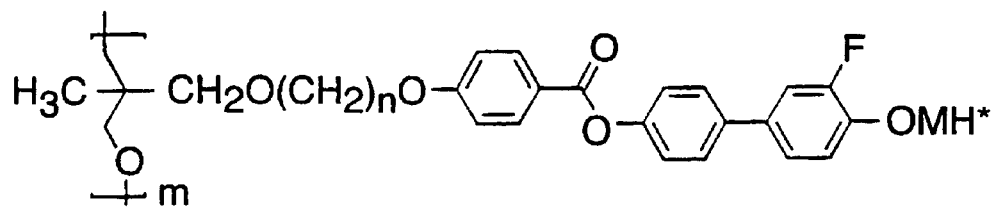

This example is illustrated by FIG. 1(d).

PREPARATION 4.1

Synthesis of 3-(Hydroxymethyl)-3-methyl Oxetane (29)

A mixture of tris(hydroxymethyl)ethane (60.0 g, 0.5 mol), diethyl carbonate (59.0 g, 0.5 mol) and potassium hydroxide (0.5 g in 5 ml of ethanol) was heated under reflux under nitrogen. Ethanol was then distilled off (80–140° C., 680 mm Hg). The pressure was then reduced to 50 mm Hg and the temperature slowly raised until a distillate came over at 120–140° C. as a colourless liquid. Yield 20.0 g (40%), bp 120–140° C. at 50 mm Hg.

$^1$Hnmr (CDCl$_3$) δ 1.22 (3H, s), 3.58 (2H, s), 4.32 (2H, d, J=7 Hz), 4.48 (21H, d, J=7 Hz), 5.10 (1H, broad).

PREPARATION 4.2

Synthesis of 3-(6-Bromohexyloxymethyl)-3-methyloxetane (33)

A 50% aqueous sodium hydroxide solution (65.0 g), tetrabutylammonium bromide (0.8 g, 2.5 mmol) and hexane (200 ml) were cooled with stirring in an ice bath. Compound 29 (16.32 g, 0.16 mol) and 1,6-dibromohexane (30) (100.00 g, 0.41 mol) were added and the reaction was left stirring until it reached room temperature; the reaction mixture was then heated under reflux for 3 h and then cooled to below 5° C. Water (300 ml) was added and the organic layer was retained and dried (Na$_2$SO$_4$). The drying agent was filtered off and the solvent was removed in vacuo. The resulting oil was purified by column chromatography [dichloromethane:hexane (1:6), to remove excess dibromohexane, dichloromethane, to isolate the product and then ethyl acetate to obtain the doubly reacted product) on silica.

Yield 34.77 g (87%).

PREPARATION 4.3

Synthesis of 3-(10-Bromodecyloxymethyl)-3-methyloxetane (34)

The experimental procedure followed was the same as for the preparation of compound 33. The following quantities were used:

1,10-Dibromodecane (31) 113.92 g, 0.39 mol; compound 29 19.07 g, 0.19 mol; 50% aqueous sodium hydroxide solution 260.0 g; hexane 400 ml; tetrabutylammonuim bromide 3.04 g, 9.5 mmol. Yield 32.3 g (55%), bp 170° C. at 0.5 mm Hg.

$^1$Hnmr (CDCl$_3$) δ 1.35 (3H, s), 1.40 (12H, m), 1.57 (2H, quint), 1.85 (2H, quint), 3.41 (2H, t), 3.46 (2H, t), 3.47 (2H, s), 4.36 (2H, d, J=7 Hz), 4.51 (2H, d, J=7 Hz). IR (neat) ν$_{max}$ 830, 980, 1110, 2850, 2920 cm$^{-1}$. Ms m/z 304, 263, 177, 163, 83, 72 (100%), M$^+$ not seen.

PREPARATION 4.4

Synthesis of 3-(11-Bromoundecyloxymethyl)-3-methyloxetane (35)

The experimental procedure followed was the same as for the preparation of compound 33. The following quantities were used:

1,11-Dibromoundecane (32) 100.00 g, 0.32 mol; compound 29 13.77 g, 0.13 mol; 50% aqueous sodium hydroxide solution 195.00 g; hexane 300 ml; tetrabutylammonuim bromide 2.08 g, 6.5 mmol. Yield 55.36 g (81%), bp 175° C. at 0.5 mm Hg.

¹Hnmr (CDCl₃) δ 1.29 (14H, m), 1.31 (3H, s), 1.55 (2H, quint), 1.85 (2H, quint), 3.41 (2H, t), 3.47 (2H, t), 3.49 (2H, s), 4.36 (2H, d, J=7 Hz), 4.52 (2H, d, J=7 Hz). IR (neat) $v_{max}$ 830, 980, 1110, 2850, 2920 cm⁻¹. Ms m/z 290, 137, 97, 72, 55 (100%).

PREPARATION 4.5

Synthesis of 4'-Hydroxybiphenyl-4-carboxylic Acid (37)

Conc. sulphuric acid in water (1:1) (230 ml) was added dropwise to a stirred suspension of 4-cyano-4'-hydroxybiphenyl (36) (25.6 g, 131 mmol) and the suspension was heated under reflux for 48 h to produce a homogeneous solution. The solution was then cooled to room temperature and water (600 ml) was added to alive a white precipitate which was filtered off. The aqueous filtrate was then washed with diethyl ether (4×70 ml) and the combined ether washings were then washed with water until neutral and dried (MgSO₄). The drying agent was filtered off and the solvent was removed in vacuo. The combined solids from the filtration and the extractions were recrystallised (glacial acetic acid). Yield 28.0 g (99%), mp 295–297° C.

¹Hnmr (CDCl₃) δ 6.68 (2H, d), 7.58 (2H, d), 7.70 (2H, d), 7.95, (2H, d), 9.60 (1H, broad), 12.60 (1H, broad). IR (KBr) $v_{max}$ 830, 1190, 1320, 1490, 1530, 1590, 1600, 1670, 2530, 3400 cm⁻¹. Ms m/z 214(M⁺, 100%), 197, 169, 152, 141.

PREPARATION 4.6

Synthesis of Methyl 4'-Hydroxybiphenyl-4-carboxylate (38)

Compound 37 (20.0 g, 94.0 mmol) and conc. sulphuric acid (10.0 ml) were suspended in methanol (200 ml) and the solution was heated under reflux for 3 h and then cooled to room temperature. The resulting colourless crystals were filtered off and washed with cold methanol (50 ml) and dried (P₂O₅).

Yield 21.40 g (100%), mp 229–230° C. ¹Hnmr (CDCl₃) δ 3.90 (3H, s), 6.95 (2H, d), 7.45 (2H, d), 7.60 (2H, d), 8.05 (2H, d), phenolic OH not detected. IR (KBr) $v_{max}$ 830, 1445, 1490, 1580, 1600, 1670, 3400 cm⁻¹. Ms m/z 228 (M⁺), 186 (100%), 170, 165, 157.

PREPARATION 4.7

Synthesis of Methyl 4'-[6-(3-Methyloxetan-3-yl) methoxy]hexyloxybiphenyl-4-carboxylate (40)

Compound 33 (34.70 g, 0.13 mol), compound 38 (29.64 g, 0.13 mol), potassium carbonate (35.88 g, 0.26 mol) and potassium iodide (5.00 g, 0.03 mol) were dissolved in butanone (700 ml) and heated under reflux overnight. On completion of the reaction (analysis by TLC), the reaction solution was cooled to room temperature, poured into water (200 ml) and stirred for 2 h. The resulting colourless precipitate was filtered off, washed with water and dried in vacuo (P₂O₅). Yield 32.80 g (62%), mp 146–147.3° C.

¹Hnmr (CDCl₃) δ 1.32 (3H, s), 1.40–1.54 (4H, m), 1.62 (2H, quint), 1.82 (2H, quint), 3.46 (4H, s and t), 3.91 (3H, s), 3.99 (2H, d), 4.35 (2H, d, J=6 Hz), 4.51 (2H, d, J=6 Hz), 6.99 (2H, d, J=8 Hz), 7.56 (2H, d, J=8 Hz), 7.62 (2H, d, J=8 Hz), 8.08 (2H, d, J=8 Hz). IR (KBr) $v_{max}$ 830, 1110, 1200, 1250, 1290, 1490, 1525, 1600, 1710, 2860, 2940, 3400 cm⁻¹. Ms m/z 412 (M⁺), 228 (100%), 197, 139, 115, 83, 55.

PREPARATION 4.8

Synthesis of Methyl 4'-[10-(3-Methyloxetan-3-yl) methoxy]decyloxybiphenyl-4-carboxylate (40)

The experimental procedure followed was the same as for the preparation of compound 39. The following quantities were used:

Compound 34 32.30 g, 0.10 mol; compound 38 22.95 g, 0.10 mol; potassium carbonate 27.60 g, 0.20 mol; potassium iodide 3.32 g, 0.02 mol; butanone 600 ml. Yield 34.63 g (74%), mp 89.1° C.

¹Hnmr (CDCl₃) δ 1.34 (13H, m), 1.40–1.60 (4H, m and quint), 1.80 (2H, quint), 3.45 (4H, t and s), 3.94 (3H, s), 4.01 (2H, t), 4.35 (2H, d, J=7 Hz), 4.51 (2H, d, J=7 Hz), 6.99 (2H, d, J=7 Hz), 7.57 (2H, d, J=7 Hz), 7.62 (2H, d, J=7 Hz), 8.05 (2H, d, J=7 Hz). IR (KBr) $v_{max}$ 830, 1110, 1190, 1250, 1290, 1490, 1520, 1600, 1720, 2850, 2920, 3440 cm⁻¹. Ms m/z 468 (M⁺), 384, 228 (100%), 197, 152, 139.

PREPARATION 4.9

Synthesis of Methyl 4'-[11-(3-Methyloxetan-3-yl) methoxy]undecyloxybiphenyl-4-carboxylate (41)

The experimental procedure followed was the same as for the preparation of compound 39. The following quantities were used:

Compound 35 35.30 g, 0.11 mol; compound 38 23.94 g, 0.11 mol; potassium carbonate 30.36 g, 0.22 mol; potassium iodide 3.65 g, 22 mmol; butanone 700 ml. Yield 47.72 g (90%), mp 83.3–85.4° C.

¹Hnmr (CDCl₃) δ 1.24–1.51 (17H, m), 1.58 (2H, quint), 1.81 (2H, quint), 3.45 (2H, t), 3.47 (2H, s), 3.93 (3H, s), 4.01 (2H, t), 4.36 (2H, d, J=6 Hz), 4.51 (2H, d, J=6 Hz), 6.99 (2H, d, J=8 Hz), 7.56 (2H, d, J=8 Hz), 7.61 (2H, d, J=8 Hz), 8.08 (2H, d, J=8 Hz). IR (KBr) $v_{max}$ 830, 1110, 1190, 1250, 1285, 1430, 1525, 1600, 1720, 2840, 2920, 3400 cm⁻¹. Ms m/z 482 (M⁺), 256 228 (100%), 197, 169, 69, 55.

PREPARATION 4.10

Synthesis of 4'-[6-(3-Methyloxetan-3-yl)methoxy] hexyloxybiphenyl-4-carboxylic Acid (42)

10M Sodium hydroxide (30 ml) was added to a solution of compound 39 (32.80 g, 0.08 mol) in ethanol and water (1:5) (1600 ml) and the mixture was heated under reflux for 1 h. The reaction mixture was cooled in an ice-salt bath and 2M hydrochloric acid was slowly added until the solution became slightly acidic (pH 6) and the solution was left to stir for 1 h. The colourless solid formed was filtered off and washed with copious amounts of water until the washings were neutral and dried (P₂O₅). Yield 27.00 g (84%), mp 155–155.4° C.

¹Hnmr (CDCl₃) δ 1.32 (3H, s), 1.48 (4H, m), 1.64 (2H, quint), 1.84 (2H, quint), 3.48 (4H, s and t), 3.99 (2H, t), 4.37 (2H, d, J=6 Hz), 4.53 (2H, d, J=6 Hz), 6.98 (2H, d, J=8 Hz), 7.58 (2H, d, J=8 Hz), 7.64 (2H, d, J=8 Hz), 8.14 (2H, d, J=8 Hz), acidic proton not observed. IR (KBr) $v_{max}$ 830, 940, 1110, 1190, 1250, 1290, 1430, 1490, 1520, 1600, 1670, 1700, 2860, 2940, 3430 cm⁻¹. Ms m/z 398 (M⁺), 228, 214 (100%), 197, 83, 55.

PREPARATION 4.11

Synthesis of 4'-[10-(3-Methyloxetan-3-yl)methoxy] decyloxybiphenyl-4-carboxylic Acid (43)

The experimental procedure followed was the same as for the preparation of compound 42. The following quantities were used:

Compound 40 32.00 g, 0.07 mol; 10M sodium hydroxide 30 ml; ethanol and water (1:5) 1500 ml. Yield 0.24.15 g (76%), mp 272° C.

¹Hnmr (CDCl₃) δ 1.25 (15H, m), 1.50 (2H, quint), 1.72 (2H, quint, and t), 3.38 (5H, s and t), 3.91 (2H, t), 4.24 (2H, d, J=6

Hz), 4.40 (2H, d, J=6 Hz), 6.90 (2H, d, J=8 Hz), 7.48 (2H, d, J=8 Hz), 7.54 (2H, d, J=8 Hz), 8.00 (2H, d, J=8 Hz). IR (neat) $v_{max}$ 830, 1110, 1190, 1250, 1290, 1490, 1520, 1600, 1670, 2850, 2920, 3450 cm$^{-1}$. Ms m/z 454 (M$^+$), 370, 228, 214 (100%), 197, 83.

PREPARATION 4.12

Synthesis of 4'-[11-(3-Methyloxetan-3-yl)methoxy] undecyloxybiphenyl-4-carboxylic Acid (44)

The experimental procedure followed was the same as for the preparation of compound 42. The following quantities were used:

Compound 41 47.72 g, 0.10 mol; 10M sodium hydroxide 30 ml; ethanol and water (1:5) 1500 ml. Yield 42.12 g (90%), mp 149–150.4° C.

$^1$Hnmr (CDCl$_3$) δ 1.20–1.51 (17H, m), 1.57 (2H, quint), 1.81 (2H, quint), 3.46 (2H, t), 3.48 (2H, s), 4.01 (2H, t), 4.36 (2H, d, J=6 Hz), 4.51 (2H, d, J=6 Hz), 6.99 (2H, d, J=8 Hz), 7.56 (2H, d, J=8 Hz), 7.61 (2H, d, J=8 Hz), 8.08 (2H, d, J=8 Hz), acidic proton not observed. IR (KBr) $v_{max}$ 830, 1110, 1190, 1250, 1290, 1430, 1490, 1520, 1600, 1720, 2850, 2920, 3450 cm$^{-1}$. Ms m/z 469 (M$^+$), 386, 214 (100%), 197, 69, 55.

EXAMPLE 5

Preparation of (R)-(−)-4-(1-Methylheptyloxycarbonyl)phenyl 4'-[6-(3-Methyloxetan-3-yl)methoxy]hexyloxybiphenyl-4-carboxylate (45), (R)-(+)4-(2-Methylbutyloxycarbonyl)phenyl 4'-[6-(Methyloxetan-3-yl)methoxy]hexyloxybiphenyl-4-carboxylate (46), 4-(1-Propylbutyloxycarbonyl)phenyl 4'-[6-(3-Methyloxetan-3-yl)methoxy]hexyloxybiphenyl-4-carboxylate (47), (R)-(−)-4-(1-Methylheptyloxycarbonyl)phenyl 4'-[10-(3-Methyloxetan-3-yl)methoxy]decyloxybiphenyl-4-carboxylate (48), (R)-(+)-4-(2-Methylbutyloxycarbonyl)phenyl 4'-[10-(3Methyloxetan-3-yl)methoxy]decyloxybiphenyl-4-carboxylate (49), 4-(1-Propylbutyloxycarbonyl)phenyl 4'-[10-(3-Methyloxetan-3-yl)methoxy]decyloxybiphenyl-4-carboxylate (50), (R)-(−)-4-(1-Methylheptyloxycarbonyl)phenyl 4'-[11-(3-Methyloxetan-3-yl)methoxy]undecyloxybiphenyl-4-carboxylate (51), (R)-(+)-4-(2-Methylbutyloxycarbonyl)phenyl 4'-[11-(3-Methyloxetan-3-yl)methoxy]undecyloxybiphenyl-4-carboxylate (52), and and 4-(1-Propylbutyloxycarbonyl)phenyl 4'-[11-(methyloxetan-3-yl)methoxy]undecyloxybiphenyl-4-carboxylate (53) (S)-(−)4-(1-Trifluoromethylheptyloxycarbonyl)phenyl 4'-[6-(3-Methyloxetan-3-ylmethoxy)hexyloxy]biphenyl-4-carboxylate (77) (S)-(−)-4-(1-Trifluoromethylheptyloxycarbonyl)phenyl 4'-[10-(3-Methyloxetan-3-ylmethoxy)decyloxy]biphenyl-4-carboxylate (78) (S)-(−)-4-(1-Trifluoromethylheptyloxycarbonyl)phenyl 4'-[11-(3-Methyloxetan-3-ylmethoxy)undecyloxy]biphenyl-4-carboxylate (79)

This example is illustrated in FIGS. 1. The compounds prepared in this example were characterised by standard techniques and the results are shown in tables 1. Tables 1 shows the molecular weights and transition temperatures for these compounds.

PREPARATION 5.01

Synthesis of (R)-(−)-4-(1-Methylheptyloxycarbonyl) phenyl 4'-[6-(3-Methyloxetan-3-yl)methoxy] hexyloxybiphenyl-4-carboxylate (45)

N,N'-Dicyclohexylcarbodiimide (1.31 g, 6.3 mmol) and 4-(dimethylamino)pyridine (0.10 g, 0.1 mmol) was added to a stirred solution of compound 42 (2.53 g, 6.3 mmol) and compound 6 (1.59 g, 6.3 mmol) in dichloromethane. The reaction mixture was left stirring at room temperature for 48 h until completion of the reaction. The dicyclohexylurea formed was filtered off and the solvent removed in vacuo to yield a viscous colourless oil which was purified by column chromatography (ethyl acetate) on silica. The colourless material was then heated in ethanol and cooled to 0°, filtered off and dried in vacuo (P$_2$O$_5$). Yield 1.47 g (38%), [α]$_D$=−11.3° at 23° C.

$^1$Hnmr (CDCl$_3$) δ 0.98 (3H, t), 1.23–1.52 (20H, m), 1.63 (4H, quint), 1.83 (2H, quint), 3.48 (2H, s), 3.49 (2H, t), 4.03 (2H, t), 4.37 (2H, d, J=6 Hz), 4.53 (2H, d, J=6 Hz), 5.18 (1H, sext), 7.01 (2H, d, J=8 Hz), 7.32 (2H, d, J=8 Hz), 7.59 (2H, d, J=8 Hz), 7.68 (2H, d, J=8 Hz), 8.12 (2H, d, J=8 Hz), 8.22 (2H, d, J=8 Hz). IR (neat) $v_{max}$ 760, 830, 1065, 1110, 1190, 1270, 1455, 1500, 1520, 1600, 1705, 1730, 2860, 2930 cm$^{-1}$. Ms m/z 630 (M$^+$), 382, 242, 229, 197 (100%), 152, 55.

PREPARATION 5.02

Synthesis of (R)-(+)-4-(2-Methylbutyloxycarbonyl) phenyl 4'-[6-(methyloxetan-3-yl)methoxy] hexyloxybiphenyl4-carboxylate (46)

The experimental procedure followed was the same as for the preparation of compound 45. The following quantities were used:

Compound 42 1.35 g, 3.4 mmol; compound 7 0.71 g, 3.4 mmol; N,N'-Dicyclohexylcarbodiimide 0.71 g, 3.4 mmol; 4-(dimethylamino)pyridine (0.10 g, 0.1 mmol): dichloromethane 50 ml. Yield 1.10 g (55%), [α]$_D$=+3.9° at 23° C.

$^1$Hnmr (CDCl$_3$) δ 0.97 (3H, t), 1.03 (3H, d), 1.32 (3H, s), 1.40–1.70 (8H, m), 1.85 (3H, quint), 3.47 (2H, s), 3.48 (2H, t), 4.01 (2H, t), 4.19 (2H, m), 4.35 (2H, d, J=6 Hz), 4.51 (2H, d, J=6 Hz), 7.00 (2H, d, J=8 Hz), 7.32 (2H, d, J=8 Hz), 7.61 (2H, d, J=8 Hz), 7.70 (2H, d, J=8 Hz), 8.17 (2H, d, J=8 Hz), 8.24 (2H, d, J=8 Hz). IR (neat) $v_{max}$ 765, 830, 1065, 1110, 1160, 1190, 1270, 1460, 1500, 1600, 1710, 1730, 2860, 2930 cm$^{-1}$. Ms m/z 588 (M$^+$), 382, 280, 228, 197 (100%), 152, 139.

PREPARATION 5.03

Synthesis of 4-(1-Propylbutyloxycarbonyl)phenyl 4'-[6-(3-Methyloxetan-3-yl)methoxy] hexyloxybiphenyl-4-carboxylate (47)

The experimental procedure followed was the same as for the preparation of compound 45. The following quantities were used:

Compound 42 2.59 g, 6.5 mmol; compound 8 1.53 g, 6.5 mmol; N,N'-Dicyclohexylcarbodiimide 1.35 g, 6.5 mmol; 4-(dimethylamino)pyridine (0.10 g, 0.1 mmol): dichloromethane 50 ml. Yield 2.76 g (69%).

$^1$Hnmr (CDCl$_3$) δ 0.94 (6H, t), 1.33 (3H, s), 1.34–1.72 (14H, m), 1.85 (2H, quint), 3.49 (2H, s), 3.50 (2H, t), 4.04 (2H, t), 4.37 (2H, d, J=6 Hz), 4.52 (2H, d, J=6 Hz), 5.18 (1H, sept), 7.01 (2H, d, J=8 Hz), 7.31 (2H, d, J=8 Hz), 7.62 (2H, d, J=8 Hz), 7.71 (2H, d, J=8 Hz), 8.14 (2H, d, J=8 Hz), 8.24

(2H, d, J=8 Hz). IR (neat) $v_{max}$ 765, 830, 1065, 1110, 1160, 1185, 1260, 1495, 1530, 1600, 1710, 1730, 2860, 2930 cm$^{-1}$. Ms m/z 616 (M$^+$), 382 (100%), 352, 279, 197, 139, 55.

PREPARATION 5.04

Synthesis of (R)-(–)-4-(1-Methylheptyloxycarbonyl)phenyl 4'-[10-(3-Methyloxetan-3'-yl)methoxy]decyloxybiphenyl-4-carboxylate (48)

The experimental procedure followed was the same as for the preparation of compound 45. The following quantities were used:

Compound 43 1.31 g, 2.9 mmol; compound 6 0.73 g, 2.9 mmol: N,N'-Dicyclohexylcarbodiimide 0.60 g, 2.9 mmol, 4-(dimethylamino)pyridine (0.10 g, 0.1 mmol): dichloromethane 50 ml.
Yield 1.42 g (71%), $[\alpha]_D$=–16.65° at 24° C.
$^1$Hnmr (CDCl$_3$) δ 0.89 (3H, t), 1.32 (28H, m), 1.60 (2H, sext), 1.81 (2H, sext), 3.47 (2H, s), 3.48 (2H, t), 4.02 (2H, t), 4.36 (2H, d, J=6 Hz), 4.52 (2H, d, J=6 Hz), 5.18 (1H, sext), 7.01 (2H, d, J=8 Hz), 7.32 (2H, d, J=8 Hz), 7.60 (2H, d, J=8 Hz), 7.70 (2H, d, J=8 Hz), 8.14 (2H, d, J=8 Hz), 8.22 (2H, d, J=8 Hz). IR (neat) $v_{max}$ 760, 830, 880, 980, 1060, 1110, 1160, 1190, 1265, 1410, 1490, 1520, 1600, 1700, 1730, 2850, 2920 cm$^{-1}$. Ms m/z 686 (M$^+$), 437 (100%), 335, 197, 83, 55.

PREPARATION 5.05

Synthesis of (R)-(+)-4-(2-Methylbutyloxycarbonyl)phenyl 4'-[10-(3Methyloxetan-3'-yl)methoxy]decyloxybiphenyl-4-carboxylate (49)

The experimental procedure followed was the same as for the preparation of compound 45. The following quantities were used:

Compound 43 1.40 g, 3.1 mmol; compound 7 0.64 g, 3.1 mmol; N,N'-Dicyclohexylcarbodiimide 0.64 g, 3.1 mmol; 4-(dimethylamino)pyridine (0.10 g, 0.1 mmol): dichloromethane 50 ml. Yield 1.35 g (68%), $[\alpha]_D$=+2.2° at 24° C.
$^1$Hnmr (CDCl$_3$) δ 0.98 (3H, t), 1.05 (3H, d), 1.35 (131, m), 1.52 (6H, m), 1.82 (2H, sext), 1.87 (1H, sept), 3.47 (2H, s), 3.48 (2H, t), 4.03 (2H, t), 4.19 (2H, m), 4.35 (2H, d, J=6 Hz), 4.51 (2H, d, J=6 Hz), 7.00 (2H, d, J=8 Hz), 7.32 (2H, d, J=8 Hz), 7.60 (2H, d, J=8 Hz), 7.70 (2H, d, J=8 Hz), 8.14 (2H, d, J=8 Hz), 8.24 (2H, d, J=8 Hz). IR (neat) $v_{max}$ 760, 830, 980, 1010, 1060, 1110, 1160, 1190, 1270, 1460, 1500, 1600, 1710, 1730, 2850, 2920 cm$^{-1}$. Ms m/z 644 (M$^+$), 437, 335, 197 (100%), 121, 43.

PREPARATION 5.06

Synthesis of 4-(1-Propylbutyloxycarbonyl)phenyl 4'-[10-(3-Methyloxetan-3-yl)methoxy]decyloxybiphenyl-4-carboxylate (50)

The experimental procedure followed was the same as for the preparation of compound 45. The following quantities were used:

Compound 43 1.32 g, 2.9 mmol; compound 8 0.68 g, 2.9 mmol; N,N'-Dicyclohexylcarbodiimide 0.60 g, 2.9 mmol; 4-(dimethylamino)pyridine (0.10 g, 0.1 mmol): dichloromethane 50 ml. Yield 1.37 g (69%).
$^1$Hnmr (CDCl$_3$) δ 0.95 (6H, t), 1.15–1.50 (19H, m), 1.55–1.75 (6H, m), 1.82 (2H, sext), 3.50 (2H, t), 3.51 (2H, s), 4.04 (2H, t), 4.36 (2H, d, J=6 Hz), 4.50 (2H, d, J=6 Hz), 5.18 (1H, sept), 7.00 (2H, d, J=8 Hz), 7.32 (2H, d, J=8 Hz), 7.61 (2H, d, J=8 Hz), 7.70 (2H, d, J=8 Hz), 8.14 (2H, d, J=8 Hz), 8.24 (2H, d,=8 Hz). IR (neat) $v_{max}$ 760, 820, 890, 980, 1010, 1065, 1110, 1160, 1190, 1260, 1460, 1500, 1600, 1700, 1730, 2850, 2920 cm$^{-1}$. Ms m/z 672 (M$^+$), 535, 437 (100%), 335, 213, 197, 83.

PREPARATION 5.07

Synthesis of (R)-(–)-4-(1-Methylheptyloxycarbonyl)phenyl 4'-[11-(3-Methyloxetan-3-yl)methoxy]undecyloxybiphenyl-4-carboxylate (51)

The experimental procedure followed was the same as for the preparation of compound 45. The following quantities were used:

Compound 44 1.40 g, 3.0 mmol; compound 6 0.73 g, 3.0 mmol; N,N'-Dicyclohexylcarbodiimide 0.62 g, 3.0 mmol; 4-(dimethylamino)pyridine (0.10 g, 0.1 mmol): dichloromethane 50 ml. Yield 1.30 g (62%), $[\alpha]_D$=–15.3° at 25° C.
$^1$Hnmr (CDCl$_3$) δ 0.88 (3H, t), 1.25–1.67 (32H, m), 1.82 (2H, sext), 3.45 (2H, s), 3.46 (2H, t), 4.02 (2H, t), 4.36 (2H, d, J=6 Hz), 4.51 (2H, d, J=6 Hz), 5.15 (1H, sext). 7.01 (2H, d, J=8 Hz), 7.32 (2H, d, J=8 Hz), 7.60 (2H, d, J=8 Hz), 7.70 (2H, d, J=8 Hz), 8.12 (2H, d, J=8 Hz), 8.23 (2H, d, J=8 Hz). IR (neat) $v_{max}$ 830, 1070, 1110, 1160, 1190, 1260, 1280, 1410, 1490, 1510, 1540, 1600, 1710, 1730, 2850, 2920 cm$^{-1}$. Ms m/z 700 (M$^+$), 452, 350, 214, 197, 138, 121 (100%).

PREPARATION 5.08

Synthesis of (R)-(+)-4-(2-Methylbutyloxycarbonyl)phenyl 4'-[11-(3-Methyloxetan-3-yl)methoxy]undecyloxybiphenyl-4-carboxylate (52)

The experimental procedure followed was the same as for the preparation of compound 45. The following quantities were used:

Compound 44 1.64 g, 3.5 mmol; compound 7 0.73 g, 3.5 mmol; N,N'-Dicyclohexylcarbodiimide 0.72 g, 3.5 mmol; 4-(dimethylamino)pyridine (0.10 g, 0.1 mmol): dichloromethane 50 ml. Yield 1.28 g (56%), $[\alpha]_D$=+6.7° at 25° C.
$^1$Hnmr (CDCl$_3$) δ 0.97 (3H, t), 1.02 (3H, d), 1.25–1.40 (15H, m), 1.42–1.61 (6H, m), 1.82 (3H, m), 3.47 (2H, t), 3.48 (2H, s), 4.01 (2H, t), 4.19 (2H, m), 4.37 (2H, d, J=6 Hz), 4.51 (2H, d, J=6 Hz), 7.00 (2H, d, J=8 Hz), 7.31 (2H, d, J=8 Hz), 7.59 (2H, d, J=8 Hz), 7.69 (2H, d, J=8 Hz), 8.13 (2H, d, J=8 Hz), 8.24 (2H, d, J=8 Hz). IR(neat) $v_{max}$ 830, 1010, 1070, 1110, 1160, 1195, 1260, 1490, 1525, 1595, 1710, 1730, 2850, 2920 cm$^{-1}$. Ms m/z 658 (M$^+$), 451, 196, 138, 121 (100%), 93.

PREPARATION 5.09

Synthesis of 4-(1-Propylbutyloxycarbonyl)phenyl 4'-[11-(Methyloxetan-3-yl)methoxy]undecyloxybiphenyl-4-carboxylate (53)

The experimental procedure followed was the same as for the preparation of compound 45. The following quantities were used:

Compound 44 1.40 g, 3.0 mmol; compound 8 0.70 g, 3.0 mmol; N,N'-Dicyclohexylcarbodiimide 0.62 g, 3.0 mmol; 4-(dimethylamino)pyridine (0.10 g, 0.1 mmol): dichloromethane 50 ml. Yield 1.04 g (52%).
$^1$Hnmr (CDCl$_3$) δ 0.93 (6H, t), 1.27–1.71 (27H, m), 1.82 (2H, sext), 3.46 (2H, t), 3.48 (2H, s), 4.02 (2H, t), 4.36 (2H, d, J=6 Hz), 4.52 (2H, d, J=6 Hz), 5.18 (1H, sept), 7.01 (2H, d, J=8 Hz), 7.32 (2H, d, J=8 Hz), 7.60 (2H, d, J=8 Hz), 7.71 (2H, d, J=8 Hz), 8.13 (2H, d, J=8 Hz), 8.24 (2H, d, J=8 Hz). IR (neat) $v_{max}$ 825, 1010, 1075, 1110, 1160, 1190, 1260, 1270, 1490, 1600, 1710, 1730, 2850, 2920 cm$^{-1}$. Ms m/z 686 (M$^+$), 452 (100%), 350, 197, 141, 121.

PREPARATION 5.10

(S)-(-)-4-(1-Trifluoromethylheptyloxycarbonyl) phenyl 4'-[6-(3-Methyloxetan-3-ylmethoxy) hexyloxy]biphenyl-4-carboxylate (77)

The experimental procedure followed was the same as for the preparation of compound 45. The following quantities were used:

Compound 42 1.16 g, 2.92 mmol; compound 76 0.89 g, 2.92 mmol; N,N'-dicyclohexylcarbodiimide 0.60 g, 2.92 mmol; 4-(dimethylamino)pyridine 0.10 g, 0.10 mmol; dichloromethane 50 ml.

Yield 0.80 g (40%); $[\alpha]_D^{24}$=-31.8°, CHCl$_3$, SmC* 43.5 SmA* 59.3 Iso ° C. $^1$Hnmr (CDCl$_3$) δ 0.83 (3H, t, J 6), 1.23–1.37 (9H, m), 140–1.49 (4H, m), 1.50–1.54 (2H, m), 1.62 (2H, sext, J 6), 1.80 (2H, quint, J 6), 1.89 (2H, q, J 6), 3.43 (2H, s), 3.47 (2H, t, J 6), 4.00 (2H, t, J 6), 4.26 (2H, d, J 6), 4.43 (2H, d, J 6), 5.55 (1H, sext, J 7), 7.00 (2H, d, J 8), 7.32 (2H, d, J 8), 7.62 (2H, d, J 8), 7.72 (2H, d, J 8), 8.14 (2H, d, J 8), 8.20 (2H, d, J 8). IR (neat) $v_{max}$ 700, 723, 766, 833, 898, 980, 1013, 1114, 1180, 1258, 1362, 1504, 1603, 1705, 1738, 2864, 2930 cm$^{-1}$. Ms m/z 417, 381(100%), 351, 214, 196, 168, 138, 56, M$^+$ not observed.

PREPARATION 5.11

(S)-(-)-4-(1-Trifluoromethylheptyloxycarbonyl) phenyl 4'-[10-(3-methyloxetan-3-ylmethoxy) decyloxy]biphenyl-4-carboxylate (78)

The experimental procedure followed was the same as for the preparation of compound 45. The following quantities were used: compound 43 1.23 g, 2.70 mmol; compound 76 0.82 g, 2.70 mmol; N,N'-dicyclohexylcarbodiimide 0.56 g, 2.70 mmol; 4-(dimethylamino)pyridine 0.10 g, 0.10 mmol; dichloromethane 50 ml.

Yield 0.64 g (32%), $[\alpha]_D^{24}$=-37.7°, CHCl$_3$, K 28.8 (SmC* 19.6) Iso ° C. $^1$Hnmr (CDCl$_3$) δ 0.87 (3H, t, J 6), 1.28 (3H, s), 1.24–1.51 (20H, m), 1.58 (2H, quint, J 6), 1.81 (2H, quint, J 6), 1.89 (2H, quint, J 6), 3.45 (2H, t, J 6), 3.47 (2H, s), 4.02 (2H, t, J 6), 4.35 (2H, d, J 6), 4.51 (2H, d, J 6), 5.55 (1H, sext, J 7), 7.00 (2H, d, J 8), 7.32 (2H, d, J 8), 7.60 (2H, d, J 8), 7.70 (2H, d, J 8), 8.12 (2H, d, J 8), 8.23 (2H, d, J 8). IR (neat) $v_{max}$ 449, 693, 732, 764, 833, 888, 978, 1016, 1109, 1199, 1269, 1399, 1467, 1503, 1606, 1735, 1740, 2860, 2928 cm$^{-1}$. Ms m/z 740 (M$^+$), 557, 436 (100%), 351, 196, 138, 121, 55.

PREPARATION 5.12

(S)-(-)-4-(1-Trifluoromethylheptyloxycarbonyl) phenyl 4'-[11-(3-Methyloxetan-3-ylmethoxy) undecyloxy]biphenyl-4-carboxylate (79)

The experimental procedure followed was the same as for the preparation of compound 45. The following quantities were used:

Compound 44 1.23 g, 2.70 mmol; compound 76 0.82 g, 2.70 mmol; N,N'-dicyclohexylcarbodiimide 0.56 g, 2.70 mmol; 4-(dimethylamino)pyridine 0.10 g, 0.10 mmol; dichloromethane 50 ml.

Yield 1.68 g (84%); $[\alpha]_D^{24}$=-25.9°, CHCl$_3$, K 58.1 (SmC* 25.3) Iso ° C. $^1$Hnmr (CD$_2$Cl$_2$) δ 0.87 (3H, t, J 6), 1.23 (3H, s), 1.22–1.38 (20H, m), 1.40–1.50 (2H, m), 1.52–1.64 (2H, m), 1.82 (2H, quint, J 6), 1.93 (2H, quint, J 6), 3.43 (2H, s), 3.44 (2H, t, J 6), 4.01 (2H, t, J 6), 4.27 (2H, d, J 6), 4.45 (2H, d, J 6), 5.58 (1H, sext, J 7), 7.01 (2H, d, J 8), 7.37 (2H, d, J 8), 7.63 (2H, d, J 8), 7.74 (2H, d, J 8), 8.17 (2H, d, J 8), 8.23 (2H, d, J 8). IR (neat) $v_{max}$ 680, 720, 760, 820, 880, 970, 1010, 1070, 1100, 1180, 1260, 1460, 1500, 1600, 1730, 1740, 2840, 2920 cm$^{-1}$. Ms m/z 754 (M$^+$), 548, 451, 351, 196 (100%), 120, 69, 55.

EXAMPLE 6

Preparation of (R)-(-)-4-(1-Methylheptyloxycarbonyl)2-fluorophenyl 4'-[6-(3-Methyloxetan-3-yl)methoxy]hexyloxybiphenyl-4-carboxylate (54), (R)-(+)-4-(2-Methylbutyloxycarbonyl)2-fluorophenyl 4'-[6-(Methyloxetan-3-yl)methoxy]hexyloxybiphenyl-4-carboxylate (55), 4-(1-Propylbutyloxycarbonyl)2-fluorophenyl 4'-[6-(3-Methyloxetan-3-yl)methoxy]hexyloxybiphenyl-4-carboxylate (56), (R)-(+)-4-(2-Methylbutyloxycarbonyl)2-fluorophenyl 4'-[10-(3Methyloxetan-3-yl)methoxy]decyloxybiphenyl-4-carboxylate (58), 4-(1-Propylbutyloxycarbonyl)2-fluorophenyl 4'-[10-3-Methyloxetan-3-yl)methoxy]decyloxybiphenyl-4-carboxylate (59), (R)-(-)-4-(1-Methylheptyloxycarbonyl)2-fluorophenyl 4'-[11-(3-Methyloxetan-3-yl)methoxy]undecyloxybiphenyl-4-carboxylate (60), (R)-(+)-4-(2-Methylbutyloxycarbonyl)2-fluorophenyl 4'-[11-(3-Methyloxetan-3-yl)methoxy]undecyloxybiphenyl-4-carboxylate (61), and 4-(1-Propylbutyloxycarbonyl) 2-fluorophenyl 4'-[11-(Methyloxetan-3-yl)methoxy] undecyloxybiphenyl-4-carboxylate (62)

This example is illustrated in FIGS. 1. The compounds prepared in this example were characterised by standard techniques and the results are shown in tables 1. Tables 1 shows the molecular weights and transition temperatures for these compounds.

PREPARATION 6.1

Synthesis of (R)-(-)-4-(1-Methylheptyloxycarbonyl) 2-fluorophenyl 4'-[6-(3-Methyloxetan-3-yl)methoxy] hexyloxybiphenyl-4-carboxylate (54)

N,N'-Dicyclohexylcarbodiimide (0.64 g, 3.1 mmol) and 4-(dimethylamino)pyridine (0.10 g, 0.1 mmol) was added to a stirred solution of compound 42 (1.23 g, 3.1 mmol) and compound 15 (0.83 g, 3.1 mmol) in dichloromethane. The reaction mixture was left stirring at room temperature for 72 h until completion of the reaction. Tile dicyclohexylurea formed was filtered off and the solvent removed in vacuo to yield a viscous colourless oil which was purified by column chromatography (ethyl acetate) on silica. The colourless material was then heated in ethanol and cooled to -60°, filtered off and dried in vacuo (P$_2$O$_5$). Yield 1.83 g (91%), $[\alpha]_D$=-22.35° at 24° C.

$^1$Hnmr (CDCl$_3$) δ 0.88 (3H, t), 1.29 (3H, s), 1.30 (8H, m), 1.34 (3H, d, 1.49 (4H, m), 1.64 (4H, quint), 1.83 (2H, quint), 3.48 (2H, t), 3.50 (2H, s), 4.04 (2H, t), 4.37 (2H, d, J=6 Hz), 4.52 (2H, d, J=6 Hz), 5.17 (1H, sext), 7.00 (2H, d, J=8 Hz), 7.34 (2H, dd, J=6 Hz), 7.58 (2H, d, J=8 Hz), 7.70 (2H, d, J=8 Hz), 7.87 (2H, m), 8.22 (2H, d, J=8 Hz). IR (neat) $v_{max}$ 770, 830, 900, 1015, 1060, 1110, 1180, 1260, 1290, 1430, 1450, 1505, 1600, 1715, 1740, 2860, 2940 cm$^{-1}$. Ms m/z 648 (M$^+$), 479, 381 (100%), 196, 139, 55.

PREPARATION 6.2

Synthesis of (R)-(+)-4-(2-Methylbutyloxycarbonyl) 2-fluorophenyl 4'-[6-(Methyloxetan-3-yl)methoxy] hexyloxybiphenyl-4-carboxylate (55)

The experimental procedure followed was the same as for the preparation of compound 54. The following quantities were used:

Compound 42 1.31 g, 3.3 mmol; compound 16 0.75 g, 3.3 mmol; N,N'-Dicyclohexylcarbodiimide 0.68 g, 3.3 mmol; 4-(dimethylamino)pyridine (0.10 g, 0.1 mmol): dichloromethane 50 ml. Yield 1.50 g (75%), [α]$_D$=+ 0.97° at 25° C.

$^1$Hnmr (CDCl$_3$) δ 0.97 (3H, t), 1.02 (3H, d), 1.31 (3H, s), 1.47 (6H, m), 1.63 (2H, quint), 1.83 (3H, quint and sept), 3.47 (2H, s), 3.48 (2H, t), 4.01 (2H, t), 4.19 (2H, m), 4.36 (2H, d, J=6 Hz), 4.52 (2H, d, J=6 Hz), 7.01 (2H, d, J=8 Hz), 7.36 (1H, dd, J=8 Hz), 7.61 (2H, d, J=8 Hz), 7.70 (2H, d, J=8 Hz), 7.92 (2H, m), 8.24 (2H, d, J=8 Hz). IR (neat) ν$_{max}$ 765, 830, 890, 980, 1015, 1055, 1115, 1180, 1220, 1270, 1360, 1460, 1510, 1605, 1710, 1730, 2870, 2940 cm$^{-1}$. Ms m/z 606 (M$^+$), 381 (100%), 351, 197, 139, 55.

PREPARATION 6.3

Synthesis of 4-(1-Propylbutyloxycarbonyl)2-fluorophenyl 4'-[6-(3-Methyloxetan-3-yl)methoxy] hexyloxybiphenyl-4-carboxylate (56)

The experimental procedure followed was the same as for the preparation of compound 54. The following quantities were used:

Compound 42 1.25 g, 3.15 mmol; compound 17 0.76 g, 3.15 mmol, N,N'-Dicyclohexylcarbodiimide 0.65 g, 3.15 mmol: 4-(dimethylamino)pyridine (0.10 g, 0.1 mmol): dichloromethane 50 ml. Yield 1.60 g (80%).

$^1$Hnmr (CDCl$_3$) δ 0.94 (6H, t), 1.28 (3H, s), 1.42 (8H, m), 1.62 (6H, m), 1.81 (2H, quint), 3.45 (2H, s), 3.48 (2H, t), 4.03 (2H, t), 4.36 (2H, d, J=6 Hz), 4.46 (2H, d, J=6 Hz), 5.16 (1H, sept), 7.01 (2H, d, J=8 Hz), 7.39 (1H, t), 7.64 (2H, d, J=8 Hz), 7.75 (2H, d, J=8 Hz), 7.91 (2H, m,), 8.23 (2H, d, J=8 Hz). IR (neat) ν$_{max}$ 760, 830, 900, 950, 1015, 1060, 1115, 1180, 1255, 1430, 1500, 1605, 1715, 1750, 2870, 2940 cm$^{-1}$. Ms m/z 634 (M$^+$), 382 (100%), 352, 279, 197, 139.

PREPARATION 6.4

Synthesis of (R)-(−)4-(1-Methylheptyloxycarbonyl) 2-fluorophenyl 4'-[10-(3-Methyloxetan-3-yl) methoxy]decyloxybiphenyl-4-carboxylate (57)

The experimental procedure followed was the same as for the preparation of compound 54. The following quantities were used:

Compound 43 1.29 g, 2.8 mmol; compound 15 0.75 g, 2.8 mmol; N,N'-Dicyclohexylcarbodiimide 0.58 g, 2.8 mmol; 4-(dimethylamino)pyridine (0.10 g, 0.1 mmol): dichloromethane 50 ml. Yield 1.00 g (50%), [α]$_D$=− 13.9° at 25° C.

$^1$Hnmr (CDCl$_3$) δ 0.89 (3H, t), 1.32 (22H, m), 148 (4H, m), 1.62 (4H, m), 1.82 (2H, sext), 3.47 (2H, t), 3.50 (2H, s), 4.02 (2H, t), 4.37 (2H, d, J=6 Hz), 4.51 (2H, d, J=6 Hz), 5.18 (1H, sext), 7.01 (2H, d, J=8 Hz), 7.36 (1H, dd, J=8 Hz), 7.61 (21H, d, J=8 Hz), 7.70 (2H, d, J=8 Hz), 7.92 (2H, m), 8.25 (2H, d, J=8 Hz). IR (neat) ν$_{max}$ 770, 830, 900, 980, 1020, 1110, 1180, 1230, 1260, 1430, 1470, 1510, 1600, 1715, 1740, 2860, 2940 cm$^{-1}$. Ms m/z 704 (M$^+$), 535, 437 (100%), 401, 335, 196.

PREPARATION 6.5

Synthesis of (R)-(+)-4-(2-Methylbutyloxycarbonyl) 2-fluorophenyl 4'-[10-(3Methyloxetan-3-yl) methoxy]decyloxybiphenyl-4-carboxylate (58)

The experimental procedure followed was the same as for the preparation of compound 54. The following quantities were used:

Compound 43 1.37 g, 3.0 mmol; compound 16 0.68 g, 3.0 mmol; N,N'-Dicyclohexylcarbodiimide 0.62 g, 3.0 mmol; 4-(dimethylamino)pyridine (0.10 g 0.1 mmol): dichloromethane 50 ml. Yield 1.25 g (63%), [α]$_D$=+ 0.97° at 25° C.

$^1$Hnmr (CDCl$_3$) δ 0.97 (3H, t), 1.02 (3H, d), 1.27 (3H, s), 1.33 (10H, m), 1.48 (6H, m), 1.80 (2H, sext), 1.87 (1H, sept), 3.43 (2H, s), 3.45 (2H, t), 4.02 (2H, t), 4.18 (2H, m), 4.28 (2H, d, J=6 Hz), 4.45 (2H, d, J=6 Hz), 7.01 (2H, d, J=8 Hz), 7.40 (1H, t), 7.63 (2H, d, J=8 Hz), 7.75 (2H, d, J=8 Hz), 7.91 (2H, m), 8.23 (2H, d, J=8 Hz). IR (neat) ν$_{max}$ 760, 830, 890, 980, 1015, 1060, 1110, 1180, 1260, 1300, 1430, 1460, 1510, 1600, 1720, 1750, 2860, 2930 cm$^{-1}$. Ms m/z 662 (M$^+$), 438 (100%), 335, 197, 139, 83.

PREPARATION 6.6

Synthesis of 4-(1-Propylbutyloxycarbonyl)2-fluorophenyl 4'-[10-(3-Methyloxetan-3-yl)methoxy] decyloxybiphenyl-4-carboxylate (59)

The experimental procedure followed was the same as for the preparation of compound 54. The following quantities were used:

Compound 43 1.32 g, 2.9 mmol; compound 17 0.70 g, 2.9 mmol; N,N'-Dicyclohexylcarbodiimide 0.60 g, 2.9 mmol; 4-(dimethylamino)pyridine (0.10 g, 0.1 mmol): dichloromethane 50 ml. Yield 1.66 g (83%).

$^1$Hnmr (CDCl$_3$) δ 0.86 (6H, t), 1.31 (3H, s), 1.34 (20H, m), 1.57 (2H, m), 1.72 (2H, sext), 3.35 (2H, s), 3.36 (2H, t), 4.20 (2H, t), 4.37 (2H, d, J=6 Hz), 4.51 (2H, d, J=6 Hz), 5.07 (1H, sept), 6.93 (2H, d, J=8 Hz), 7.30 (1H, t), 7.55 (2H, d, J=8 Hz), 7.67 (2H, d, J=8 Hz), 7.82 (2H, m), 8.15 (2H, d, J=8 Hz). IR (neat) ν$_{max}$ 760, 830, 900, 950, 1015, 1060, 1115, 1180, 1255, 1300, 1430, 1470, 1500, 1605, 1715, 1750, 2860, 2940 cm$^{-1}$. Ms m/z 690 (M$^+$), 438 (100%), 408, 335, 197, 55.

PREPARATION 6.7

Synthesis of (R)-(−)-4-(1-Methylheptyloxycarbonyl) 2-fluorophenyl 4'-[11-(3-Methyloxetan-3-yl) methoxy]undecyloxybiphenyl-4-carboxylate (60)

The experimental procedure followed was the same as for the preparation of compound 54. The following quantities were used:

Compound 44 1.31 g, 2.8 mmol; compound 15 0.75 g, 2.8 mmol; N,N'-Dicyclohexylcarbodiimide 0.58 g, 2.8 mmol; 4-(dimethylamino)pyridine (0.01 g, 0.1 mmol): dichloromethane 50 ml. Yield 1.70 g (85%). [α]$_D$=− 17.6° at 25° C.

$^1$Hnmr (CDCl$_3$) δ 0.90 (3H, t), 1.34 (24H, m), 1.48 (4H, m), 1.60 (4H, m), 1.82 (2H, sext), 3.47 (2H, t), 3.50 (2H, s), 4.04 (2H, t), 4.37 (2H, d, J=6 Hz), 4.53 (2H, d, J=6 Hz), 5.16 (1H, sext), 7.00 (2H, d, J=8 Hz), 7.33 (1H, dd, J=8 Hz), 7.59

(2H, d, J=8 Hz), 7.68 (2H, d, J=8 Hz), 7.89 (2H, m), 8.22 (2H, d, J=8 Hz). IR (neat) $v_{max}$ 770, 830, 900, 980, 1020, 1110, 1180, 1230, 1260, 1430, 1470, 1510, 1600, 1715, 1740, 2860, 2940 cm$^{-1}$. Ms m/z 718 (M$^+$), 549, 451 (100%) 367, 197, 139.

PREPARATION 6.8

Synthesis of (R)-(+)-4-(2-Methylbutyloxycarbonyl) 2-fluorophenyl 4'-[11-(3-Methyloxetan-3-yl) methoxy]undecyloxybiphenyl-4-carboxylate (61)

The experimental procedure followed was the same as for the preparation of compound 54. The following quantities were used:

Compound 44 1.16 g, 3.0 mmol; compound 16 0.67 g, 3.0 mmol: N,N'-Dicyclohexylcarbodiimide 0.61 g, 3.0 mmol; 4-(dimethylamino)pyridine (0.10 g, 0.1 mmol): dichloromethane 50 ml. Yield 1.30 g (65%), [α]$_D$=+ 1.67° at 25° C.

$^1$Hnmr (CDCl$_3$) δ 0.96 (3H, t), 1.01 (3H, d), 1.27 (3H, s), 1.31 (12H, m), 1.52 (6H, m), 1.80 (2H, quint), 1.86 (1H, sept), 3.43 (2H, s), 3.44 (2H, t), 4.02 (2H, t), 4.17 (2H, m), 4.27 (2H, d, J=6 Hz), 4.44 (2H, d, J=6 Hz), 7.00 (2H, d, J=8 Hz), 7.39 (1H, t), 7.63 (2H, d, J=8 Hz), 7.74 (2H, d, J=8 Hz), 7.89 (2H, m), 8.23 (2H, d, J=8 Hz). IR (neat) $v_{max}$ 760, 830, 900, 1010, 1060, 1110, 1190, 1260, 1300, 1430, 1470, 1510, 1600, 1720, 1750, 2860, 2920 cm$^{-1}$. Ms m/z 676 (M$^+$), 451, 367, 349, 197, 156, 139 (100%).

PREPARATION 6.9

Synthesis of 4-(1-Propylbutyloxycarbonyl)2-fluorophenyl 4'-[11-(Methyloxetan-3-yl)methoxy] undecyloxybiphenyl-4-carboxylate (62)

The experimental procedure followed was the same as for the preparation of compound 54. The following quantities were used:

Compound 44 1.33 g, 2.8 mmol; compound 17 0.70 g, 2.8 mmol; N,N'-Dicyclohexylcarbodiimide 0.59 g, 2.8 mmol; 4-(dimethylamino)pyridine (0.10 g, 0.1 mmol): dichloromethane 50 ml. Yield 1.72 g (86%).

$^1$Hnmr (CDCl$_3$) δ 0.94 (6H, t), 1.27 (3H, s), 1.34 (18H, m), 1.63 (6H, m), 1.69 (2H, quint), 3.43 (2H, s), 3.45 (2H, t), 4.02 (2H, t), 4.29 (2H, d, J=6 Hz), 4.46 (2H, d, J=6 Hz), 5.16 (1H, sept), 7.01 (2H, d, J=8 Hz), 7.39 (1H, dd, J=8 Hz), 7.63 (2H, d, J=8 Hz), 7.76 (2H, d, J=8 Hz), 7.90 (2H, t), 8.23 (2H, d, J=8 Hz). IR (neat) $v_{max}$ 760, 830, 900, 950, 1010, 1055, 1115, 1180, 1255, 1430, 1500, 1605, 1720, 1750, 2860, 2940 cm$^{-1}$. Ms m/z 704 (M$^+$), 684, 350, 197 (100%), 139, 55.

EXAMPLE 7

Preparation of (R)-(-)-4-(1-Methylheptyloxycarbonyl)3-fluorophenyl 4'-[6-(3-Methyloxetan-3-yl)methoxy]hexyloxybiphenyl-4-carboxylate (63), (R)-(+)-4-(2-Methylbutyloxycarbonyl)3-fluorophenyl 4'-[6-(Methyloxetan-3-yl)methoxy]hexyloxybiphenyl-4-carboxylate (64), 4-(1-Propylbutyloxycarbonyl)3-fluorophenyl 4'-[6-(3-Methyloxetan-3-yl)methoxy] hexyloxybiphenyl-4-carboxylate (65), (R)-(-)-4-(1-Methylheptyloxycarbonyl)3-fluorophenyl 4'-[10-(3-Methyloxetan-3-yl)methoxy]decyloxybiphenyl-4-carboxylate (66), (R)-(+)-4-(2-Methylbutyloxycarbonyl)3-fluorophenyl 4'-[10-(3Methyloxetan-3-yl)methoxy]decyloxybiphenyl-4-carboxylate (67), 4-(1-Propylbutyloxycarbonyl)3-fluorophenyl 4'-[10-(3-Methyloxetan-3-yl)methoxy] decyloxybiphenyl-4-carboxylate (68), (R)-(-)-4-(1-Methylheptyloxycarbonyl)3-fluorophenyl 4'-11-(3-Methyloxetan-3-yl)methoxy]undecyloxybiphenyl-4-carboxylate (69), (R)-(+)-4-(2-Methylbutyloxycarbonyl)3-fluorophenyl 4'-[11-(3-Methyloxetan-3-yl)methoxy]undecyloxybiphenyl-4-carboxylate (70), and 4-(1-Propylbutyloxycarbonyl) 3-fluorophenyl 4'-[11-(Methyloxetan-3-yl)methoxy] undecyloxybiphenyl-4-carboxylate (71)

This example is illustrated in FIGS. 1. The compounds prepared in this example were characterised by standard techniques and the results are shown in tables 1. Tables 1 shows the molecular weights and transition temperatures for these compounds.

PREPARATION 7.1

Synthesis of (R)-(-)-4-(1-Methylheptyloxycarbonyl) 3-fluorophenyl 4'-[6-(3-Methyloxetan-3-yl)methoxy] hexyloxybiphenyl-4-carboxylate (63)

N,N'-Dicyclohexylcarbodiimide (0.64 g, 3.1 mmol) and 4-(dimethylamino)pyridine (0.10 g, 0.1 mmol) was added to a stirred solution of compound 42 (1.23 g, 3.1 mmol) and compound 26 (0.83 g, 3.1 mmol) in dichloromethane. The reaction mixture was left stirring at room temperature for 72 h until completion of the reaction. The dicyclohexylurea formed was filtered off and the solvent removed in vacuo to yield a viscous colourless oil which was purified by column chromatography (ethyl acetate) on silica. The colourless material was then heated in ethanol and cooled to -60°, filtered off and dried in vacuo (P$_2$O$_5$). Yield 1.09 g (55%).

$^1$Hnmr (CDCl$_3$) δ 0.88 (3H, t), 1.30 (14H, m), 1.31 (3H, s), 1.38 (3H, d), 1.65 (2H, sext), 1.83 (2H, sext), 3.35 (2H, s), 3.36 (2H, t), 4.02 (2H, t), 4.35 (2H, d, J=6 Hz), 4.52 (2H, d, J=6 Hz), 5.18 (1H, sext), 7.01 (2H, d, J=8 Hz), 7.12 (2H, m), 7.60 (2H, d, J=8 Hz), 7.69 (2H, d, J=8 Hz), 8.01 (1H, t), 8.22 (2H, d, J=8 Hz). IR (neat) $v_{max}$ 700, 735, 870, 930, 1020, 1060, 1140, 1195, 1250, 1430, 1500, 1520, 1610, 1710, 1740, 2870, 2940 cm$^{-1}$. Ms m/z 648 (M$^+$), 381 (100%), 351, 278, 197, 139, 55.

PREPARATION 7.2

Synthesis of (R)-(+)-4-(2-Methylbutyloxycarbonyl) 3-fluorophenyl 4'-[6-(methyloxetan-3-yl)methoxy] hexyloxybiphenyl-4-carboxylate (64)

The experimental procedure followed was the same as for the preparation of compound 63. The following quantities were used:

Compound 42 1.31 g, 3.3 mmol, compound 27 0.75 g, 3.3 mmol: N,N'-Dicyclohexylcarbodiimide 0.68 g, 3.3 mmol; 4-(dimethylamino)pyridine (0.10 g, 0.1 mmol): dichloromethane 50 ml. Yield 1.24 g (62%).

$^1$Hnmr (CDCl) δ 0.96 (3H, t), 1.02 (3H, d), 1.31 (3H, s), 1.51 6H, m), 1.63 (2H, sext), 1.83 (3H, sept and sext), 3.48 (2H, s), 3.49 (2H, t), 4.02 (2H, t), 4.20 (2H, m), 4.35 (2H, d, J=6 Hz), 4.51 (2H, d, J=6 Hz), 7.01 (2H, d, J=8 Hz), 7.12 (2H, m), 7.60 (2H, d, J=8 Hz), 7.71 (2H, d, J=8 Hz), 8.04 (1H, t), 8.22 (2H, d, J=8 Hz). IR (neat) $v_{max}$ 700, 725, 770, 830, 900, 970, 1020, 1060, 1130, 1190, 1250, 1280, 1300, 1435, 1500, 1530, 1610, 1710, 1730, 2880, 2940 cm$^{-1}$. Ms m/z 606 (M$^+$), 381 (100%), 279, 197, 139, 55.

PREPARATION 7.3

Synthesis of 4-(1-Propylbutyloxycarbonyl)3-fluorophenyl 4'-[6-(3-Methyloxetan-3-yl)methoxy] hexyloxybiphenyl-4-carboxylate (65)

The experimental procedure followed was the same as for the preparation of compound 63. The following quantities were used:

Compound 42 1.25 g, 3.2 mmol; compound 28 0.80 g, 3.2 mmol; N,N'-Dicyclohexylcarbodiimide 0.67 g, 3.2 mmol; 4-(dimethylamino)pyridine (0.10 g, 0.1 mmol): dichloromethane 50 ml. Yield 1.08 g (54%).

$^1$Hnmr (CDCl$_3$) δ 0.94 (6H, t), 1.32 (3H, s), 1.43 (8H, m), 1.62 (6H, m), 1.83 (2H, quint), 3.47 (2H, s), 3.48 (2H, t), 4.03 (2H, t), 4.36 (2H, d, J=6 Hz). 4.53 (2H, d, J=6 Hz), 5.20 (1H, sept), 7.01 (2H, d, J=8 Hz), 7.13 (2H, m), 7.60 (2H, d, J=8 Hz), 7.71 (2H, d, J=8 Hz), 8.04 (1H, t), 8.21 (2H, d, J=8 Hz). IR (neat) $v_{max}$ 700, 770, 830, 900, 1015, 1060, 1120, 1190, 1250, 1280, 1430, 1500, 1530, 1610, 1710, 1740, 2870, 2940 cm$^{-1}$. Ms m/z 634 (M$^+$), 520, 382, 352, 197, 139, 55 (100%).

PREPARATION 7.4

Synthesis of (R)-(−)-4-(1-Methylheptyloxycarbonyl) 3-fluorophenyl 4'-[11-(3-Methyloxetan-3-yl) methoxy]decyloxybiphenyl-4-carboxylate (66)

The experimental procedure followed was the same as for the preparation of compound 63. The following quantities were used:

Compound 43 1.29 g, 2.8 mmol; compound 26 0.76 g, 2.8 mmol; N,N'-Dicyclohexylcarbodiimide 0.59 g, 2.8 mmol; 4-(dimethylamino)pyridine (0.10 g, 0.1 mmol): dichloromethane 50 ml. Yield 1.31 g (66%).

$^1$Hnmr (CDCl$_3$) δ 0.88 (3H, t), 1.34 (25H, m), 1.58 (4H, m), 1.73 (1H, m), 1.81 (2H, sext), 3.47 (2H, s), 3.48 (2H, t), 4.01 (2H, t), 4.35 (2H, d, J=6 Hz), 4.51 (2H, d, J=6 Hz), 5.17 (1H, sext), 7.00 (2H, d, J=8 Hz), 7.12 (2H, m), 7.59 (2H, d, J=8 Hz), 7.69 (2H, d, J=8 Hz), 8.02 (1H, t), 8.21 (2H, d, J=8 Hz). IR (neat) $v_{max}$ 700, 725, 770, 830, 890, 985, 1020, 1060, 1120, 1140, 1200, 1250, 1280, 1400, 1430, 1470, 1500, 1610, 1710, 1740, 2860, 2930 cm$^{-1}$. Ms m/z 704 (M$^+$), 437, 214, 197, 139, 55 (100%).

PREPARATION 7.5

Synthesis of (R)-(+)-4-(2-Methylbutyloxycarbonyl) 3-fluorophenyl 4'-[10-(3Methyloxetan-3-yl) methoxy]decyloxybiphenyl-4-carboxylate (67)

The experimental procedure followed was the same as for the preparation of compound 63. The following quantities were used:

Compound 43 1.37 g, 3.0 mmol; compound 27 0.68 g, 3.0 mmol; N,N'-Dicyclohexylcarbodiimide 0.62 g, 3.0 mmol; 4-(dimethylamino)pyridine (0.10 g, 0.1 mmol): dichloromethane 50 ml. Yield 1.60 g (80%).

$^1$Hnmr (CDCl$_3$) δ 0.96 (3H, t), 1.02 (3H, d), 1.28 (14H, m), 1.46 (2H, m), 1.56 (3H, m), 1.81 (3H, quint and sext), 3.46 (2H, t), 3.47 (2H, s), 4.01 (2H, t), 4.20 (2H, m), 4.36 (2H, d, J=6 Hz), 4.51 (2H, d, J=6 Hz), 7.01 (2H, d, J=8 Hz), 7.13 (2H, m), 7.60 (2H, d, J=8 Hz), 7.70 (2H, d, J=8 Hz), 8.05 (1H, t), 8.21 (2H, d, J=8 Hz). IR (neat) $v_{max}$ 700, 730, 770, 830, 900, 980, 1020, 1060, 1130, 1190, 1255, 1280, 1300, 1435, 1500, 1530, 1605, 1710, 1730, 2860, 2930 cm$^{-1}$. Ms m/z 662 (M$^+$), 437, 335, 196, 139, 55 (100%).

PREPARATION 7.6

Synthesis of 4-(1-Propylbutyloxycarbonyl)3- fluorophenyl 4'-[10-(3-Methyloxetan-3-yl)methoxy] decyloxybiphenyl-4-carboxylate (68)

The experimental procedure followed was the same as for the preparation of compound 63. The following quantities were used:

Compound 43 1.27 g, 2.8 mmol; compound 28 0.71 g, 2.8 mmol; N,N'-Dicyclohexylcarbodiimide 0.60 g, 2.8 mmol; 4-(dimethylamino)pyridine (0.10 g, 0.1 mmol): dichloromethane 50 ml. Yield 1.64 g (82%).

$^1$Hnmr (CDCl$_3$) δ 0.95 (6H, t), 1.37 (19H, m), 1.60 (6H, m), 1.81 (2H, sext), 3.45 (2H, t), 3.46 (2H, s), 4.02 (2H, t), 4.36 (2H, d, J=6 Hz), 4.53 (2H, d, J=6 Hz), 5.20 (1H, sept), 7.01 (2H, d, J=8 Hz), 7.13 (2H, m), 7.60 (2H, d, J=8 Hz), 7.70 (2H, d, J=8 Hz), 8.03 (1H, t), 8.22 (2H, d, J=8 Hz). IR (neat) $v_{max}$ 690, 725, 765, 830, 900, 980, 1015, 1060, 1120, 1140, 1200, 1250, 1420, 1470, 1500, 1530, 1600, 1720, 1740, 2860, 2940 cm$^{-1}$. Ms m/z 690 (M$^+$), 576, 438, 336, 197, 139, 55 (100%).

PREPARATION 7.7

Synthesis of (R)-(−)-4-(1-Methylheptyloxycarbonyl) 3-fluorophenyl 4'-[11-(3-Methyloxetan-3-yl) methoxy]undecyloxybiphenyl-4-carboxylate (69)

The experimental procedure followed was the same as for the preparation of compound 63. The following quantities were used:

Compound 44 1.31 g, 2.8 mmol; compound 26 0.75 g, 2.8 mmol; N,N'-Dicyclohexylcarbodiimide 0.57 g, 2.8 mmol; 4-(dimethylamino)pyridine (0.10 g, 0.1 mmol): dichloromethane 50 ml. Yield 1.44 g (72%).

$^1$Hnmr (CDCl$_3$) δ 0.88 (3H, t), 1.30 (30H, m), 1.58 (2H, m), 1.82 (2H, sext), 3.45 (2H, t), 3.47 (2H, s), 4.02 (2H, t), 4.35 (2H, d, J=6 Hz), 4.51 (2H, d, J=6 Hz), 5.17 (1H, sext), 7.00 (2H, d, J=8 Hz), 7.11 (2H, m), 7.59 (2H, d, J=8 Hz), 7.70 (2H, d, J=8 Hz), 8.01 (1H, t), 8.21 (2H, d, J=8 Hz). IR (neat) $v_{max}$ 700, 725, 770, 840, 890, 1070, 1120, 1140, 1200, 1260, 1300, 1430, 1470, 1500, 1600, 1715, 1740, 2860, 2930 cm$^{-1}$. Ms m/z 718 (M$^+$), 451 (100%), 368, 214, 197, 139, 55.

PREPARATION 7.8

Synthesis of (R)-(+)-4-(2-Methylbutyloxycarbonyl) 3-fluorophenyl 4'-[11-(3-Methyloxetan-3-yl) methoxy]undecyloxybiphenyl-4-carboxylate (70)

The experimental procedure followed was the same as for the preparation of compound 63. The following quantities were used:

Compound 44 1.39 g, 3.0 mmol; compound 27 0.67 g, 3.0 mmol; N,N'-Dicyclohexylcarbodiimide 0.61 g, 3.0 mmol; 4-(dimethylamino)pyridine (0.10 g, 0.1 mmol): dichloromethane 50 ml. Yield 1.41 g (70%).

$^1$Hnmr (CDCl$_3$) δ 0.96 (3H, t), 1.03 (3H, d), 1.32 (19H, m), 1.50 (2H, m), 1.80 (2H, quint), 1.85 (1H, sext), 3.46 (2H, t), 3.48 (2H, s), 4.02 (2H, t), 4.20 (2H, m), 4.36 (2H, d, J=6 Hz), 4.51 (2H, d, J=6 Hz), 7.00 (2H, d, J=8 Hz), 7.12 (2H, m), 7.60 (2H, d, J=8 Hz), 7.70 (2H, d, J=8 Hz), 8.03 (1H, t), 8.22 (2H, d, J=8 Hz). IR (neat) $v_{max}$ 700, 725, 770, 830, 900, 1020, 1060, 1130, 1190, 1250, 1280, 1435, 1500, 1610, 1710, 1730, 2860, 2930 cm$^{-1}$. Ms m/z 676 M$^+$), 451, 367, 196, 139, 55 (100%).

PREPARATION 7.9

Synthesis of 4-(1-Propylbutyloxycarbonyl)3- fluorophenyl 4'-[11-(methyloxetan-3-yl)methoxy] undecyloxybiphenyl-4-carboxylate (71)

The experimental procedure followed was the same as for the preparation of compound 63. The following quantities were used:

Compound 44 1.33 g, 2.8 mmol; compound 28 0.72 g, 2.8 mmol; N,N'-Dicyclohexylcarbodiimide 0.61 g, 2.8 mmol; 4-(dimethylamino)pyridine (0.10 g, 0.1 mmol): dichloromethane 50 ml. Yield 1.37 g (68%).

$^1$Hnmr (CDCl$_3$) δ 0.95 (6H, t), 1.30 (20H, m), 1.60 (6H, m), 1.80 (2H, sext), 3.46 (2H, t), 3.48 (2H, s), 4.02 (2H, t), 4.32 (2H, d, J=6 Hz), 4.52 (2H, d, J=6 Hz), 5.20 (1H, sept), 7.00 (2H, d, J=8 Hz), 7.12 (2H, m), 7.60 (2H, d, J=8 Hz), 7.70 (2H, d, J=8 Hz), 8.02 (1H, t), 8.22 (2H, d, J=8 Hz). IR (neat) $v_{max}$ 700, 720, 770, 830, 890, 940, 1020, 1060, 1120, 1190, 1250, 1280, 1430, 1470, 1500, 1530, 1605, 1710, 1740, 2860, 2930 cm$^{-1}$. Ms m/z 704 M$^+$), 452, 366, 197, 139, 55 (100%).

EXAMPLE 8

Preparation of (R)-(+)-4'-(1-Methylheptyloxy)-3'-fluorobiphenyl-4-yl 4-[6-(3-Methyloxetan-3-ylmethoxy)hexyloxy]benzoate (88); (R)-(+)-4'-(1-Methylheptyloxy)-3'-fluorobiphenyl-4-yl 4-[10-(3-Methyloxetan-3-ylmethoxy)decyloxy]benzoate (89); and (R)-(+)-4'-(1-Methylheptyloxy)-3'-fluorobiphenyl-4-yl 4-[11-(3-Methyloxetan-3-ylmethoxy)undecyloxy]benzoate (90)

This example is illustrated in FIGS. 1. The compounds prepared in this example were characterised by standard techniques and the results are shown in tables 1. Table 1 shows the molecular weights and transition temperatures for these compounds.

PREPARATION 8.01

(R)-(+)-4'-(1-Methylheptyloxy)-3'-fluorobiphenyl-4-yl 4-[6-(3-Methyloxetan-3-ylmethoxy)hexyloxy]benzoate (88)

Potassium carbonate (40.8 g, 0.30 mol) was added to a solution of 4-bromophenol (80) (34.8 g, 0.20 mol) and benzyl bromide (37.8 g, 0.22 mol) in butanone (500 l). The reaction mixture was heated under reflux for 48 h and then poured into water (500 ml) with stirring. The organic solution was separated off and dried (MgSO$_4$). The drying agent was filtered off and the solvent removed in vacuo to yield a colourless solid which was purified by column chromatography (dichloromethane on silica). The off-white solid was recrystallised (cyclohexane) and then dried in vacuo (P$_2$O$_5$).

Yield 47.5 g (90%), mp 61.2–62.5° C. lit mp 64° C.[15]. $^1$Hnmr (CDCl$_3$) δ 5.03 (2H, s), 8.45 (2H, d, 18), 7.32–7.41 (7H, m). IR (KBr) $v_{max}$ 652, 694, 733, 820, 1036, 1244, 1286, 1448, 1489, 1580, 1650 cm$^{-1}$. Ms m/z 264, 262 (M$^+$), 171, 91 (100%), 65.

Butyllithium (75.8 ml, 0.19 mol, 2.5M in hexanes) was added to a stirred solution of compound 81 (44.5 g, 0.17 mol) in THF (500 ml) maintained at −78° C. The reaction solution was stirred for 4 h at −78° C. and then trimethyl borate (36 ml, 0.34 mol) was added dropwise and the reaction was left to warm to room temperature overnight. Tile reaction mixture was acidified to pH 3 with 2M hydrochloric acid (300 ml) and stirred for 20 min. Ether (200 ml) was added and the organic solution was separated. The aqueous solution was then washed with ether (2×500 ml) and the combined organic washings were dried (MgSO$_4$). The drying agent was filtered off and the solvent removed in vacuo to yield the boronic acid.

Yield 38.0 g (98%), mp 166.0–170.9° C. $^1$Hnmr (CDCl$_3$) δ 5.10 (2H, s), 6.95 (2H, d, J 8), 7.32–7.44 (5H, m), 7.71 (2H, d, J 8), 7.82 (2H, s). IR (KBr) $v_{max}$ 702, 750, 823, 921, 1008, 1112, 1178, 1248, 1282, 1378, 1574, 1605, 2916, 3420 cm$^{-1}$. Ms m/z 228 (M$^+$), 152, 127, 91 (100%), 64.

Triphenylphosphine (39.30 g, 0.15 mol) was added to a stirred solution of compound 9 (25.0 g, 0.13 mol), (S)-(+)-octan-2-ol (17.0 (a 0.13 mol) and diethyl azodicarboxylate (21.6 g, 0.13 mol) in THF (300 ml). The reaction was left to stir under a nitrogen atmosphere for 24 h until complete. The solvent was removed in vacuo and the crude semi-solid purified by column chromatography (dichloromethane on silica) to yield a colourless oil.

Yield 20.90 g (39%), $[\alpha]_D^{23}$=−3.2°, CHCl$_3$. $^1$Hnmr (CDCl$_3$) δ 0.87 (3H, t, J 6), 1.27 (3H, d, J 6), 1.22–1.34 (6H, m), 1.34–1.47 (2H, m), 1.52–1.62 (1H, m), 1.70–1.80 (1H, m), 4.30 (1H, sext, J 6), 6.84 (1H, t, J 9), 7.13–7.18 (1H, m), 7.21 (1H, dd, J$_1$ 8, J$_2$ 2). IR (neat) $v_{max}$ 800, 860, 900, 1130, 1210, 1270, 1300, 1380, 1410, 1470, 1490, 2860, 2930, 2960 cm$^{-1}$. Ms m/z 304, 302 (M$^+$), 191 (100%), 163, 161, 82, 71, 57.

Palladium tetrakis(triphenylphosphine) (3.05 g, 2.64 mmol) was added to a solution of compound 83 (20.0 g, 66.0 mmol) in DME (150 ml) and 2M sodium carbonate (150 ml). The solution was degassed and then heated under reflux under a nitrogen atmosphere. Compound 82 (16.5 g, 73.0 mmol) in DME (50 ml) was added dropwise and the reaction was then heated under reflux for 24 h. The reaction was monitored by GLC until complete. The reaction was cooled to RT and the product was extracted into ether (2×500 ml) and the combined ethereal extracts were washed with brine (500 ml) and dried (MgSO$_4$). The drying agent was filtered off and the solvent removed in vacuo to yield a brown solid which was purified by column chromatography (dichloromethane on silica) and recrystallised (ethanol) to yield a colourless solid.

Yield 24.6 g (92%), mp 78.3–79.9° C. $[\alpha]_D^{23}$=+2.2°, CHCl$_3$. $^1$Hnmr (CDCl$_3$) δ 0.88 (3H, t, J 6), 1.24–1.36 (6H, m), 1.33 (3H, d, J 6), 1.37–1.51 (2H, m), 1.55–1.65 (1H, m), 1.75–1.85 (1H, m), 4.35 (1H, sext, J 6), 5.10 (2H, s), 6.99 (1H, t, J 9), 7.02 (2H, d, J 8), 7.19–7.28 (2H, m), 7.35–7.46 (5H, m), 7.46 (2H, d, J 8). IR (KBr) $v_{max}$ 694, 734, 801, 831, 874, 944, 1045, 1130, 1240, 1279, 1378, 1452, 1504, 1584, 1607, 2856, 2928 cm$^{-1}$. Ms m/z 406 (M$^+$), 294, 260, 203, 90 (100%), 65.

10% Palladium-on-carbon (0.40 g) was added to a stirred solution of compound 84 (24.6 g, 61 mmol) in ethanol (450 ml), glacial acetic acid (45 ml) and cyclohexane (9.9 g, 121 mmol). The reaction mixture was heated under reflux for 48 h until the reaction was complete. The mixture was cooled to room temperature and was filtered through 'Hyflo supercel®' to remove the catalyst. The solvent was removed in vacuo to yield a yellow oil which was purified by column chromatography (dichloromethane on silica) and the colourless solid was recrystallised (ethanol) and dried in vacuo (P$_2$O$_5$).

Yield 16.7 g (87%), mp 60–62° C., lit mp 46–48° C.[17], $[\alpha]_D^{23}$=+3.9°, CHCl$_3$. $^1$Hnmr (CDCl$_3$) δ 0.87 (3H, t, J 6), 1.23–1.38 (6H, m), 1.33 (3H, d, J 6), 1.40–1.50 (2H, m), 1.55–1.65 (1H, m), 1.73–1.83 (1H, m), 4.35 (1H, sext, J 6), 4.94 (1H, br, s), 6.87 (2H, d, J 8), 6.98 (1H, t, J 9), 7.15–7.28 (2H, m), 7.39 (2H, d, J 8). IR (KBr) $v_{max}$ 760, 806, 833, 869, 940, 1033, 1132, 1239, 1309, 1377, 1450, 1504, 1612, 2855, 2927, 3370 cm$^{-1}$. Ms m/z 316 (M$^+$), 231, 203 (100%), 175, 145, 127 55.

The experimental procedure followed was the same as for the preparation of compound 83 and the product was recrystallised (ethanol) to yield a colourless solid. The following quantities were used:

Compound 2 10.4 g, 53.0 mmol; compound 85 16.7 g, 53.0 mmol; diethyl azodicarboxylate 9.22 g, 53.0 mmol; triphenylphosphine 15.2 g, 58.0 mmol, THF 250 ml.

Yield 14.6 g (56%), $[\alpha]_D^{24}$=+2.8°, CHCl$_3$. $^1$Hnmr (CDCl$_3$) δ 0.88 (3H, t, J 6), 1.26–1.37 (6H, m), 1.34 (3H, d, J 6), 1.40–1.53 (2H, m), 1.57–1.67 (1H, m), 1.77–1.87 (1H, m), 3.95 (3H, s), 4.39 (1H, sext, J 6), 7.03 (1H, t, J 9), 7.27 (2H, d, J 8), 7.28–7.34 (2H, m), 7.35 (2H, d, J 8), 7.57 (2H, d, J 8), 8.27 (2H, J 8). IR (KBr) $v_{max}$ 714, 764, 805, 862, 942, 1014, 1088, 1170, 1217, 1279, 1439, 1499, 1604, 1726, 1760, 2859, 2929 $cm^{-1}$. Ms m/z 494 (M$^+$), 382, 203, 178 (100%), 134, 92.

Aqueous ammonia (250 ml) was added to a stirred solution of compound 86 (14.6 g, 30.0 mmol) in ethanol (500 ml) and THF (200 ml). The solution was stirred at room temperature for 24 h. The reaction was monitored by TLC (dichloromethane) until completion. The solvent was removed in vacuo and the crude colourless solid purified by column chromatography (dichloromethane on silica), and was recrystallised (ethanol) and dried in vacuo ($P_2O_5$).

Yield 11.0 g (84%), mp 161.3–163.1° C. $[\alpha]_D^{24}$=+1.7°, CHCl$_3$. $^1$Hnmr (CDCl$_3$) δ 0.88 (3H, t, J 6), 1.26–1.36 (6H, m), 1.34 (3H, d, J 6), 1.38–1.52 (2H, m), 1.57–1.67 (1H, m), 1.77–1.87 (1H, m), 4.38 (1H, sext, J 6), 5.48 (1H, s), 6.91 (2H, d, J 8), 7.02 (1H, t, J 9), 7.25 (2H, d, J 8), 7.26–7.35 (2H, m), 7.55 (2H, d, J 8), 8.13 (2H, d, J 8). IR (KBr) $v_{max}$ 698, 764, 798, 851, 870, 1014, 1080, 1161, 1207, 1276, 1490, 1510, 1585, 1603, 1698, 2854, 2927, 3411 $cm^{-1}$. Ms m/z 436 (M$^+$), 324, 203, 120 (100%), 92, 65.

Potassium carbonate (0.89 g, 6.44 mmol) was added to a stirred solution of compound 33 (0.85 g, 3.22 mmol) and compound 87 (1.40 g, 3.22 mmol) in butanone (50 ml). The reaction mixture was heated under reflux for 24 h and the cooled to RT. The reaction mixture was washed with water (100 ml) and the aqueous washings were washed with butanone (2×50 ml). The combined organic washings were dried (Na$_2$SO$_4$). The drying agent was filtered off and the solvent removed in vacuo to yield the crude solid which was purified by column chromatography (dichloromethane to remove any unreacted phenol and then ethyl acetate on silica) and recrystallised (ethanol) and dried in vacuo.

Yield 1.20 g (60%), $[\alpha]_D^{24}$=+3.3°, CHCl$_3$, K 30.9 (SmC* 18.2) SmA* 47.2 TGB*$_A$ 48.4 N* 51.6 Iso ° C. $^1$Hnmr (CDCl$_3$) δ 0.88 (3H, t, J 6), 1.26–1.37 (11H, m), 1.34 (3H, d, J 6), 1.40–1.55 (6H, m), 1.59–1.68 (2H, m), 1.77–1.88 (2H, m), 3.48 (2H, s), 3.49 (2H, t, J 6), 4.05 (2H, t, J 6), 4.35 (2H, d, J 6), 4.39 (1H, sext, J 6), 4.51 (2H, d, J 6), 6.97 (2H, d, J 8), 7.02 (1H, t, J 9), 7.25 (2H, d, J 8), 7.26–7.33 (2H, m), 7.56 (2H, d, J 8), 8.15 (2H, d, J 8). IR (KBr) $v_{max}$ 650, 691, 761, 798, 848, 868, 939, 980, 1067, 1121, 1171, 1215, 1270, 1499, 1578, 1606, 1729, 2858, 2931 $cm^{-1}$. Ms m/z 620 (M$^+$), 327, 305, 203, 120 (100%), 55.

PREPARATION 8.02

(R)-(+)-4'-(1-Methylheptyloxy)-3'-fluorobiphenyl-4-yl 4-[10-(3-Methyloxetan-3-ylmethoxy)decyloxy] benzoate (89)

The experimental procedure followed was the same as for the preparation of compound 88. The following quantities were used:

Compound 34 0.95 g, 2.96 mmol; compound 87 1.29 g, 2.96 mmol; potassium carbonate 0.82 g, 5.92 mmol; butanone 50 ml.

Yield 1.35 g (68%), $[\alpha]_D^{24}$=+1.9°, CHCl$_3$, K 33.7 SmC* 45.4 SmA* 68.4 Iso ° C. $^1$Hnmr (CDCl$_3$) δ 0.89 (3H, t, J 6), 1.31 (3H, s), 1.26–1.42 (20H, m), 1.34 (3H, d, J 6), 1.43–1.52 (2H, m), 1.54–1.66 (2H, m), 1.83 (2H, quint, J 6), 3.46 (21H, t, J 6), 3.47 (2H, s), 4.04 (2H, t, J 6), 4.35 (2H, d, J 6), 4.40 (1H, sext, J 6), 4.50 (2H, d, J 6), 6.97 (2H, d, J 8), 7.02 (1H, t, J 9), 7.24 (2H, d, J 8), 7.26–7.33 (2H, m), 7.56 (2H, d, J 8), 8.15 (2H, d, J 8). IR (KBr) $v_{max}$ 691, 762, 851, 939, 980, 1067, 1115, 1169, 1212, 1261, 1499, 1606, 1731, 2854, 2928 $cm^{-1}$. Ms m/z 676 (M$^+$), 607, 518, 361, 203, 121 (100%), 55.

PREPARATION 8.03

(R)-(+)-4'-(1-Methylheptyloxy)-3'-fluorobiphenyl-4-yl 4-[11-(3-Methyloxetan-3-ylmethoxy)undecyloxy] benzoate (90)

The experimental procedure followed was the same as for the preparation ol compound 88. The following quantities were used:

Compound 35 0.97 g, 2.90 mmol; compound 87 1.26 g, 2.90 mmol; potassium carbonate 0.80 g, 5.80 mmol; butanone 50 ml.

Yield 1.10 g (55%), $[\alpha]_D^{24}$=+1.9°, CHCl$_3$, K 31.1 SmC* 50.3 SmA* 69.9 Iso ° C.

$^1$Hnmr (CDCl$_3$) δ 0.89 (3H, t, J 6), 1.27 (3H, s), 1.26–1.41 (22H, m), 1.33 (3H, d, J 6), 1.42–1.52 (2H, m), 1.55–1.67 (2H, m), 1.75–1.85 (2H, m), 3.43 (2H, s), 3.44 (2H, t, J 6), 4.05 (2H, t, J 6), 4.28 (2H, d, J 6), 4.42 (1H, sext, J 6), 4.45 (2H, d, J 6), 6.99 (2H, d, J 8), 7.06 (1H, t, J 9), 7.25 (2H, d, J 8), 7.26–7.35 (2H, m), 7.59 (2H, d, J 8), 8.13 (2H, d, J 8). IR (KBr) $v_{max}$ 690, 723, 761, 804, 844, 869, 979, 1013, 1071, 1116, 1170, 1212, 1268, 1382, 1471, 1500, 1609, 1735, 2857, 2937 $cm^{-1}$. Ms m/z 690 (M$^-$), 452, 376 (100%), 346, 203, 120, 55.

EXAMPLE 9

Preparation of Poly-(R)-(-)-4-(1-methylheptyloxycarbonyl)phenyl 4'-[6-(3-Methyloxetan-3-yl)methyloxy]hexyloxybiphenyl-4-carboxylate (P1), Poly-(R)-(+)-4-(2-Methylbutyloxycarbonyl)phenyl 4'-[6-(Methyloxetan-3-yl)methoxy]hexyloxybiphenyl-4-carboxylate (P2), Poly-4-(1-Propylbutyloxycarbonyl)phenyl 4'-[6-(3-Methyloxetan-3-yl)methoxy]hexyloxybiphenyl-4-carboxylate (P3), Poly-(R)-(-)-4-(1-Methylheptyloxycarbonyl)phenyl 4'-[10-(3-Methyloxetan-3-yl)methoxy]decyloxybiphenyl-4-carboxylate (P4), Poly-(R)-(+)-4-(2-Methylbutyloxycarbonyl)phenyl 4'-[10-(3Methyloxetan-3-yl)methoxy]decyloxybiphenyl-4-carboxylate (P5), Poly-4-(1-Propylbutyloxycarbonyl)phenyl 4'-[10-(3-Methyloxetan-3-yl)methoxy]decyloxybiphenyl4-carboxylate (P6), Poly-(R)-(-)-4-(1-Methylheptyloxycarbonyl)phenyl 4'-[11-(3-methyloxetan-3-yl)methoxy]undecyloxybiphenyl4-carboxylate (P7), Poly-(R)-(+)-4-(2-Methylbutyloxycarbonyl)phenyl 4'-[11-(3-Methyloxetan-3-yl)methoxy]undecyloxybiphenyl-4-carboxylate (P8), and Poly-4-(1-Propylbutyloxycarbonyl)phenyl 4'-[11-(Methyloxetan-3-yl)methoxy]undecyloxybiphenyl-4-carboxylate (P9)

This example is illustrated in FIGS. 2. The compounds prepared in this example were characterised by standard techniques and the results are shown in tables 2. Tables 2 shows the molecular weights and transition temperatures for these compounds.

PREPARATION 9.01

Synthesis of Poly-(R)-(-)-4-(1-methylheptyloxycarbonyl)phenyl 4'-[6-(3-Methyloxetan-3-yl)methoxy]hexyloxybiphenyl-4-carboxylate (P1)

Compound 45 (0.800 g, 1.270 mmol) and photoinitiator (SARCAT KI 85) (0.021 g, 2 mol %, 0.025 mmol) were dissolved in dichloromethane (approx. 5 ml) and pippetted onto a sheet of glass. The solvent was evaporated off in an oven (80° C.) over 30 minutes. The polymerisation mixture was then sandwiched by a second sheet of glass and cooled to room temperature under nitrogen and in the dark. The polymerisation mixture was exposed to UV light for 1 h and then cured in an oven (80° C.) for 1 h. The polymer was then cooled to room temperature and dissolved into dichloromethane (approx. 250 ml) and washed with water (150 ml). The organic solution was then dried ($Na_2SO_4$). The drying agent was then filtered off and the solvent removed in vacuo to yield the crude polymer which was purified by precipitation from dichloromethane into hexane. This precipitation process was repeated 3 times to ensure removal of all unreacted monomer. The polymer was then dissolved into dichloromethane and filtered through a 0.45 μm filter. The solvent was removed in vacuo and the polymer dried in vacuo ($P_2O_5$). Yield 0.300 g (38%), $[\alpha]_D$=−24.17° at 25° C.

$^1$Hnmr ($CD_2Cl_2$) δ 0.86 (3H, s), 0.92 (3H, m), 1.30 (7H, broad), 1.42 (6H, broad), 1.53 (6H, broad), 1.75 (2H, m), 3.20 (6H, m), 3.36 (2H, broad), 3.92 (2H, broad), 5.10 (1H, m), 6.91 (2H, d), 7.25 (2H, d), 7.62 (2H, d), 8.06 (2H, d), 8.13 (2H, d).

PREPARATION 9.02

Synthesis of Poly-(R)-(+)4-(2-methylbutyloxycarbonyl)phenyl 4'-[6-(Methyloxetan-3-yl)methoxy]hexyloxybiphenyl4-carboxylate (P2)

The experimental procedure followed was the same as for the preparation of compound P1. The following quantities were used:

Compound 46 0.800 g, 1.360 mmol; SARCAT KI 85 0.023 g, 2 mol %, 0.027 mmol Yield 0.300 g (38%).

$^1$Hnmr ($CD_2Cl_2$) δ 0.92 (3H, s), 0.95 (3H, d), 0.99 (3H, t), 1.27 (2H, m), 1.42 (6H, broad), 1.77 (2H, broad), 1.82 (1H, broad), 3.21 (4H, s), 3.25 (2H, s), 3.36 (2H, m), 3.91 (2H, m), 4.13 (2H, m), 6.90 (2H, d), 7.24 (2H, d), 7.51 (2H, d), 7.61 (2H, d), 8.05 (2H, d), 8.12 (2H, d).

PREPARATION 9.03

Synthesis of Poly-4-(1-Propylbutyloxycarbonyl) phenyl 4'-[6-(3-Methyloxetan-3-yl)methoxy] hexyloxybiphenyl-4-carboxylate (P3)

The experimental procedure followed was the same as for the preparation of compound P1. The following quantities were used:

Compound 47 0.400 g, 0.650 mmol; SARCAT KI 85 0.011 g, 2 mol %, 0.013 mmol.

Yield 0.200 g (50%). $^1$Hnmr ($CD_2Cl_2$) δ 0.92 (9H, broad), 1.37 (8H, broad), 1.54 (6H, broad), 1.77 (2H, broad), 3.22 (4H, s), 3.24 (2H, s), 3.36 (2H, broad), 3.95 (2H, broad), 5.14 (1H, broad), 6.94 (2H, broad), 7.28 (2H, broad), 7.56 (2H, broad), 7.66 (2H, broad), 8.09 (2H, broad), 8.18 (2H, broad).

PREPARATION 9.04

Synthesis of Poly-(R)-(−)-4-(1-methylheptyloxycarbonyl)phenyl 4'-[10-(3-Methyloxetan-3-yl)methoxy]decyloxybiphenyl-4-carboxylate (P4)

The experimental procedure followed was the same as for the preparation of compound P1. The following quantities were used:

Compound 48 0.800 g, 1.170 mmol, SARCAT KI 85 0.020 g, 2 mol %, 0.023 mmol.

Yield 0.430 g (53%), $[\alpha]_D$=−53.16° at 23° C. $^1$Hnmr ($CD_2Cl_2$) δ 0.87 (3H, broad), 0.91 (3H, s), 1.31 (18H, broad), 1.55 (9H, broad), 1.75 (2H, m), 3.21 (4H, s), 3.24 (2H, s), 3.34 (2H, m), 3.92 (2H, m), 5.12 (1H, m), 6.93 (2H, d), 7.26 (2H, d), 7.54 (2H, d), 7.64 (2H, d), 8.06 (2H, d), 8.14 (2H, d).

PREPARATION 9.05

Synthesis of Poly-(R)-(+)-4-(2-methylbutyloxycarbonyl)phenyl 4'-[10-(3Methyloxetan-3-yl)methoxy]decyloxybiphenyl-4-carboxylate (P5)

The experimental procedure followed was the same as for the preparation of compound P1. The following quantities were used:

Compound 49 0.800 g, 1.240 mmol, SARCAT KI 85 0.021 g, 2 mol %, 0.025 mmol.

Yield 0.580 g (73%), $[\alpha]_D$=+1.17° at 23° C. $^1$Hnmr ($CD_2Cl_2$) δ 0.91 (3H, s), 0.93 (3H, d), 0.99 (3H, t), 1.30 (10H, broad), 1.55 (6H, broad), 1.79 (3H, m), 3.20 (4H, s), 3.23 (2H, s), 3.34 (2H, m), 3.93 (2H, m), 4.13 (2H, m), 6.92 (2H, d), 7.26 (2H, d), 7.54 (2H, d), 7.64 (2H, d), 8.06 (2H, d), 8.14 (2H, d).

PREPARATION 9.06

Synthesis of Poly-4-(1-propylbutyloxycarbonyl) phenyl 4'-[10-(3-Methyloxetan-3-yl)methoxy] decyloxybiphenyl-4-carboxylate (P6)

The experimental procedure followed was the same as for the preparation of compound P1. The following quantities were used:

Compound 50 0.800 g, 1.190 mmol, SARCAT KI 85 0.020 g, 2 mol %, 0.024 mmol.

Yield 0.170 g (21%). $^1$Hnmr ($CD_2Cl_2$) δ 0.91 (9H, s), 1.31 (12H, broad), 1.60 (10H, broad), 1.77 (2H, m), 3.20 (4H, s), 3.24 (2H, s), 3.35 (2H, m), 3.97 (2H, m), 5.15 (1H, m), 6.95 (2H, broad), 7.29 (2H, broad), 7.57 (2H, broad), 7.67 (2H, broad), 8.10 (2H, broad), 8.18 (2H, broad).

PREPARATION 9.07

Synthesis of Poly-(R)-(−)-4-(1-methylheptyloxycarbonyl)phenyl 4'-[11-(3-Methyloxetan-3-yl)methoxy]undecyloxybiphenyl-4-carboxylate (P7)

The experimental procedure followed was the same as for the preparation of compound P1. The following quantities were used:

Compound 51 0.800 g, 1.140 mmol, SARCAT KI 85 0.019 g, 2 mol %, 0.022 mmol.

Yield 0.450 g (55%), $[\alpha]_D$=−10.07° at 23° C. $^1$Hnmr ($CD_2Cl_2$) δ 0.87 (3H, s), 0.91 (3H, m), 1.30 (20H, broad), 1.60 (9H, m), 1.76 (2H, m), 3.20 (4H, s), 3.24 (2H, s), 3.34 (2H, m), 3.96 (2H, m), 5.12 (1H, m), 6.93 (2H, broad), 7.28 (2H, broad), 7.54 (2H, broad), 7.65 (2H, broad), 8.07 (2H, broad), 8.15 (2H, broad).

PREPARATION 9.08

Synthesis of Poly-(R)-(+)-4-(2-methylbutyloxycarbonyl)phenyl 4'-[11-(3-Methyloxetan-3-yl)methoxy]undecyloxybiphenyl-4-carboxylate (P8)

The experimental procedure followed was the same as for the preparation of compound P1. The following quantities were used:

Compound 52 0.800 g, 1.220 mmol, SARCAT KI 85 0.021 g, 2 mol %, 0.024 mmol.

Yield 0.500 g (63%), $[\alpha]_D$=+4.57° at 23° C. $^1$Hnmr (CD$_2$Cl$_2$) δ 0.91 (3H, s), 0.98 (6H, m), 1.30 (12H, broad), 1.55 (6H, broad), 1.77 (3H, m), 3.20 (4H, s), 3.23 (2H, s), 3.34 (2H, m), 3.91 (2H, m), 4.15 (2H, m), 6.94 (2H, broad), 7.29 (2H, broad), 7.55 (2H, broad), 7.66 (2H, broad), 8.11 (2H, broad), 8.16 (2H, broad).

PREPARATION 9.09

Synthesis of Poly-4-(1-propylbutyloxycarbonyl) phenyl 4'-[11-(Methyloxetan-3-yl)methoxy] undecyloxybiphenyl-4-carboxylate (P9)

The experimental procedure followed was the same as for the preparation of compound P1. The following quantities were used:

Compound 53 0.800 g, 1.170 mmol. SARCAT KI 85 0.020 g, 2 mol %, 0.023 mmol.

Yield 0.42 g (53%). $^1$Hnmr (CD$_2$Cl$_2$) δ 0.91 (9H, s), 1.29 (12H, broad), 1.55 (12H, broad), 1.77 (2H, m), 3.22 (6H, m), 3.34 (2H, m), 3.95 (2H, m), 5.14 (1H, m), 6.95 (2H broad), 7.28 (2H, broad), 7.56 (2H, broad), 7.67 (2H, broad), 8.09 (2H, broad), 8.17 (2H, broad).

EXAMPLE 10

Preparation of Poly-(R)-(-)-4-(1-methylheptyloxycarbonyl)2-fluorophenyl 4'-[6-(3-Methyloxetan-3-yl)methoxy]hexyloxybiphenyl-4-carboxylate (P10), Poly-(R)-(+)-4-(2-methylbutyloxycarbonyl)2-fluorophenyl 4'-[6-(Methyloxetan-3-yl)methoxy]hexyloxybiphenyl4-carboxylate (P11), Poly-4-(1-propylbutyloxycarbonyl)2-fluorophenyl 4'-[6-(3-Methyloxetan-3-yl)methoxy]hexyloxybiphenyl-4-carboxylate (P12), Poly-(R)-(-)-4-(1-methylheptyloxycarbonyl)2-fluorophenyl 4'-[10-(3-Methyloxetan-3-yl)methoxy]decyloxybiphenyl4-carboxylate (P13), Poly-(R)-(+)-4-(2-methylbutyloxycarbonyl)2-fluorophenyl 4'-[10-(3Methyloxetan-3-yl)methoxy]decyloxybiphenyl-4-carboxylate (P14), Poly-4-(1-propylbutyloxycarbonyl)2-fluorophenyl 4'-[10-(3-methyloxetan-3-yl)methoxy]decyloxybiphenyl-4-carboxylate (P15), Poly-(R)-(-)-4-(1-methylheptyloxycarbonyl)2-fluorophenyl 4'-[11-(3-Methyloxetan-3-yl)methoxy]undecyloxybiphenyl-4-carboxylate (P16), Poly-(R)-(+)-4-(2-methylbutyloxycarbonyl)2-fluorophenyl 4'-[11-(3-Methyloxetan-3-yl)methoxy]undecyloxybiphenyl-4-carboxylate (P17), and Poly-4-(1-propylbutyloxycarbonyl)2-fluorophenyl 4'-[11-(Methyloxetan-3-yl)methoxy]undecyloxybiphenyl-4-carboxylate (P18)

Poly-{(S)-(-)-4-(1-trifluoromethylheptyloxycarbonyl)phenyl 4'-[6-(3-Methyloxetan-3-ylmethoxy)hexyloxy]biphenyl-4-carboxylate (P28) Poly-{(S)-(-)-4-(1-trifluoromethylheptyloxycarbonyl)phenyl 4'-[10-(3-Methyloxetan-3-ylmethoxy)decyloxy]biphenyl-4-carboxylate (P29) Poly-{(S)-(-)4-(1-Trifluoromethylheptyloxycarbonyl)phenyl 4'-[11-(3-Methyloxetan-3-ylmethoxy)undecyloxy]bipenyl-4-carboxylate} (P30)

This example is illustrated in FIGS. 2. The compounds prepared in this example were characterised by standard techniques and the results are shown in tables 2. Tables 2 shows the molecular weights and transition temperatures for these compounds.

PREPARATION 10.01

Synthesis of Poly-(R)-(-)-4-(1-methylheptyloxycarbonyl)2-fluorophenyl 4'-[6-(3-Methyloxetan-3-yl)methoxy]hexyloxybiphenyl-4-carboxylate (P10)

Compound 54 (0.800 g, 1.230 mmol) and photoinitiator (SARCAT KI 85) (0.021 g, 2 mol %, 0.025 mmol) were dissolved in dichloromethane (approx. 5 ml) and pippetted onto a sheet of glass. The solvent was evaporated off in an oven (80° C.) over 30 minutes. The polymerisation mixture was then sandwiched by a second sheet of glass and cooled to room temperature under nitrogen and in the dark. The polymerisation mixture was exposed to UV light for 1 h with cooling (N$_{2\,(l)}$ cooled N$_{2\,(g)}$) and then cured in an oven (80° C.) for 1 h. The polymer was then cooled to room temperature and dissolved into dichloromethane (approx. 250 ml) and washed with water (150 ml). The organic solution was then dried (Na$_2$SO$_4$). The drying agent was then filtered off and the solvent removed in vacuo to yield the crude polymer which was purified by precipitation from dichloromethane into hexane. This precipitation process was repeated 3 times to ensure removal of all unreacted monomer. The polymer was then dissolved into dichloromethane and filtered through a 0.45 μm filter. The solvent was removed in vacuo and the polymer dried in vacuo (P$_2$O$_5$).

Yield 0.260 (33%), $[\alpha]_D$=−20.13° at 25° C. $^1$Hnmr (CD$_2$Cl$_2$) δ 0.87 (3H, broad), 0.92 (3H, s), 1.32 (12H, broad), 1.55 (7H, broad), 1.78 (2H, broad), 3.21 (4H, s), 3.25 (2H, s), 3.36 (2H, broad), 3.93 (2H, m) 5.11 (1H, m), 6.93 (2H, broad), 7.33 (1H, broad), 7.55 (2H, broad), 7.65 (2H, broad), 7.86 (2H, broad), 8.16 (2H, broad).

PREPARATION 10.02

Synthesis of Poly-(R)-(+)-4-(2-methylbutyloxycarbonyl)2-fluorophenyl 4'-[6-(Methyloxetan-3-yl)methoxy]hexyloxybiphenyl-4-carboxylate (P11)

The experimental procedure followed was the same as for the preparation of compound P10. The following quantities were used:

Compound 55 0.800 g, 1.320 mmol; SARCAT KI 85 0.022 g, 2 mol %, 0.026 mmol.

Yield 0.500 g (63%). $^1$Hnmr (CD$_2$Cl$_2$) δ 0.91 (3H, s), 0.94 (3H, d), 0.99 (3H, t), 1.27 (2H, m), 1.41 (6H, broad), 1.75 (3H, broad), 3.21 (4H, s), 3.25 (2H, s), 3.35 (2H, m), 3.92 (2H, m), 4.14 (2H, m), 6.91 (2H, d), 7.31 (1H, m), 7.52 (2H, d), 7.63 (2H, d), 7.82 (2H, m), 8.13 (2H, d).

PREPARATION 10.03

Synthesis of Poly-4-(1-propylbutyloxycarbonyl)2-fluorophenyl 4'-[6-(3-Methyloxetan-3-yl)methoxy] hexyloxybiphenyl-4-carboxylate (P12)

The experimental procedure followed was the same as for the preparation of compound P10. The following quantities were used:

Compound 56 0.800 g, 1.260 mmol: SARCAT KI 85 0.021 g, 2 mol %, (0.025 mmol.

Yield 0.600 g (75%). $^1$Hnmr (CD$_2$Cl$_2$) δ 0.92 (9H, s), 1.40 (6H, broad), 1.60 (6H, broad), 1.77 (2H, broad), 3.22 (4H, s), 3.25 (2H, s), 3.36 (2H, m), 3.93 (2H, m), 5.15 (1H, m), 6.93 (2H, broad), 7.33 (1H, broad), 7.54 (2H, broad), 7.65 (2H, broad), 7.87 (2H, broad), 8.16 (2H, broad).

PREPARATION 10.04

Synthesis of Poly-(R)-(–)-4-(1-methylheptyloxycarbonyl)2-fluorophenyl-4'-[10-(3-methyloxetan-3-yl)methoxy]decyloxybiphenyl-4-carboxylate (P13)

The experimental procedure followed was the same as for the preparation of compound P10. The following quantities were used:

Compound 57 0.800 g, 1.140 mmol, SARCAT KI 85 0.019 g, 2 mmol%, 0.02 mmol.

Yield 0.21 g (25%). $^1$Hnmr (CD$_2$Cl$_2$) δ 0.87 (3H, m), 0.90 (3H, s), 1.30 (23H, broad), 1.43 (2H, m), 1.55 (2H, m), 1.75 (2H, m), 3.20 (4H, s), 3.24 (2H, s), 3.34 (2H, m), 3.94 (2H, m), 5.12 (1H, m), 6.94 (2H, broad), 7.32 (1H, broad), 7.56 (2H, broad), 7.67 (2H, broad), 7.87 (2H, broad), 8.16 (2H, broad).

PREPARATION 10.05

Synthesis of Poly-(R)-(+)-4-(2-methylbutyloxycarbonyl)2-fluorophenyl 4'-[10-(3Methyloxetan-3-yl)methoxy]decyloxybiphenyl-4-carboxylate (P14)

The experimental procedure followed was the same as for the preparation of compound P10. The following quantities were used:

Compound 58 0.800 g, 1.21 0 mmol, SARCAT KI 85 0.020 g, 2 mol %, 0.024 mmol.

Yield 0.500 g (63%). $^1$Hnmr (CD$_2$Cl$_2$) δ 0.91 (3H, s), 0.94 (3H, d), 0.99 (3H, t), 1.30 (10H, broad), 1.44 (6H, broad), 1.76 (2H, broad), 1.84 (1H, m), 3.21 (4H, s), 3.23 (2H, s), 3.34 (2H, m), 3.92 (2H, m), 4.16 (2H, m), 6.93 (2H, d), 7.33 (1H, m), 7.54 (2H, d), 7.65 (2H, d), 7.86 (2H, m), 8.15 (2H, d).

PREPARATION 10.06

Synthesis of Poly-4-(1-propylbutyloxycarbonyl)2-fluorophenyl 4'-[10-(3-methyloxetan-3-yl)methoxy] decyloxybiphenyl-4-carboxylate (P15)

The experimental procedure followed was the same as for the preparation of compound P10. The following quantities were used:

Compound 59 0.800 g, 1.160 mmol, SARCAT KI 85 0.020 g, 2 mol %, 0.23 mmol.

Yield 0.250 g (31%). $^1$Hnmr (CD$_2$Cl$_2$) δ 0.91 (9H, s), 1.30 (16H, broad), 1.52 (6H, broad), 1.77 (2H, broad), 3.21 (4H, s), 3.24 (2H, s), 3.34 (2H, m), 3.96 (2H, m), 5.14 (1H, m), 6.95 (2H, broad), 7.32 (1H, broad), 7.58 (2H, broad), 7.68 (2H, broad), 7.88 (2H, broad), 8.18 (2H, broad).

PREPARATION 10.07

Synthesis of Poly-(R)-(–)-4-(1-methylheptyloxycarbonyl)2-fluorophenyl 4'-[11-(3-methyloxetan-3-yl)methoxy]undecyloxybiphenyl-4-carboxylate (P16)

The experimental procedure followed was the same as for the preparation of compound P10. The following quantities were used:

Compound 60 0.800 g, 1.110 mmol, SARCAT KI 85 0.019 g, 2 mol %, 0.022 mmol.

Yield 0.370 g (48%). $^1$Hnmr (CD$_2$Cl$_2$) δ 0.88 (3H, m), 0.91 (3H, s), 1.29 (21H, broad), 1.44 (8H, m), 1.77 (2H, m), 3.20 (4H, s), 3.27 (2H, s), 3.34 (2H, m), 3.97 (2H, m), 5.13 (1H, m), 6.97 (2H, broad), 7.35 (1H, broad), 7.59 (2H, broad), 7.71 (2H, broad), 7.88 (2H, broad), 8.20 (2H, broad).

PREPARATION 10.08

Synthesis of Poly-(R)-(+)-4-(2-Methylbutyloxycarbonyl)2-fluorophenyl 4'-[11-(3-methyloxetan-3-yl)methoxy]undecyloxybiphenyl-4-carboxylate (P17)

The experimental procedure followed was the same as for the preparation of compound P10. The following quantities were used:

Compound 61 0.800 g, 1.180 mmol, SARCAT KI 85 0.020 g, 2 mol %, 0.024 mmol.

Yield 0.600 g (75%). $^1$Hnmr (CD$_2$Cl$_2$) δ 0.90 (3H, s), 0.96 (6H, m), 1.30 (12H, broad), 1.44 (6H, broad), 1.77 (3H, broad), 3.21 (4H, s), 3.23 (2H, s), 3.34 (2H, m), 3.98 (2H, m), 4.13 (2H, m), 6.97 (2H, broad), 7.37 (1H, broad), 7.60 (2H, broad), 7.71 (2H, broad), 7.89 (2H, broad), 8.21 (2H, broad).

PREPARATION 10.09

Synthesis of Poly-4-(1-propylbutyloxycarbonyl)2-fluorophenyl 4'-[11-(Methyloxetan-3-yl)methoxy] undecyloxybiphenyl-4-carboxylate (P18)

The experimental procedure followed was the same as for the preparation of compound P10. The following quantities were used:

Compound 62 0.800 g, 1.140 mmol, SARCAT KI 85 0.019 g, 2 mol %, 0.023 mmol.

PREPARATION 10.10

Poly-{(S)-(–)-4-(1-trifluoromethylheptyloxycarbonyl)phenyl 4'-[6-(3-Methyloxetan-3-ylmethoxy)hexyloxy]bipenyl-4-carboxylate (P28)

The experimental procedure followed was the same as for the preparation of compound P10. The following quantities were used:

Compound 77 0.500 g, 0.730 mmol; SARCAT KI 85 0.012 g, 2 mol %, 0.015 mmol.

Yield 0.220 g (44%), $[\alpha]_D^{24}$=–16.9°, CHCl$_3$. Tg 14.9 SmC* 88.4 SmA* 108.7 Iso ° C.

$^1$Hnmr (CD$_2$Cl$_2$) δ 0.86 (3H, br, t), 0.93 (3H, s), 1.22–1.32 (6H, br, m), 1.33–1.70 (8H, br, m), 1.72–1.85 (2H, br, m), 1.85–1.98 (2H, br, m), 3.23 (4H, s), 3.26 (2H, s), 3.38 (2H, br, t), 3.96 (2H, br, t), 5.57 (1H, br, quint), 6.97 (29H, br, d), 7.35 (2H, br, d), 7.58 (2H, br, d). 7.70 (2H, br, d), 8.17 (4H, br).

PREPARATION 10.11

Poly-{(S)-(–)-4-(1-trifluoromethylheptyloxycarbonyl)phenyl 4'-[10-(3-Methyloxetan-3-ylmethoxy)decyloxy]bipenyl-4-carboxylate (P29)

The experimental procedure followed was the same as for the preparation of compound P10. The following quantities were used:

Compound 78 0.400 g, 0.500 mmol; SARCAT KI 85 0.0091 g, 2 mol %, 0.010 mmol.

Yield 0.230 g (58%), $[\alpha]_D^{24}$ =−185.8°, $CHCl_3$, Tg 1.6 SmC* 98.9 SmA* 136.9 Iso ° C.

$^1$Hnmr ($CDCl_3$) δ 0.85 (3H, br, t), 0.91 (3H, s), 1.23–1.60 (22H, br, m), 1.74–1.80 (2H, br, m), 1.80–1.93 (2H, br, m), 3.20 (4H, s), 3.24 (2H, s), 3.34 (2H, br, t), 3.94 (2H, br, t), 5.52 (1H, br, quint), 6.95 (2H, br, d), 7.31 (2H, br, d), 7.53 (2H, br, d), 7.63 (2H, br, d), 8.13 (2H, br, d), 8.17 (2H, br, d).

PREPARATION 10.12

Poly-{(S)-(−)-4-(1-trifluoromethylheptyloxycarbonyl)phenyl 4'-[11-(3-Methyloxetan-3-ylmethoxy)undecyloxy]bipenyl-4-carboxylate} (P30)

The experimental procedure followed was the same as for the preparation of compound P10. The following quantities were used:

Compound 79 0.900 g, 1.190 mmol; SARCAT KI 85 0.020 g, 2) mol %, 0.024 mmol.

Yield 0.74 g (82%), $[\alpha]_D^{24}$=−26.6°, $CHCl_3$, Tg −0.8 SmC*$_A$ 101.3 SmC* 132.8 Iso ° C.

$^1$Hnmr ($CD_2Cl_2$) δ 0.85 (3H, br, t), 0.91 (3H, s), 1.20–1.65 (24H, br, m), 1.72–1.84 (2H, br, m), 1.84–1.98 (2H, br, m) 3.20 (4H, s), 3.24 (2H, s), 3.34 (2H, br, t), 3.94 (2H, br, t), 5.52 (1H, br, quint), 6.95 (2H, br, d), 7.31 (2H, br, d), 7.53 (2H, br, d), 7.63 (2H, br, d), 8.13 (2H, br, d), 8.17 (2H, br, d).

EXAMPLE 11

Synthesis of Poly-(R)-(−)-4-(1-methylheptyloxycarbonyl)3-fluorophenyl 4'-[6-(3-methyloxetan-3-yl)methoxy]hexyloxybiphenyl-4-carboxylate (P19), Poly-(R)-(+)-4-(2-methylbutyloxycarbonyl)3-fluorophenyl 4'-[6-(Methyloxetan-3-yl)methoxy]hexyloxybiphenyl-4-carboxylate (P20), Poly-4-(1-propylbutyloxycarbonyl)3-fluorophenyl 4'-[6-(3-Methyloxetan-3-yl)methoxy]hexyloxybiphenyl-4-carboxylate (P21), Poly-(R)-(−)-4-(1-Methylheptyloxycarbonyl)3-fluorophenyl 4'-[10-(3-methyloxetan-3-yl)methoxy]decyloxybiphenyl-4-carboxylate (P22), Poly-(R)-(+)-4-(2-methylbutyloxycarbonyl)3-fluorophenyl 4'-[10-(3Methyloxetan-3-yl)methoxy]decyloxybiphenyl-4-carboxylate (P23), Poly-4-(1-propylbutyloxycarbonyl)3-fluorophenyl 4'-[10-(3-Methyloxetan-3-yl)methoxy]decyloxybiphenyl-4-carboxylate (P24), Poly-(R)-(−)-4-(1-methylheptyloxycarbonyl)3-fluorophenyl 4'-[11-(3-methyloxetan-3-yl)methoxy]undecyloxybiphenyl-4-carboxylate (P25), Poly-(R)-(+)-4-(2-methylbutyloxycarbonyl)3-fluorophenyl 4'-[11-(3-Methyloxetan-3-yl)methoxy]undecyloxybiphenyl-4-carboxylate (P26), and Poly-4-(1-propylbutyloxycarbonyl)3-fluorophenyl 4'-[11-(Methyloxetan-3-yl)methoxy]undecyloxybiphenyl-4-carboxylate (P27)

This example is illustrated in FIGS. 2. The compounds prepared in this example were characterised by standard techniques and the results are shown in tables 2. Tables 2 shows the molecular weights and transition temperatures for these compounds.

PREPARATION 11.01

Synthesis of Poly-(R)-(−)-4-(1-methylheptyloxycarbonyl)3-fluorophenyl 4'-[6-(3-Methyloxetan-3-yl)methoxy]hexyloxybiphenyl-4-carboxylate (P19)

Compound 63 (0.800 g, 1.230 mmol) and photoinitiator (SARCAT KI 85) (0.021 g, 2 mol %, 0.025 mmol) were dissolved in dichloromethane (approx. 5 ml) and and pipetted onto a sheet of glass. The solvent was evaporated off in an oven (80° C.) over 30 minutes. The polymerisation mixture was then sandwiched by a second sheet of lass and cooled to room temperature under nitrogen and in the dark. The polymerisation mixture was exposed to UV light for 1 h with cooling ($N_{2\;(l)}$ cooled $N_{2\;(g)}$) and then cured in an oven (80° C.) for 1 h. The polymer was then cooled to room temperature and dissolved into dichloromethane (approx. 250 ml) and washed with water (150 ml). The organic solution was then dried ($Na_2SO_4$). The drying agent was then filtered off and the solvent removed in vacuo to yield the crude polymer which was purified by precipitation from dichloromethane into hexane. This precipitation process was repeated 3 times to ensure removal of all unreacted monomer. The polymer was then dissolved into dichloromethane and filtered through a 0.45 μm filter. The solvent was removed in vacuo and the polymer dried in vacuo ($P_2O_5$).

Yield 0.430 g (52%). $^1$Hnmr ($CD_2Cl_2$) δ 0.88 (3H, broad), 0.93 (3H, s), 1.30 (13H, broad), 1.45 (6H, broad), 1.79 (2H, broad), 3.23 (4H, s), 3.25 (2H, s), 3.38 (2H, broad), 3.98 (2H, m), 5.15 (1H, m), 6.97 (2H, broad), 7.12 (2H, broad), 7.58 (2H, broad), 7.72 (2H, broad), 8.00 (1H, broad), 8.18 (2H, broad).

PREPARATION 11.02

Synthesis of of Poly-(R)-(+)-4-(2-methylbutyloxycarbonyl)3-fluorophenyl 4'-[6-(Methyloxetan-3-yl)methoxy]hexyloxybiphenyl-4-carboxylate (P20)

The experimental procedure followed was the same as for the preparation of compound P19. The following quantities were used:

Compound 64 0.800 g 1.320 mmol; SARCAT KI 85 0.022 g, 2 mol %, 0.026 mmol.

Yield 0.520 g (65%). $^1$Hnmr ($CD_2Cl_2$) δ 0.91 (3H, s), 0.93 (3H, d), 0.96 (31H, t), 1.26 (2H, m), 1.43 (6H, broad), 1.78 (3H, broad), 3.20 (4H, s), 3.23 (2H, s), 3.36 (2H, m), 3.97 (2H, m), 4.14 (2H, m), 6.95 (2H, broad), 7.10 (2H, broad), 7.56 (2H, broad), 7.68 (2H, broad), 7.99 (1H, broad), 8.15 (2H, broad).

PREPARATION 11.03

Synthesis of Poly-4-(1-propylbutyloxycarbonyl)3-fluorophenyl 4'-[6-(3-Methyloxetan-3-yl)methoxy] hexyloxybiphenyl-4-carboxylate (P21)

The experimental procedure followed was the same as for the preparation of compound P19. The following quantities were used:

Compound 65 0.800 g, 1.260 mmol; SARCAT KI 85 0.021 g, 2 mol %, 0.025 mmol.

Yield 0.250 g (30%). $^1$Hnmr ($CD_2Cl_2$) δ 0.91 (3H$_1$ s), 0.94 (6H, d), 1.31 (6H, broad), 1.60 (8H, broad), 1.81 (2H, broad), 3.70 (4H, s), 3.23 (2H, s), 3.34 (2H, m), 3.90 (2H, m), 5.17 (1H, m), 6.97 (2H, broad), 7.09 (2H, broad), 7.58 (2H, broad), 7.68 (2H, broad), 8.02 (1H, broad), 8.19 (2H, broad).

PREPARATION 11.04

Synthesis of Poly-(R)-(−)-4-(1-methylheptyloxycarbonyl)3-fluorophenyl 4'-[10-(3-Methyloxetan-3-yl)methoxy]decyloxybiphenyl-4-carboxylate (P22)

The experimental procedure followed was the same as for the preparation of compound P19. The following quantities were used:

Compound 66 0.800 g, 1.140 mmol, SARCAT KI 85 0.019 g, 2 mol %, 0.022 mmol.

Yield 0.600 g (75%). $^1$Hnmr (CD$_2$Cl$_2$) δ 0.86 (3H, t), 0.89 (3H, s), 1.27–1.54 (27H, broad), 1.73 (2H, broad), 3.18 (4H, s), 3.21 (2H, s), 3.31 (2H, m), 3.90 (2H, m), 5.11 (1H, m), 6.92 (2H, broad), 7.07 (2H, broad), 7.53 (2H, broad), 7.63 (2H, broad), 7.98 (1H, broad), 8.12 (2H, broad).

PREPARATION 11.05

Synthesis of Poly-(R)-(+)-4-(2-methylbutyloxycarbonyl)3-fluorophenyl 4'-[10-(3Methyloxetan-3-yl)methoxy]decyloxybiphenyl-4-carboxylate (P23)

The experimental procedure followed was the same as for the preparation of compound P19. The following quantities were used:

Compound 67 0.800 g, 1.210 mmol, SARCAT KI 85 0.020 g, 2 mol %, 0.024 mmol.

Yield 0.530 g (66%). $^1$Hnmr (CD$_2$Cl$_2$) δ 0.90 (3H, s), 0.93 (3H, t), 0.98 (3H, d), 1.28 (10H, broad), 1.51 (6H, broad), 1.74 (3H, broad), 3.19 (4H, s), 3.21 (2H, s), 3.32 (2H, m), 3.91 (2H, m), 4.1 (2H, m), 6.92 (2H, broad), 7.07 (2H, broad), 7.53 (2H, broad), 7.63 (2H, broad), 7.95 (1H, broad), 8.12 (2H, broad).

PREPARATION 11.06

Synthesis of Poly-4-(1-propylbutyloxycarbonyl)3-fluorophenyl 4'-[10-(3-Methyloxetan-3-yl)methoxy]decyloxybiphenyl-4-carboxylate (P24)

The experimental procedure followed was the same as for the preparation of compound P19. The following quantities were used:

Compound 68 0.800 g, 1.160 mmol, SARCAT KI 85 0.020 g, 2 mol %, 0.023 mmol. Yield 0.370 g (46%).

$^1$Hnmr (CD$_2$Cl$_2$) δ 0.91 (3H, s) 0.94 (6H, t), 1.31 (14H, broad), 1.42 (4H, broad), 1.65 (4H, broad), 1.77 (2H, broad), 3.21 (4H, s), 3.24 (2H, s), 3.35 (2H, m), 3.97 (2H, m), 5.17 (1H, m), 6.97 (2H, broad), 7.11 (2H, broad), 7.59 (2H, broad), 7.69 (2H, broad), 8.00 (1H, broad), 8.18 (2H, broad).

PREPARATION 11.07

Synthesis of Poly-(R)-(−)-4-(1-methylheptyloxycarbonyl)3-fluorophenyl 4'-[11-(3-Methyloxetan-3-yl)methoxy]undecyloxybiphenyl-4-carboxylate (P25)

The experimental procedure followed was the same as for the preparation of compound P19. The following quantities were used:

Compound 69 0.800 g, 1.110 mmol, SARCAT KI 85 0.019 g, 2 mol %, 0.022 mmol.

Yield 0.300 g (38%). $^1$Hnmr (CD$_2$Cl$_2$) δ 0.86 (3H, s), 0.89 (3H, t), 1.27–1.54 (29H, broad), 1.75 (2H, broad), 3.18 (4H, s), 3.21 (2H, s), 3.32 (2H, m), 3.95 (2H, m), 5.13 (1H, m), 6.95 (2H, broad), 7.10 (2H, broad), 7.57 (2H, broad), 7.68 (2H, broad), 7.94 (1H, broad), 8.16 (2H, broad).

PREPARATION 11.08

Synthesis of Poly-(R)-(+)-4-(2-methylbutyloxycarbonyl)3-fluorophenyl 4'-[11-(3-Methyloxetan-3-yl)methoxy]undecyloxybiphenyl-4-carboxylate (P26)

The experimental procedure followed was the same as for the preparation of compound P19. The following quantities were used:

Compound 70 0.800 g, 1.180 mmol, SARCAT KI 85 0.020 g, 2 mol %, 0.024 mmol.

Yield 0.430 g (54%). $^1$Hnmr (CD$_2$Cl$_2$) δ 0.91 (3H, s), 0.95 (3H, t), 1.01 (3H, d), 1.30 (12H, broad), 1.46 (6H, broad), 1.79 (3H, broad), 3.21 (4H, s), 3.23 (2H, s), 3.34 (2H, m), 3.99 (2H, m), 4.17 (2H, m), 6.99 (2H, broad), 7.13 (2H, broad), 7.59 (2H broad), 7.70 (2H, broad), 8.01 (1H, broad), 8.18 (2H, broad).

PREPARATION 11.09

Poly-4-(1-propylbutyloxycarbonyl)3-fluorophenyl 4'-[11-(Methyloxetan-3-yl)methoxy]undecyloxybiphenyl-4-carboxylate (P27)

The experimental procedure followed was the same as for the preparation of compound P19. The following quantities were used:

Compound 71 0.800 g, 1.140 mmol, SARCAT KI 85 0.019 g, 2 mol %, 0.023 mmol.

Yield 0.350 g (44%). $^1$Hnmr (CD$_2$Cl$_2$) δ 0.91 (3H, s), 0.94 (6H, t), 1.30 (16H, broad), 1.64 (8H, broad), 1.77 (2H, broad), 3.21 (4H, s), 3.23 (2H, s), 3.35 (2H, m), 3.98 (2H, m), 5.17 (1H, m), 6.98 (2H, broad), 7.12 (2H, broad), 7.58 (2H, broad), 7.68 (2H, broad), 8.00 (1H, broad), 8.19 (2H, broad).

EXAMPLE 12

Preparation of Poly-{(R)-(+)-4'-(1-methylheptyloxy)-3'-fluorobiphenyl-4-yl 4-[6-(3-Methyloxetan-3-ylmethoxy)hexyloxy]benzoate (P31) Poly-{(R)-(+)-4'-(1-Methylheptyloxy)-3'-fluorobiphenyl-4-yl 4-[10-(3-Methyloxetan-3-ylmethoxy)decyloxy]benzoate} (P32) Poly-{(R)-(+)-4'-(1-methylheptyloxy)-3'-fluorobiphenyl-4-yl 4-[11-(3-Methyloxetan-3-ylmethoxy)undecyloxy]benzoate} (P33)

This example is illustrated in FIGS. 2. The compounds prepared in this example were characterised by standard techniques and the results are shown in tables 2. Tables 2 shows the molecular weights and transition temperatures for these compounds.

PREPARATION 12.01

Poly-{(R)-(+)-4'-(1-methylheptyloxy)-3'-fiuotobiphenyl-4-yl 4-[6-(3-Methyloxetan-3-ylmethoxy)hexyloxy]benzoate (P31)

Compound 88 (1.000 g, 1.610 mmol) and photoinitiator (SARCAT KI 85) (0.027 g, 2 mol %, 0.032 mmol) were dissolved in dichloromethane (approx. 5 ml) and pippetted onto a sheet of glass over an area of 192 cm$^2$. The solvent was evaporated oft in an oven (80° C.) over 30 minutes. The polymerisation mixture was then sandwiched by a second sheet of glass and cooled to room temperature under nitrogen and in the dark. The polymerisation mixture was exposed to UV light for 1 h with cooling ($N_{2\,(l)}$ cooled $N_{2\,(g)}$) and then cured in an oven (80° C.) for 1 h. The polymer was then cooled to room temperature and dissolved in dichloromethane (approx. 250 ml) and washed with water (150 ml). The organic solution was then dried ($Na_2SO_4$). The drying agent was filtered off and the solvent removed in vacuo to yield the crude polymer which was purified by precipitation from dichloromethane with hexane. This precipitation process was repeated 3 times to ensure removal of all unreacted monomer. The polymer was then dissolved in dichloromethane and filtered through a 0.45 µm filter. The solvent was removed in vacuo and the polymer dried in vacuo ($P_2O_5$).

Yield 0.890 g (89%), $[\alpha]_D^{24}$=+2.4°, $CHCl_3$, Tg 9.6 SmC* 130.7 Iso ° C. $^1$Hnmr ($CD_2Cl_2$) δ 0.86 (3H, br, t), 0.92 (3H, s), 1.23–1.36 (15H, br, m), 1.35–1.50 (2H, br, m), 1.50–1.65 (2H, br, m), 1.75 (2H, br, quint), 3.22 (4H, s), 3.25 (2H, s), 3.36 (2H, br, t), 3.97 (2H, br, t), 4.37 (1H, br, sext), 6.91 (2H, br, d), 6.99 (1H, br, t), 7.18 (2H, br, d), 7.25 (2H, br, m), 7.51 (2H, br, d), 8.06 (2H, br, d).

PREPARATION 12.02

Poly-{(R)-(+)4'-(-methylheptyloxy)-3'-fluorobiphenyl-4-yl 4-[10-(3-Methyloxetan-3-ylmethoxy)decyloxy]benzoate} (P32)

The experimental procedure followed was the same as for the preparation of compound 31. The following quantities were used:

Compound 89 1.000 g, 1.480 mmol; SARCAT KI 85 0.025 g, 2 mol %, 0.030 mmol.

Yield 0.610 g (61%), $[\alpha]_D^{24}$=+2.4°, $CHCl_3$, Tg 5.8 SmC*$_A$ 128.1 SmC* 147.3 Iso ° C. $^1$Hnmr ($CD_2Cl_2$) δ 0.87 (3H, br, t), 0.94 (3H, s), 1.24–1.37 (21H, br, m), 1.37–1.48 (4H, m), 1.48–1.65 (2H, br, m), 1.78 (2H, br, quint), 3.21 (4H, s), 3.25 (2H, s), 3.31 (2H, br, t), 4.01 (2H, br, t), 4.41 (1H, br, sext), 6.98 (2H, br, d), 7.03 (1H, br, t), 7.22 (2H, br, d), 7.31 (2H, br, m), 7.57 (2H, br, d), 8.13 (2H, br, d).

PREPARATION 12.03

Poly-{(R)-(+)-4'-(1-methylheptyloxy)-3'-fluorobiphenyl-4-yl 4-[11-(3-Methyloxetan-3-ylmethoxy)undecyloxy]benzoate} (P33)

The experimental procedure followed was the same as for the preparation of compound 31. The following quantities were used:

Compound 90 1.000 g, 1.450 mmol; SARCAT KI 85 0.025 g, 2 mol %, 0.029 mmol.

Yield 0.900 g (90%), $[\alpha]_D^{24}$=+1.0°, $CHCl_3$, SmX* 25.5 SmC*$_A$ 135.2 SmC* 144.7 Iso ° C. $^1$Hnmr ($CD_2Cl_2$) δ 0.85 (3H, br, t), 0.88 (3H, s), 1.22–1.37 (23H, br, m), 1.37–1.47 (4H, br, m), 1.47–1.64 (2H, br, m), 1.68–1.83 (2H, br, quint), 3.16 (4H, s), 3.18 (2H, s), 3.37 (2H, br, t), 3.99 (2H, br, t), 4.38 (1H, br, sext), 6.95 (2H, br, d), 7.02 (1H, br, t), 7.22 (2H, br, d), 7.30 (2H, br, m), 7.54 (2H, br, d), 8.09 (2H, br, d).

EXAMPLE 13

Use of a Material and Device Embodying the Present Invention

The use of the device and the material will be described with reference to FIG. 3. The liquid crystal device consists of two transparent plates, 1 and 2, for example made from glass. These plates are coated on their internal face with transparent conducting electrodes 3 and 4. An alignment layer (not shown) is introduced onto the internal faces of the cell so that a planar orientation of the molecules making up the liquid crystalline material will be approximately parallel to the glass plates 1 and 2. This is done by coating the glass plates 1,2 complete with conducting electrodes so that the intersections between each column and row form an x, y matrix of addressable elements or pixels. Prior to the construction of the cell the alignment layer is rubbed with a roller covered in cloth (for example made from velvet) in a given direction, the rubbing directions being arranged parallel (same or opposite direction) upon construction of the cell. A spacer (not shown) eg of polymethyl methacrylate separates the glass plates 1 and 2 to a suitable distance eg 2 microns. Liquid crystal material 8 is introduced between glass plates 1,2 by filling the space in between them. This may be done by flow filling the cell using standard techniques. The spacer is sealed with an adhesive in a vacuum using an existing technique. Polarisers 10, 11 may be arranged in front of and behind the cell.

Alignment layers may be introduced onto one or more of the cell walls by one or more of the standard surface treatment techniques such as rubbing, oblique evaporation or as described above by the use of polymer aligning layers.

The device may operate in a transmissive or reflective mode. In the former, light passing through the device, eg from a tungsten bulb, is selectively transmitted or blocked to form the desired display. In the reflective mode a mirror, or diffuse reflector, (12) is placed behind the second polariser 11 to reflect ambient light back through the cell and two polarisers. By making the mirror partly reflecting the device may be operated both in a transmissive and reflective mode.

In an alternative embodiment a single polariser and dye material may be combined. The liquid crystal material 8 when introduced into the cell consists of liquid crystal monomers and a cationic initiator. It may also contain a reagent which will limit the molecular weight of the polymer for example a chain transfer reagent and it may also include a radical photoinitiator and/or thermal initiator.

The monomer material may be aligned before polymerisation using standard techniques, for example by heating up to and cooling from the isotropic phase or from a liquid crystal phase such as a nematic or chiral nematic phase. It is also possible that the liquid crystal polymer may be aligned by one or more techniques including the use of surface forces, shear alignment or field alignment.

It is possible that following polymerisation there ma!i still be some amount of low molar mass material remaining. This may be unreacted monomer or low molar mass additives which do not bear polymerisable groups.

Polymerisation may be carried out by using any of the known techniques. For example the monomer material plus cationic initiator may also contain a photoinitiator and be exposed to UV light, heat may also be applied to permit polymerisation within a given phase of the monomer and/or polymer.

Alternatively the polymerisation process may take place in the presence of heat and a thermal initiator. However if this technique is used it is preferable if it is carried out at a temperature which corresponds to a liquid crystal phase of the monomer material.

A further alternative involves placing a solution of the monomer and a photoinitiator onto a first sheet of glass, the solvent is then evapourated off in an oven. The monomeric material remaining after evapouration is then sandwiched between the first sheet of glass and a second sheet of glass. The monomeric material is then cooled to room temperature under nitrogen and in the dark. Once at room temperature the monomeric material is then exposed to UV light.

Polymerisation can be carried out between the transparent plates 1 and 2 shown in FIG. 1; the monomer having been flowed between the plates 1 and 2 by standard techniques. Alternatively the polymer can be synthesised prior to insertion between the plates 1 and 2. The insertion of the polymer being achieved either by capillary action or by the use of a vacuum generated in the liquid crystal cell.

TABLE 1A

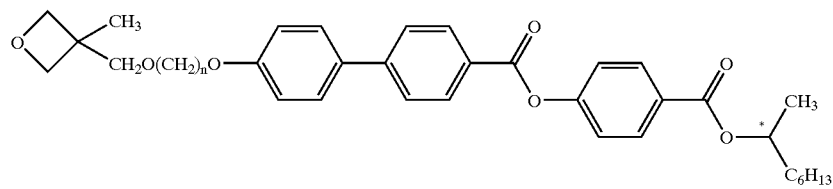

| Compound Number | n | Mp$^a$ (° C.) | Iso | SmA* | SmC* | SmC$_A$* | Recryst$^b$ |
|---|---|---|---|---|---|---|---|
| 45 | 6 | 34.5 (24.2) | • 102.1 (4.0) | • 58.3 (0.2) | • — | — | — | <−70 |
| 48 | 10 | 40.9 (33.8) | • 102.7 (1.3) | • 82.0 (0.4) | • — | — | — | −2.3 |
| 51 | 11 | 49.1 (45.6) | • 76.5 (2.8) | — | — | • 55.0 | • (40.8)$^c$ | 8.9 (19.5) |

$^a$determined by DSC after maintaining temperature at −70° C. for 30 minutes
$^b$determined by DSC
$^c$transition at 40.8° C. to an unidentified phase

TABLE 1B

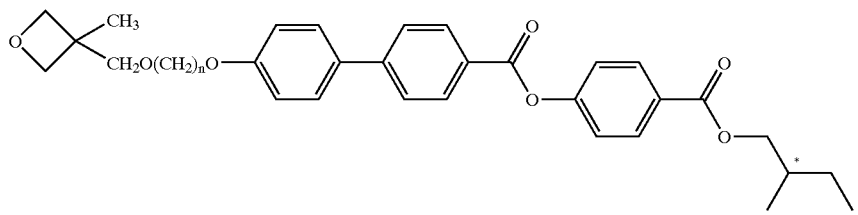

| Compound Number | n | Mp$^a$ (° C.) | Iso | BP | SmA* | SmC* | Recryst$^b$ |
|---|---|---|---|---|---|---|---|
| 46 | 6 | 36.6 (25.4) | • 134.1 (4.6) | • 130.7 | • 90.6 (0.2) | • 13.3$^c$ (0.2) | <−70 |
| 49 | 10 | −5.6 (4.1) | • 135.3 (4.4) | — | • 101.3 (0.1) | • 25.5$^d$ (0.6) | −14.0 (3.7) |
| 52 | 11 | 52.0 (46.8) | • 130.5 (7.2) | — | • 104.5 (0.1) | • — | 3.9 (13.7) |

$^a$determined by DSC after maintaining temperature at −70° C. for 30 minutes
$^b$determined by DSC
$^c$transition at 13.3° C. to an unidentified phase
$^d$transition at 25.5° C. to an unidentified phase

TABLE 1C

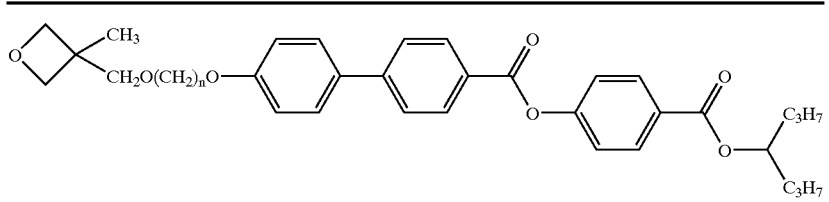

| Compound Number | n | Mp$^a$ (° C.) | Transition Temperatures (° C.) | | | | | |
|---|---|---|---|---|---|---|---|---|
| | | | Iso | | SmA | | SmC | Recryst$^b$ |
| 47 | 6 | 35.7 (34.6) | • | 64.9 (3.1) | • | 49.5 (0.2) | • | <−70 |
| 50 | 10 | 40.7 (30.3) | • | 65.0 (1.0) | • | 44.9 (0.2) | • | <−70 |
| 53 | 11 | 22.4 (40.8) | • | 36.7 (2.2) | — | — | • | <−70 |

$^a$determined by DSC after maintaining temperature at −70° C. for 30 minutes
$^b$determined by DSC

TABLE 1D

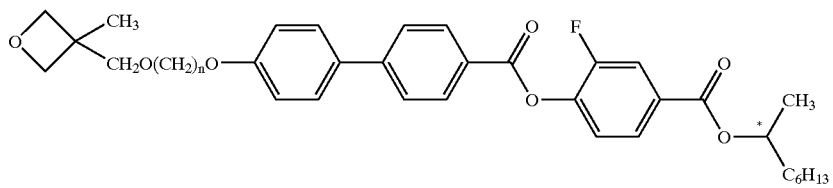

| Compound Number | n | Mp$^a$ (° C.) | Transition Temperatures (° C.) | | | | | |
|---|---|---|---|---|---|---|---|---|
| | | | Iso | | SmA* | | SmC* | Recryst$^b$ |
| 54 | 6 | <−70 | • | 61.6 (2.0) | • | 40.0 (0.1) | • | <−70 |
| 57 | 10 | 3.1 (1.0) | • | 70.9 (1.7) | • | 44.9 (0.2) | • | <−70 |
| 60 | 11 | 66.8 (34.4) | • | 71.2 (1.5) | • | (46.4) | • | 11.5 (25.2) |

$^a$Determined by DSC after maintaining temperature at −70° C. for 30 minutes
$^b$Determined by DSC

TABLE 1E

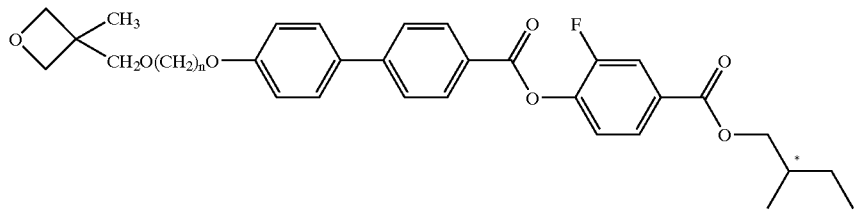

| Compound Number | n | Mp$^a$ (° C.) | Transition Temperatures (° C.) | | | | | | | | | |
|---|---|---|---|---|---|---|---|---|---|---|---|---|
| | | | Iso | | BP III | | N* | | SmA* | | SmC* | Recryst$^b$ |
| 55 | 6 | 0.8 (9.8) | • | 99.0 (0.4)$^c$ | • | 95.5 (0.4)$^c$ | • | 89.6 (1.2) | • | 51.9 (0.1) | • | <−70 |
| 58 | 10 | 31.3 (13.1) | • | 111.2 (1.5) | — | — | — | — | • | 54.7 (<0.1) | • | <−70 |

TABLE 1E-continued

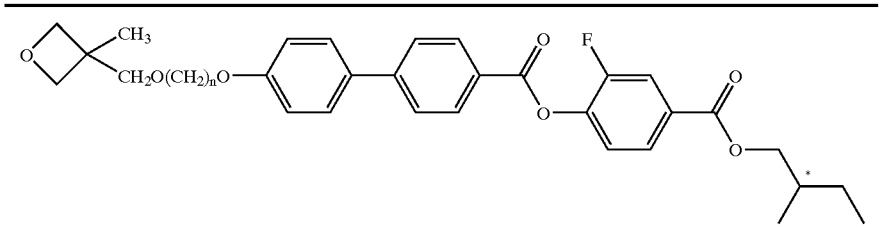

| Compound Number | n | Mp[a] (° C.) | Iso | BP III | N* | SmA* | SmC* | Recryst[b] |
|---|---|---|---|---|---|---|---|---|
| 61 | 11 | 73.4 (30.6) | • 102.6 (6.3) | — | — | — | • 74.8 (0.2) | • 14.2 (3.1) |

[a]Determined by DSC after maintaining temperature at −70° C. for 30 minutes
[b]Determined by DSC
[c]The peak on the DSC showed the existence of two peaks which were inseparable, this enthalpy value is the combined enthalpy for both transitions.

TABLE 1F

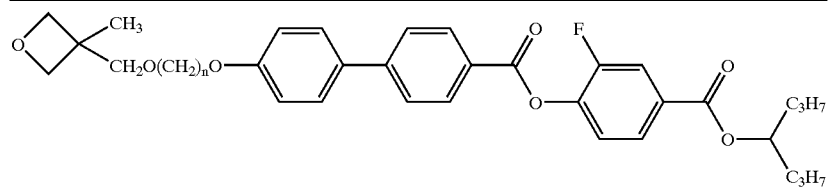

| Compound Number | n | Mp[a] (° C.) | Iso | SmC | Recryst[b] |
|---|---|---|---|---|---|
| 56 | 6 | <−70 | • 10.3 (0.7) | • | <−70 |
| 59 | 10 | <−70 | • 10.6 (0.5) | • | <−70 |
| 62 | 11 | 7.9 (28.9) | • — | — | −44.3 (16.0) |

[a]Determined by DSC after maintaining temperature at −70° C. for 30 minutes
[b]Determined by DSC

TABLE 1G

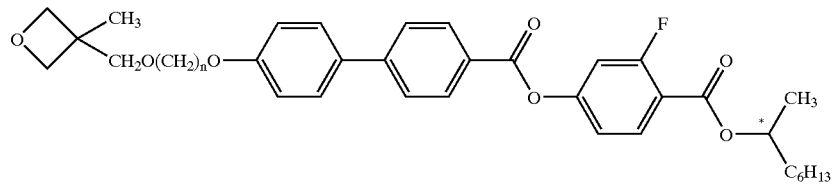

| Compound Number | n | Mp[a] (° C.) | Iso | SmA* | SmC* | SmC$_A$* | Recryst[b] |
|---|---|---|---|---|---|---|---|
| 63 | 6 | <−70 | • 77.8 (2.0) | • 63.9 (0.5) | • — | — | <−70 |
| 66 | 10 | <−70 | • 70.8 (1.4) | — | — | • — | — | <−70 |
| 69 | 11 | 41.9 (42.7) | • 65.2 (0.3) | — | — | • 46.5 | • (41.0)[c] | 5.7 (14.8) |

[a]Determined by DSC after maintaining temperature at −70° C. for 30 minutes
[b]Determined by DSC
[c]Transition at 41.0° C. from SmC$_A$ to an unidentified phase

TABLE 1H

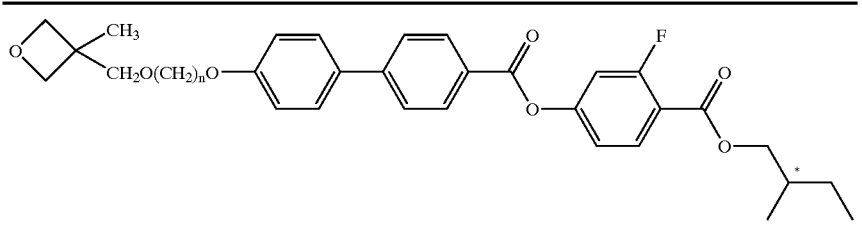

| Compound Number | n | Mp[a] (° C.) | Iso | | SmA* | | SmC* | | SmC$_A$* | Recryst[b] |
|---|---|---|---|---|---|---|---|---|---|---|
| 64 | 6 | 60.4 | • | | 140.5 | • | 123.6 | • | — | — | <−70 |
| | | (56.3) | | | (4.9) | | (<0.1) | | | | |
| 67 | 10 | −20.1 | • | | 143.7 | • | 98.9 | • | — | — | −21.4 |
| | | (2.9) | | | (6.6) | | (0.2) | | | | (2.0) |
| 70 | 11 | 32.4 | • | | 124.9 | • | 112.3 | • | 65.0 | • | −10.0 |
| | | (20.7) | | | (6.1) | | (0.2) | | (0.1) | | (6.5) |

[a]Determined by DSC after maintaining temperature at −70° C. for 30 minutes
[b]Determined by DSC

TABLE 1I

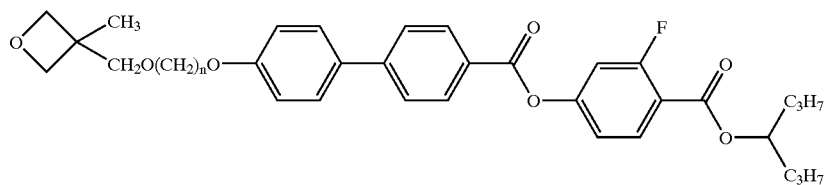

| Compound Number | n | Mp[a] (° C.) | Iso | | SmA | Recryst[b] |
|---|---|---|---|---|---|---|
| 65 | 6 | 42.6 | • | (30.4) | • | <−70 |
| | | (3.2) | | (0.3) | | |
| 68 | 10 | 32.1 | • | (29.0) | • | <−70 |
| | | (52.1) | | (1.0) | | |
| 71 | 11 | 15.7 | • | 21.9 | • | <−70 |
| | | (16.5) | | (1.8) | | |

[a]Determined by DSC after maintaining temperature at −70° C. for 30 minutes
[b]Determined by DSC

TABLE 1J

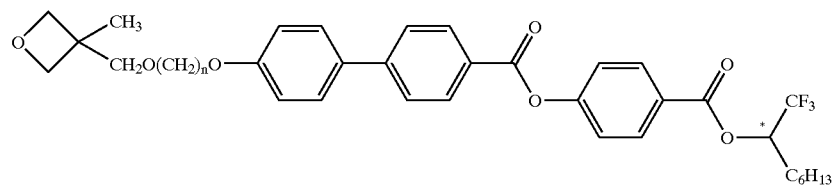

| Compound Number | n | Mp (° C.) | Iso | | SmA* | | SmC* | | recryst[a] |
|---|---|---|---|---|---|---|---|---|---|
| 77 | 6 | — | • | | 59.3 | • | 43.5 | • | <−70 |
| | | | | | (1.2) | | (0.2) | | |
| 78 | 10 | 28.8 | • | | (19.6) | — | — | • | <−70 |
| | | (43.2) | | | (1.8) | | | | |
| 79 | 11 | 58.1 | • | | (25.3) | — | — | • | 8.8 |
| | | (65.0) | | | (2.0) | | | | (35.7) |

[a]Determined by DSC

TABLE 1K

[Chemical structure: oxetane-CH₃/CH₂O(CH₂)ₙO-phenyl-C(=O)O-phenyl-phenyl(F)-O-CH(CH₃)C₆H₁₃]

| Compound Number | n | Mp (° C.) | Iso | N* | TGB$_A$* | SmA* | SmC* | Recryst[b] |
|---|---|---|---|---|---|---|---|---|
| 88 | 6 | 30.9 (29.4) | • | 51.6 (0.3) | • 48.4[a] | • 47.2 (0.6) | • (18.2) (0.1) | • <-50 |
| 89 | 10 | 33.7 (40.3) | • | 68.4 (5.2) | — — | — | • 45.4 (0.1) | • <-50 |
| 90 | 11 | 31.1 (36.1) | • | 69.9 (5.5) | — — | — | • 50.3 (<0.1) | • 7.6 (18.5) |

[a]Not observed by DSC
[b]Determined by DSC

TABLE 2A

[Chemical structure: polymer backbone with -CH₂O(CH₂)ₙO-biphenyl-C(=O)O-phenyl-C(=O)O-CH(CH₃)C₆H₁₃]

| Compound Number | n | Mn | Mw | Mw/Mn | DP | Iso | SmA* | SmC* | Tg[a] |
|---|---|---|---|---|---|---|---|---|---|
| P1 | 6 | 14575 | 30449 | 2.0 | 23 | • 167.8 (1.7) | • 150.2 (0.3) | • | 11.8 |
| P4 | 10 | 17141 | 33124 | 1.9 | 25 | • 205.8 (3.2) | • 193.4 (0.2) | • | 21.6 |
| P7 | 11 | 13012 | 20763 | 1.6 | 19 | • 176.0 (7.8) | • 161.6 (0.7) | • | 16.0 |

[a]Determined by DSC

TABLE 2B

[Chemical structure: polymer backbone with -CH₂O(CH₂)ₙO-biphenyl-C(=O)O-phenyl-C(=O)O-CH₂CH(C₂H₅)...]

| Compound Number | n | Mn | Mw | Mw/Mn | DP | Iso | SmA* | SmC* | Tg[a] |
|---|---|---|---|---|---|---|---|---|---|
| P2 | 6 | 10998 | 21497 | 2.0 | 19 | • 227.8 (9.2) | • 190.3 (<0.1) | • | 19.0 |
| P5 | 10 | 14073 | 26995 | 1.9 | 22 | • 258.1 (12.5) | • 240.5 (<0.1) | • | 13.2 |
| P8 | 11 | 9496 | 15125 | 1.6 | 15 | • 237.2 (9.3) | • 216.5 (>0.1) | • | 6.8 |

[a]Determined by DSC

TABLE 2C
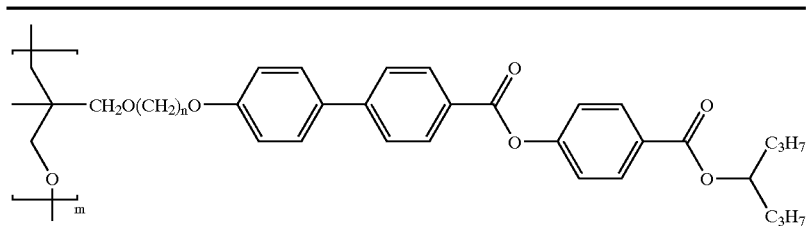
| Compound Number | n | Mn | Mw | Mw/Mn | DP | Iso | | SmA | | SmC | | Tg[a] |
|---|---|---|---|---|---|---|---|---|---|---|---|---|
| P3 | 6 | 13700 | 20674 | 1.5 | 22 | • | 146.5 (5.0) | • | 134.5 (0.1) | • | | 11.2 |
| P6 | 10 | 11468 | 15674 | 1.4 | 17 | • | 170.5 (1.0) | • | 150.6 [b] | • | | 7.0 |
| P9 | 11 | 11473 | 22455 | 1.6 | 21 | • | 152.3 (5.0) | — | | — | • | −6.1 |
[a]Determined by DSC
TABLE 2D
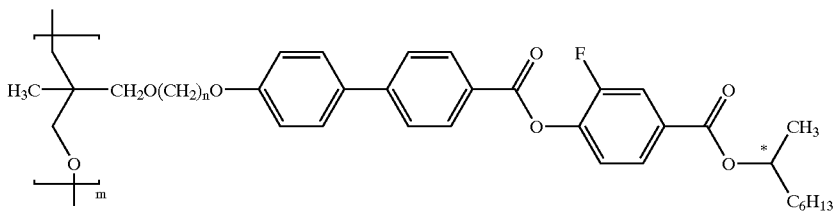
| Compound Number | n | Mn | Mw | Mw/Mn | DP | Iso | | SmA* | | SmC* | | Tg[a] |
|---|---|---|---|---|---|---|---|---|---|---|---|---|
| P10 | 6 | 9122 | 14052 | 1.5 | 14 | • | 147.6 (5.5) | • | 127.9[b] | • | | 10.3 |
| P13 | 10 | 14975 | 24378 | 1.6 | 21 | • | 149.9 (5.0) | • | 133.7 (0.1) | • | | −1.8 |
| P16 | 11 | 9759 | 13406 | 1.4 | 15 | • | 127.1 (3.5) | • | 110.9[b] | • | | −4.0 |
[a]Determined by DSC
[b]The enthalpy value was not obtainable because the SmC*-SmA* peak overlapped the broad SmA*-Iso peak
TABLE 2E
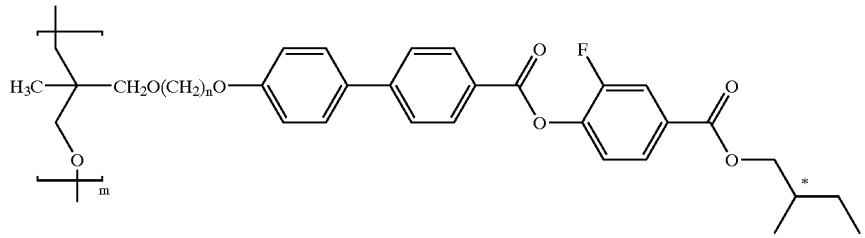
| Compound Number | n | Mn | Mw | Mw/Mn | DP | Iso | | SmA* | | SmC* | | | Tg[a] |
|---|---|---|---|---|---|---|---|---|---|---|---|---|---|
| P11 | 6 | 13757 | 30550 | 2.2 | 23 | • | 192.7 (6.5) | • | 178.7 (0.1) | • | 161.5[b] (0.3) | | 1.9 |
| P14 | 10 | 12665 | 28286 | 2.2 | 20 | • | 220.1 (5.5) | • | 189.7[c] | • | 130.1[d] (<0.1) | | 7.4 |

TABLE 2E-continued

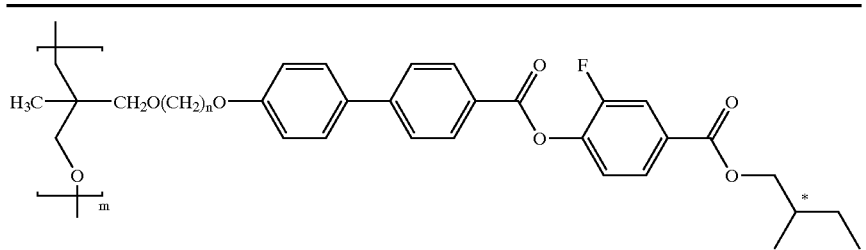

| Compound | | | | | | Transition Temperatures (° C.) | | | | | |
|---|---|---|---|---|---|---|---|---|---|---|---|
| Number | n | Mn | Mw | Mw/Mn | DP | Iso | | SmA* | | SmC* | Tg[a] |
| P17 | 11 | 7538 | 10021 | 1.3 | 12 | • | 189.9 (5.6) | • | 159.8 (0.1) | • | — | −1.6 |

[a]Determined by DSC
[b]Transition at 161.5° C. to an unidentified phase (detected by DSC)
[c]The enthalpy for this transition was not obtainable because the SmC*-SmA* peak over-lapped the SmA*-Iso peak
[d]Transition at 130.1° C. to an unidentified phase (detected by DSC)

TABLE 2F

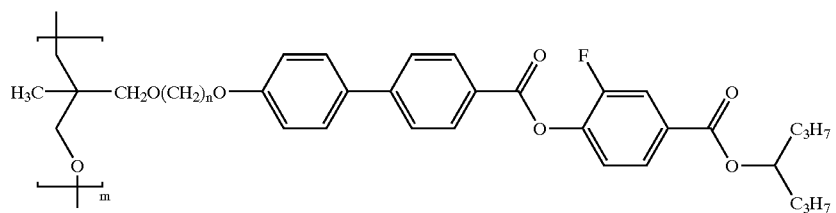

| Compound | | | | | | Transition Temperatures (° C.) | | | |
|---|---|---|---|---|---|---|---|---|---|
| Number | n | Mn | Mw | Mw/Mn | DP | Iso | | SmC | Tg[a] |
| P12 | 6 | 9828 | 16730 | 1.7 | 16 | • | 94.3 (2.9) | • | 10.5 |
| P15 | 10 | 9328 | 15630 | 1.7 | 14 | • | 112.7 (0.9) | • | −0.1 |
| P18 | 11 | 13084 | 24753 | 1.9 | 20 | • | 99.4 (0.8) | • | −2.3 |

[a]Determined by DSC

TABLE 2G

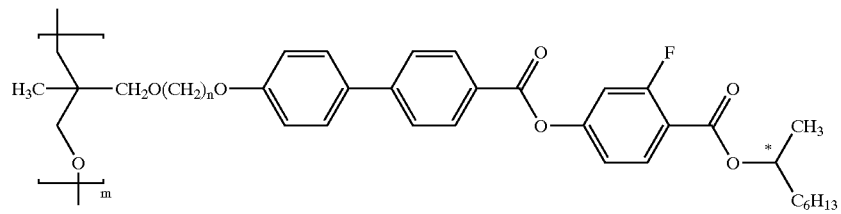

| Compound | | | | | | Transition Temperatures (° C.) | | | | | |
|---|---|---|---|---|---|---|---|---|---|---|---|
| Number | n | Mn | Mw | Mw/Mn | DP | Iso | | SmA* | | SmC* | Tg[a] |
| P19 | 6 | 7121 | 9393 | 1.3 | 11 | • | 137.3 (1.3) | • | 123.1 (0.6) | • | −0.3 |
| P22 | 10 | 15061 | 32079 | 2.1 | 22 | • | 181.9 (4.8) | • | 158.4 (0.4) | • | −0.9 |
| P25 | 11 | 8254 | 10919 | 1.3 | 12 | • | 161.2 (7.3) | • | 142.3 (0.2) | • | −0.8 |

[a]Determined by DSC

TABLE 2H
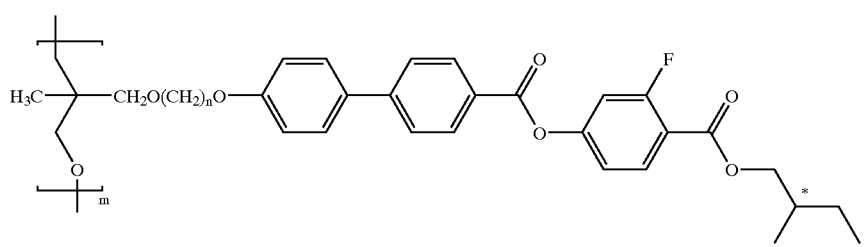
| Compound Number | n | Mn | Mw | Mw/Mn | DP | Iso | | SmA* | | SmC* | Tg[a] |
|---|---|---|---|---|---|---|---|---|---|---|---|
| P20 | 6 | 5074 | 7058 | 1.3 | 9 | • | 222.2 (4.1) | • | 190.1 (0.4) | • | 0.8 |
| P23 | 10 | 13084 | 24753 | 1.9 | 20 | • | 250.2 (8.2) | • | 234.9 (0.5) | • | 8.5 |
| P26 | 11 | 6927 | 9356 | 1.3 | 10 | • | 225.1 (8.4) | • | 194.6[b] | • | 1.4 |
[a]Determined by DSC
[b]The enthalpy for this transition was not obtainable because the SmC*-SmA* peak overlapped the SmA*-Iso peak
TABLE 2I
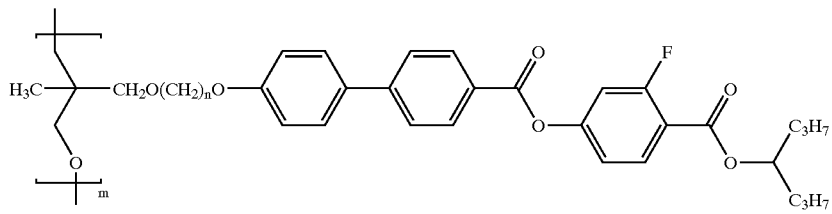
| Compound Number | n | Mn | Mw | Mw/Mn | DP | Iso | | SmA | | SmC | Tg[a] |
|---|---|---|---|---|---|---|---|---|---|---|---|
| P21 | 6 | 5131 | 6096 | 1.2 | 8 | • | 185.6 (0.5) | • | 165.4 | • | — |
| P24 | 10 | 9298 | 13162 | 1.4 | 13 | • | 148.6 (3.6) | • | 106.3 (0.4) | • | −1.5 |
| P27 | 11 | 9711 | 13754 | 1.4 | 14 | • | 136.7 (4.0) | • | 91.9 (0.5) | • | −5.8 |
[a]Determined by DSC
TABLE 2J
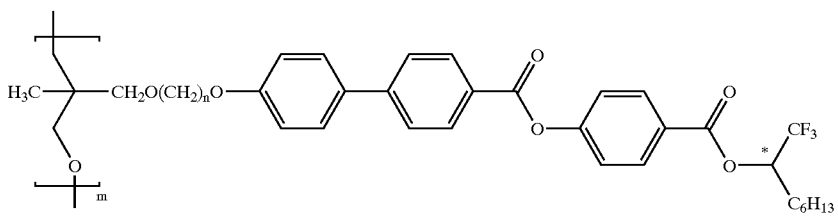
| Compound Number | n | Mn | Mw | Mw/Mn | DP | Iso | | SmA* | | SmC* | | SmC$_A$* | Tg[a] |
|---|---|---|---|---|---|---|---|---|---|---|---|---|---|
| P28 | 6 | 7413 | 9889 | 1.3 | 11 | • | 108.7 (0.5) | • | 88.4 (0.1) | • | — | — | 14.9 |
| P29 | 10 | 22244 | 46844 | 2.1 | 30 | • | 136.9 (5.0) | • | 98.9 (1.0) | • | — | — | 1.6 |

TABLE 2J-continued

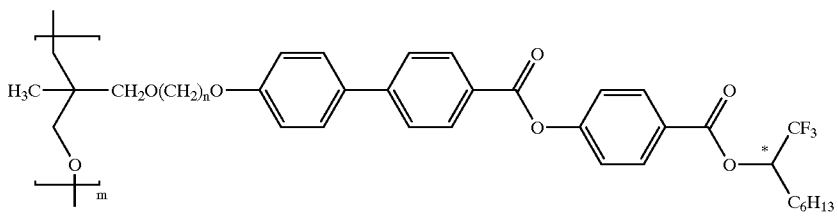

| Compound | | | | | | Transition Temperatures (° C.) | | | | |
|---|---|---|---|---|---|---|---|---|---|---|
| Number | n | Mn | Mw | Mw/Mn | DP | Iso | SmA* | SmC* | SmC$_A$* | Tg$^a$ |
| P30 | 11 | 13051 | 17128 | 1.3 | 17 | • 132.8 (5.1) | — | — | • 101.3 (0.8) | • −0.8 |

$^a$Determined by DSC

TABLE 2K

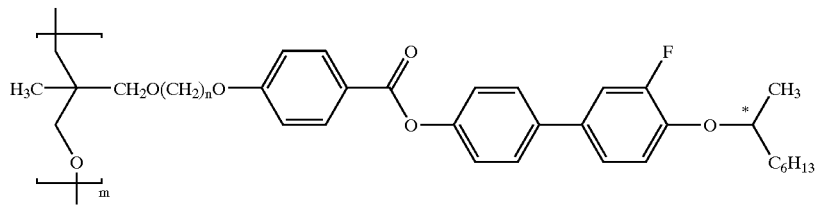

| Compound | | | | | | Transition Temperatures (° C.) | | | |
|---|---|---|---|---|---|---|---|---|---|
| Number | n | Mn | Mw | Mw/Mn | DP | Iso | SmC* | SmC$_A$* | Tg$^a$ |
| P31 | 6 | 25356 | 49544 | 1.9 | 41 | • 130.7 (10.4) | • — | — | 9.6 |
| P32 | 10 | 11760 | 16371 | 1.4 | 17 | • 147.3 (9.5) | • 128.1 (0.2) | • — | 5.8 |
| P33 | 11 | 8923 | 11670 | 1.3 | 13 | • 144.7 (9.8) | • 135.2$^b$ | • 25.5$^c$ (9.1) | — |

$^a$Determined by DSC
$^b$The enthalpy for this transition was not obtainable because the SmC*-SmA* peak was underneath the SmA*-Iso peak.
$^c$Transition at 25.5° C. to an unidentified phase.

We claim:

1. A method of making an electro-optic device comprising the steps:
  forming a cell comprising two cell walls spaced apart, the walls inner surfaces having formed thereon electrode structures;
  providing a mixture comprising a monomer material and a cationic initiator;
  introducing the mixture between the cell walls; and
  polymerising the mixture to form a polymer of general formula (I):

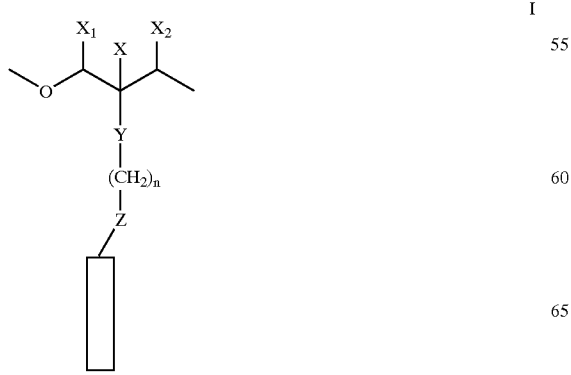

wherein X, X$_1$, X$_2$ are independently selected from straight or branched C$_{1-16}$ alkyl, halogen and H;
  Z=single covalent bond, oxygen CO$_2$, OCO;
  n=1–20; Y=oxygen, CO$_2$, OCO, CH$_2$, CHOH, CH$_2$O;
  m=3–10,000;
  ▭ is a mesogenic group defined from the general structure (II):

where A, B, and D are independently selected from:

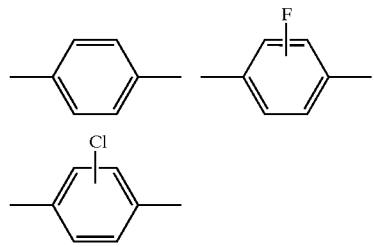

where W$_1$ and W$_2$ are independently selected from a single covalent bond, COO, OCO, and O;

Q is selected from:
R, OR, COOR, where R may be chiral, straight or branched chain alkyl and may include from 1–16 carbon atoms and including where when R is chiral or branched chain alkyl then one or more non-adjacent $CH_2$ groups may be substituted by $CH(CN)$, $CH(CF_3)$, $CH(Cl)$, $CH(CH_3)$, CHF;
when R is straight chain alkyl then one or more non-adjacent $CH_2$ groups are substituted by $CH(CN)$, $CH(CF_3)$, $CH(Cl)$, $CH(CH_3)$, CHF;
the substituents on the phenyl rings indicate that at least one and up to four substituents may be present on each ring.

2. A method acording to claim 1 wherein the mixture further comprises a radical photoinitiator.

3. A liquid crystal polymer of general formula I:

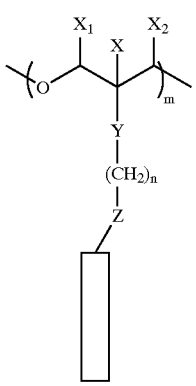

wherein X, $X_1$, $X_2$ are independently selected from straight or branched $C_{1-16}$ alkyl, halogen and H;
Z=single covalent bond, oxygen $CO_2$, OCO;
n=1–20; Y=oxygen, $CO_2$, OCO, $CH_2$, CHOH, $CH_2O$;
m=3–10,000;
☐ is a mesogenic group defined from the general structure (II):

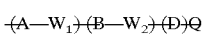    II where A, B, and D are independently selected from

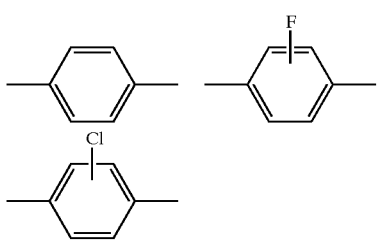

where $W_1$ and $W_2$ are independently selected from a single covalent bond, COO, OCO, O;
Q is selected from:
R, OR, COOR, where R may be chiral, straight or branched chain alkyl and may include from 1–16 carbon atoms and including where when R is chiral or branched chain alkyl then one or more non-adjacent $CH_2$ groups may be substituted by $CH(CN)$, $CH(CF_3)$, $CH(Cl)$, $CH(CH_3)$, CHF;
when R is straight chain alkyl then one or more non-adjacent $CH_2$ groups are substituted by $CH(CN)$, $CH(CF_3)$, $CH(Cl)$, $CH(CH_3)$, CHF;
the substituents on the phenyl rings indicate that at least one and up to four substituents may be present on each ring.

4. A liquid crystal polymer according to claim 3 wherein $W_1$ is single covalent bond.

5. A liquid crystal polymer according to claim 4 wherein X is $CH_3$, $X_1$ and $X_2$ are both H, Z is oxygen, n=6–12, Y=$CH_2O$, A is:

B is:

$W_2$ is —COO—
D is:

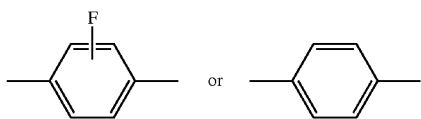

and Q is —COOR.

6. A liquid crystal polymer accrding to claim 5 wherein Q is:

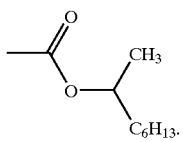

7. A liquid crystal polymer according to claim 5 wherein Q is:

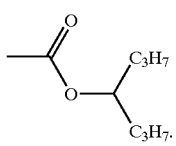

8. A liquid crystal polymer according to claim 5 wherein Q is:

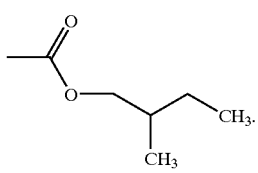

9. A liquid crystal material having optically active properties comprising at least one liquid crystal polymer as claimed in claim 3.

10. A liquid crystal device which comprises two spaced cell walls each bearing electrode structures and treated on at least one facing surface with an alignment layer, and a layer of liquid crystal material enclosed between the cell walls, characterised in that the layer of liquid crystal material comprises a material according to claim 9.

11. A liquid crystal monomer of general formula (III):

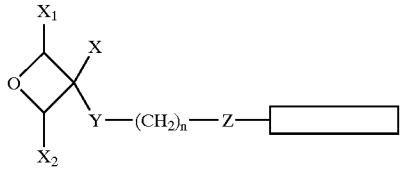

III wherein X, X1 and X2 are independently selected from straight or branched chain C1–16 alkyl, halogen and H;

Z=single covalent bond, oxygen, $CO_2$, or OCO;
n=1–20; Y=oxygen, $CO_2$, OCO, $CH_2$, CHOH, $CH_2O$;
wherein ☐ is a mesogenic group defined from the general structure (II):

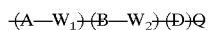

II where A, B, and D are independently selected from:

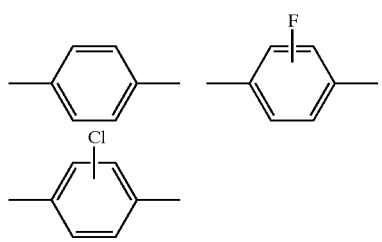

where $W_1$ and $W_2$ are independently selected from a single covalent bond, COO, OCO, O;
Q is selected from:
R, OR, COOR, where R may be chiral, straight or branched chain alkyl and may include from 1–16 carbon atoms and including where when R is chiral or branched chain alkyl then one or more non-adjacent $CH_2$ groups may be substituted by CH(CN), $CH(CF_3)$, CH(Cl), $CH(CH_3)$, CHF;
when R is straight chain alkyl then one or more non-adjacent $CH_2$ groups are substituted by CH(CN), $CH(CF_3)$, CH(Cl), $CH(CH_3)$, CHF;
the substituents on the phenyl rings indicate that at least one and up to four substituents may be present on each ring.

12. A liquid crystal material comprising at least one liquid crystal monomer as claimed in claim 11.

13. A liquid crystal monomer according to claim 11 wherein $W_1$ is single covalent bond.

14. A liquid crystal monomer according to claim 12 wherein X is $CH_3$, $X_1$ and $X_2$ are both H, Z is oxygen, n=6–12, Y=$CH_2O$, A is:

B is:

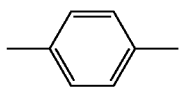

$W_2$ is —COO—
D is:

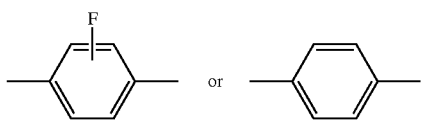

and Q is —COOR.

15. A crystal monomer accrding to claim 14 wherein Q is:

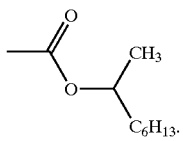

16. A liquid crystal monomer according to claim 14 wherein Q is:

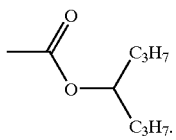

17. A liquid crystal monomer according to claim 14 wherein Q is:

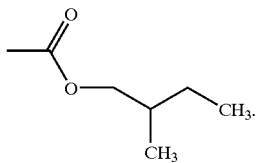

18. A liquid crystal material having optically active properties comprising at least one liquid crystal monomer as claimed in claim 11.

* * * * *